US012721486B2

(12) United States Patent
Reeder et al.

(10) Patent No.: US 12,721,486 B2
(45) Date of Patent: Sep. 1, 2026

(54) VACUUM TOOLS

(71) Applicant: MILWAUKEE ELECTRIC TOOL CORPORATION, Brookfield, WI (US)

(72) Inventors: Kyle Reeder, Waukesha, WI (US); Ellen M. Owens, Wauwatosa, WI (US); Jonathan Lowry, Milwaukee, WI (US); Alexander J. Goodman, Milwaukee, WI (US); Christopher J. Metcalf, Wauwatosa, WI (US); Scott T. Moeller, Richfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/636,174

(22) Filed: Apr. 15, 2024

(65) Prior Publication Data

US 2024/0252007 A1 Aug. 1, 2024

Related U.S. Application Data

(63) Continuation of application No. 18/582,883, filed on Feb. 21, 2024, which is a continuation of application
(Continued)

(51) Int. Cl.
*A47L 9/06* (2006.01)
*A47L 7/00* (2006.01)
(Continued)

(52) U.S. Cl.
CPC ........... *A47L 9/0673* (2013.01); *A47L 7/0004* (2013.01); *A47L 7/0095* (2013.01); *A47L 9/066* (2013.01);
(Continued)

(58) Field of Classification Search
CPC ..... A47L 9/02; A47L 9/04; A47L 9/06; A47L 9/0693; A47L 9/0633; A47L 9/0606;
(Continued)

(56) References Cited

U.S. PATENT DOCUMENTS 955,897 A 4/1910 Noe
987,820 A 3/1911 Parker
(Continued)

FOREIGN PATENT DOCUMENTS

AU 2015101213 A 10/2015
CN 2082597 U 8/1991
(Continued)

OTHER PUBLICATIONS

USA-Clean, "Vacuum Cleaner Magnet Strip, BBMC12, 12" Length" <https://www.amazon.com/Vacuum-Cleaner-Magnet-BBCM12-Length/dp/B00EUKLLTK> web page visited Aug. 2, 2021.
(Continued)

*Primary Examiner* — Brian D Keller
*Assistant Examiner* — Sidney D Full
(74) *Attorney, Agent, or Firm* — Michael Best & Friedrich LLP

(57) ABSTRACT

A vacuum tool configured to be removably coupled to hose or wand of a vacuum includes a body including a first end, a second end, and a first longitudinal axis extending between the first end and the second end. The vacuum tool also includes a head coupled to the first end of the body, a connection portion coupled to the second end of the body and configured to couple the body to a hose or wand of a vacuum cleaner, and a brush coupled to the head. The brush includes an elongate support defining a second axis perpendicular to the longitudinal axis of the body and configured to couple the brush to the head, and a plurality of bristles positioned on the elongate support.

19 Claims, 35 Drawing Sheets

Related U.S. Application Data

No. 17/058,813, filed as application No. PCT/US2020/039652 on Jun. 25, 2020, now Pat. No. 11,937,762.

(60) Provisional application No. 63/000,656, filed on Mar. 27, 2020, provisional application No. 62/980,041, filed on Feb. 21, 2020, provisional application No. 62/955,070, filed on Dec. 30, 2019, provisional application No. 62/866,883, filed on Jun. 26, 2019.

(51) Int. Cl.
*A47L 9/24* (2006.01)
*A47L 9/32* (2006.01)
*B08B 15/04* (2006.01)
*B23Q 11/00* (2006.01)

(52) U.S. Cl.
CPC ............ *A47L 9/0693* (2013.01); *A47L 9/242* (2013.01); *A47L 9/248* (2013.01); *A47L 9/327* (2013.01); *B08B 15/04* (2013.01); *B23Q 11/0046* (2013.01); *B23Q 11/0071* (2013.01)

(58) Field of Classification Search
CPC ...... A47L 9/0666; A47L 9/066; A47L 9/0673; A47L 9/242; A47L 9/244; A47L 9/248; A47L 9/327; A47L 7/0004; A47L 7/0095; A47L 5/22–36; F16L 39/005; F16L 39/02; F16L 25/14; B23Q 11/0046; B23Q 11/0071; B08B 15/00; B08B 15/04
See application file for complete search history.

(56) References Cited

U.S. PATENT DOCUMENTS 1,005,153 A 10/1911 Case
1,696,811 A 12/1928 Nisbet
1,884,044 A 10/1932 Martinet
1,971,493 A 8/1934 Leathers
1,994,869 A 3/1935 Replogle
2,098,797 A 11/1937 Stevens
2,216,275 A 10/1940 Kroenlein
2,235,226 A 3/1941 Lofgren et al.
2,236,989 A 4/1941 Bjorkman
2,276,943 A 3/1942 Dow
2,296,429 A 9/1942 Ell
2,320,545 A 6/1943 Ross
2,374,461 A 4/1945 Schmidt
D141,802 S 7/1945 Wittke
2,554,238 A 5/1951 Burri
2,591,262 A 4/1952 Humphrey
2,616,118 A 11/1952 Meyerhoefer
2,624,064 A 1/1953 Snyder
2,643,413 A 6/1953 Buccasio
2,661,225 A 12/1953 Lyon
2,665,446 A 1/1954 Gregory
2,674,001 A 4/1954 Abrams et al.
2,677,461 A * 5/1954 Bodey ...................... A47L 9/02 211/DIG. 1
2,703,903 A 3/1955 Faith-Ell
2,715,240 A 8/1955 Pieper et al.
2,747,217 A 5/1956 Stahl
2,807,825 A 10/1957 Gardner
2,824,334 A 2/1958 Laningham
2,932,055 A 4/1960 Kemper
3,091,433 A 5/1963 Riley, Jr.
D200,194 S 2/1965 Frost
3,206,783 A * 9/1965 Schwartz ............... A47L 13/41 15/245
3,320,629 A 5/1967 Zaidan
3,477,087 A 11/1969 Robinson
3,549,180 A 12/1970 MacWilliam
3,574,885 A 4/1971 Jones
3,689,031 A 9/1972 Ruddick et al.
3,820,189 A 6/1974 Roth
3,952,362 A 4/1976 Torii
4,034,435 A 7/1977 Grabathy
4,279,745 A * 7/1981 Haase ...................... B03C 1/30 209/215
D273,146 S 3/1984 Farr
4,459,720 A 7/1984 Ahlf et al.
4,476,607 A 10/1984 Ross
4,570,286 A 2/1986 Ross
4,592,111 A 6/1986 Berfield
4,638,526 A 1/1987 Murata et al.
4,638,527 A 1/1987 Fleischhauer
4,653,137 A 3/1987 Fleischhauer
4,653,779 A 3/1987 Foster
4,694,529 A 9/1987 Choiniere
4,715,088 A 12/1987 Haase
4,921,284 A 5/1990 Singeetham
5,052,074 A * 10/1991 Korsen .................... A47L 9/00 209/215
5,054,160 A 10/1991 Marino
5,056,187 A 10/1991 Higgins
5,063,635 A 11/1991 Ishii et al.
5,179,756 A * 1/1993 Korsen .................... A47L 9/00 15/246.2
D335,942 S 5/1993 Furcron
5,265,969 A 11/1993 Chuang
D353,918 S 12/1994 Bruno et al.
5,388,308 A 2/1995 Meeuwissen
5,440,782 A 8/1995 Yamashita
5,491,870 A 2/1996 Holmes
5,533,230 A 7/1996 Rouda
5,557,823 A 9/1996 Rouda
5,613,272 A 3/1997 Huffman
5,652,997 A 8/1997 Na
D384,453 S 9/1997 Bartz
5,715,569 A 2/1998 Dickey
5,722,112 A 3/1998 Scanni et al.
5,768,747 A 6/1998 Smith
5,826,300 A 10/1998 Smith
5,826,301 A 10/1998 Kang et al.
D405,570 S 2/1999 Broecking
5,894,628 A 4/1999 Egner-Walter et al.
6,026,541 A 2/2000 Bailey et al.
6,029,311 A 2/2000 Scanni et al.
6,044,521 A 4/2000 Sebek
6,108,861 A 8/2000 Vystrcil et al.
6,341,403 B1 1/2002 Strickrodt et al.
6,345,409 B1 2/2002 LaCroix
6,381,805 B1 5/2002 Martin
6,430,773 B1 8/2002 Buron et al.
6,519,809 B2 2/2003 Gutry
6,581,974 B1 6/2003 Ragner et al.
D513,101 S 12/2005 Allard et al.
D520,201 S 5/2006 Dyson et al.
D520,202 S 5/2006 Dyson et al.
7,036,184 B2 5/2006 Kim
7,159,274 B2 1/2007 Friedell
D540,994 S 4/2007 Borges
7,278,181 B2 10/2007 Harris et al.
D565,261 S 3/2008 Peace
D565,262 S 3/2008 Dyson et al.
7,353,564 B2 4/2008 Wertz
7,377,006 B2 5/2008 Genoa et al.
7,571,514 B2 8/2009 Shih
D602,217 S 10/2009 Osborn et al.
D603,570 S 11/2009 Svantesson et al.
D616,166 S 5/2010 McLeod et al.
D621,566 S 8/2010 Crawley et al.
D622,016 S 8/2010 Hofmann-Kay et al.
7,954,202 B1 6/2011 Ragner
8,015,662 B2 9/2011 Rosenzweig et al.
D659,315 S 5/2012 Hollis et al.
8,230,819 B2 7/2012 Freidell
8,296,901 B2 10/2012 Rosenzweig et al.
D670,454 S 11/2012 Sherk, Jr. et al.
D674,978 S 1/2013 Hill et al.
8,402,603 B1 3/2013 Meek
8,407,853 B1 4/2013 Baxt

(56) References Cited

U.S. PATENT DOCUMENTS

| | | | |
|---|---|---|---|
| 8,429,790 | B2 | 4/2013 | Freidell |
| 8,499,772 | B2 | 8/2013 | Schumacher |
| 8,533,907 | B2 | 9/2013 | Eccardt et al. |
| 8,555,463 | B1 | 10/2013 | Laube |
| 8,595,894 | B1 | 12/2013 | Kakish |
| D701,010 | S | 3/2014 | Tate |
| D701,011 | S | 3/2014 | Miller et al. |
| 8,667,644 | B1 | 3/2014 | Marion |
| 8,732,893 | B2 | 5/2014 | Freidell |
| 8,777,272 | B2 | 7/2014 | Welchert |
| D712,608 | S | 9/2014 | Crawley |
| D712,609 | S | 9/2014 | Crawley |
| 8,918,947 | B2 | 12/2014 | Schwartz |
| 8,918,955 | B2 | 12/2014 | Freidell |
| D722,734 | S | 2/2015 | Jang et al. |
| D729,475 | S | 5/2015 | Jang et al. |
| 9,186,027 | B2 | 11/2015 | Genn |
| 9,212,771 | B2 | 12/2015 | Baldwin et al. |
| 9,277,845 | B2 | 3/2016 | Griffith et al. |
| 9,370,287 | B2 | 6/2016 | Welchert |
| D762,029 | S | 7/2016 | Marsden et al. |
| 9,392,918 | B2 | 7/2016 | Tucker et al. |
| D764,125 | S | 8/2016 | Palladino et al. |
| 9,420,927 | B2 | 8/2016 | Ventress et al. |
| D773,136 | S | 11/2016 | Fuller et al. |
| 9,492,046 | B2 | 11/2016 | Cole et al. |
| 9,596,967 | B2 | 3/2017 | Lee et al. |
| 9,695,545 | B2 | 7/2017 | Goble et al. |
| 9,700,188 | B2 | 7/2017 | Cole et al. |
| 9,723,960 | B2 | 8/2017 | Borges et al. |
| D800,266 | S | 10/2017 | Holub, Jr. |
| 9,782,048 | B2 | 10/2017 | Witter et al. |
| D804,754 | S | 12/2017 | Washington |
| D804,755 | S | 12/2017 | Nam et al. |
| D805,267 | S | 12/2017 | Maune |
| D806,963 | S | 1/2018 | Nam et al. |
| D811,673 | S | 2/2018 | Nam et al. |
| 9,955,834 | B2 | 5/2018 | Lee et al. |
| 9,992,973 | B2 | 6/2018 | Freidell |
| 10,022,026 | B2 | 7/2018 | Price |
| D830,655 | S | 10/2018 | Kim et al. |
| 10,145,057 | B2 | 12/2018 | Goble et al. |
| 10,238,256 | B2 | 3/2019 | Cole et al. |
| 10,315,627 | B2 | 6/2019 | Chambers et al. |
| 10,443,768 | B1 | 10/2019 | McConnell et al. |
| D867,696 | S | 11/2019 | Onyenkwere |
| 10,463,216 | B2 | 11/2019 | Emmett et al. |
| D869,803 | S | 12/2019 | Fry et al. |
| D871,700 | S | 12/2019 | Martinez |
| D880,791 | S | 4/2020 | Ducette, Jr. et al. |
| 10,631,696 | B1 | 4/2020 | Williamson |
| 10,791,899 | B2 | 10/2020 | Carter |
| 10,849,475 | B1 | 12/2020 | Williamson |
| 11,653,803 | B2 | 5/2023 | Carter |
| 11,937,762 | B2 | 3/2024 | Reeder et al. |
| 2002/0170140 | A1 | 11/2002 | Diaz et al. |
| 2004/0020006 | A1 | 2/2004 | Muller |
| 2004/0045127 | A1 | 3/2004 | Albert et al. |
| 2004/0143931 | A1 | 7/2004 | Dennis |
| 2005/0044660 | A1 | 3/2005 | Kim |
| 2005/0076467 | A1 | 4/2005 | Stephens et al. |
| 2005/0115017 | A1 | 6/2005 | Kim |
| 2007/0013187 | A1 | 1/2007 | Petner et al. |
| 2007/0209144 | A1 | 9/2007 | Fester et al. |
| 2007/0209147 | A1 | 9/2007 | Krebs et al. |
| 2007/0271727 | A1 | 11/2007 | Adams |
| 2007/0277345 | A1 | 12/2007 | Spann |
| 2008/0022487 | A1 | 1/2008 | Young |
| 2008/0163451 | A1 | 7/2008 | Buller et al. |
| 2008/0184515 | A1 | 8/2008 | Chapman et al. |
| 2009/0188067 | A1 | 7/2009 | White et al. |
| 2009/0235483 | A1 | 9/2009 | Seo |
| 2010/0294207 | A1 | 11/2010 | Dyson et al. |
| 2011/0030620 | A1 | 2/2011 | Jouan |
| 2011/0047745 | A1 | 3/2011 | Butts |
| 2011/0142557 | A1 | 6/2011 | Hahn |
| 2011/0185869 | A1 | 8/2011 | Wasielewski et al. |
| 2012/0042469 | A1 | 2/2012 | Davis et al. |
| 2012/0090639 | A1 | 4/2012 | Heldman et al. |
| 2012/0110770 | A1 | 5/2012 | Hirashima |
| 2012/0160536 | A1 | 6/2012 | Beining |
| 2012/0285393 | A1 | 11/2012 | Freidell |
| 2012/0285395 | A1 | 11/2012 | Freidell |
| 2012/0297571 | A1 | 11/2012 | Friedell |
| 2013/0145576 | A1 | 6/2013 | Hollis |
| 2013/0319469 | A1 | 12/2013 | Borges, Sr. et al. |
| 2014/0062077 | A1 | 3/2014 | Hurley |
| 2014/0068892 | A1 | 3/2014 | Chambers |
| 2014/0075716 | A1 | 3/2014 | Elmenhurst |
| 2014/0271004 | A1 | 9/2014 | Bialy et al. |
| 2015/0000070 | A1 | 1/2015 | Liu et al. |
| 2015/0198274 | A1 | 7/2015 | Farland et al. |
| 2016/0120383 | A1 | 5/2016 | Stanek et al. |
| 2016/0319521 | A1 | 11/2016 | Mitchell |
| 2018/0014706 | A1 | 1/2018 | Tucker et al. |
| 2018/0014707 | A1 | 1/2018 | Tucker et al. |
| 2018/0014708 | A1 | 1/2018 | Tucker et al. |
| 2018/0055314 | A1 | 3/2018 | Rupp et al. |
| 2018/0235420 | A1 | 8/2018 | Stanek et al. |
| 2018/0288969 | A1 | 10/2018 | Freidell |
| 2018/0353024 | A1 | 12/2018 | Williams |
| 2018/0353028 | A1 | 12/2018 | Goller |
| 2019/0119845 | A1 | 4/2019 | Goble et al. |
| 2019/0174982 | A1 | 6/2019 | Santiago |
| 2019/0282047 | A1 | 9/2019 | Minamide et al. |
| 2019/0290080 | A1 | 9/2019 | Liu et al. |
| 2019/0380548 | A1 | 12/2019 | Moeller et al. |
| 2019/0380555 | A1 | 12/2019 | Scott et al. |
| 2019/0387937 | A1 | 12/2019 | Martin et al. |
| 2020/0000300 | A1 | 1/2020 | Moeller et al. |
| 2020/0015643 | A1 | 1/2020 | Scott et al. |
| 2020/0214517 | A1 | 7/2020 | Ito et al. |
| 2021/0347090 | A1 | 11/2021 | Holzmeier |
| 2022/0322899 | A1 | 10/2022 | Reeder et al. |

FOREIGN PATENT DOCUMENTS

| | | | |
|---|---|---|---|
| CN | 2217952 | Y | 1/1996 |
| CN | 101229033 | A | 7/2008 |
| CN | 201227241 | Y | 4/2009 |
| CN | 301057278D | | 11/2009 |
| CN | 201398935 | Y | 2/2010 |
| CN | 301129641D | | 2/2010 |
| CN | 301235834 | S | 5/2010 |
| CN | 301343708 | S | 9/2010 |
| CN | 202179502 | U | 4/2012 |
| CN | 101564281 | B | 5/2012 |
| CN | 102485157 | A | 6/2012 |
| CN | 302110947 | S | 10/2012 |
| CN | 302268617 | S | 1/2013 |
| CN | 101869455 | B | 4/2013 |
| CN | 103181742 | A | 7/2013 |
| CN | 203122292 | U | 8/2013 |
| CN | 203122294 | U | 8/2013 |
| CN | 302721246 | S | 1/2014 |
| CN | 302726072 | S | 1/2014 |
| CN | 203468509 | U | 3/2014 |
| CN | 203591222 | U | 5/2014 |
| CN | 104013359 | A | 9/2014 |
| CN | 302937546 | S | 9/2014 |
| CN | 203885437 | U | 10/2014 |
| CN | 303050391 | S | 12/2014 |
| CN | 103462562 | B | 12/2015 |
| CN | 105361800 | A | 3/2016 |
| CN | 105361801 | A | 3/2016 |
| CN | 105380565 | A | 3/2016 |
| CN | 105380574 | A | 3/2016 |
| CN | 205181235 | U | 4/2016 |
| CN | 102485156 | B | 5/2016 |
| CN | 205338838 | U | 6/2016 |
| CN | 102485154 | B | 7/2016 |
| CN | 303903132 | S | 11/2016 |
| CN | 104013358 | B | 12/2016 |
| CN | 303979113 | S | 12/2016 |

(56) References Cited

FOREIGN PATENT DOCUMENTS

| | | | |
|---|---|---|---|
| CN | 304062024 | S | 3/2017 |
| CN | 304073560 | S | 3/2017 |
| CN | 106618383 | A | 5/2017 |
| CN | 206138057 | U | 5/2017 |
| CN | 106880324 | A | 6/2017 |
| CN | 106889945 | A | 6/2017 |
| CN | 106901653 | A | 6/2017 |
| CN | 106974590 | A | 7/2017 |
| CN | 107080493 | A | 8/2017 |
| CN | 206518513 | U | 9/2017 |
| CN | 107260066 | A | 10/2017 |
| CN | 107262266 | A | 10/2017 |
| CN | 107411636 | A | 12/2017 |
| CN | 107456156 | A | 12/2017 |
| CN | 206714705 | U | 12/2017 |
| CN | 107669211 | A | 2/2018 |
| CN | 207202828 | U | 4/2018 |
| CN | 304651521 | S | 5/2018 |
| CN | 207640323 | U | 7/2018 |
| CN | 108433637 | A | 8/2018 |
| CN | 108903794 | A | 11/2018 |
| CN | 208144962 | U | 11/2018 |
| CN | 304908709 | S | 11/2018 |
| CN | 208243512 | U | 12/2018 |
| CN | 208259651 | U | 12/2018 |
| CN | 208331514 | U | 1/2019 |
| CN | 109330481 | A | 2/2019 |
| CN | 208590621 | U | 3/2019 |
| CN | 208799164 | U | 4/2019 |
| CN | 208799165 | U | 4/2019 |
| CN | 208973662 | U | 6/2019 |
| CN | 209003815 | U | 6/2019 |
| CN | 209136447 | U | 7/2019 |
| CN | 305250631 | S | 7/2019 |
| CN | 209186560 | U | 8/2019 |
| CN | 209220127 | U | 8/2019 |
| CN | 209285370 | U | 8/2019 |
| CN | 305367087 | S | 9/2019 |
| CN | 209826551 | U | 12/2019 |
| CN | 106264363 | B | 1/2020 |
| CN | 110742550 | A | 2/2020 |
| CN | 305611410 | S | 2/2020 |
| CN | 305631371 | S | 2/2020 |
| CN | 105361805 | B | 3/2020 |
| CN | 111012246 | A | 4/2020 |
| CN | 210249693 | U | 4/2020 |
| CN | 210330474 | U | 4/2020 |
| CN | 305679541 | S | 4/2020 |
| CN | 305679560 | S | 4/2020 |
| CN | 210902814 | U | 7/2020 |
| CN | 210931159 | U | 7/2020 |
| DE | 689460 | C | 3/1940 |
| DE | 950233 | C | 10/1956 |
| DE | 1741297 | U | 3/1957 |
| DE | 1772158 | U | 8/1958 |
| DE | 1786502 | U | 4/1959 |
| DE | 1144889 | B | 3/1963 |
| DE | 1157356 | B | 11/1963 |
| DE | 1993649 | U | 9/1968 |
| DE | 6919724 | U | 1/1970 |
| DE | 6604899 | U | 3/1970 |
| DE | 2418257 | A1 | 10/1974 |
| DE | 7518630 | U | 3/1976 |
| DE | 8134889 | U1 | 4/1982 |
| DE | 3529777 | A1 | 2/1987 |
| DE | 3544480 | A1 | 6/1987 |
| DE | 3632196 | A1 | 3/1988 |
| DE | 9005930 | U1 | 8/1990 |
| DE | 8625341 | U1 | 10/1990 |
| DE | SM9200208-0004 | | 6/1992 |
| DE | SM9200208-0005 | | 6/1992 |
| DE | 8523910 | U1 | 7/1994 |
| DE | 4444959 | A1 | 6/1996 |
| DE | 29610327 | U1 | 8/1996 |
| DE | 29611222 | U1 | 9/1996 |
| DE | 19738068 | C1 | 9/1998 |
| DE | 19901927 | A1 | 7/1999 |
| DE | 20118357 | U1 | 3/2002 |
| DE | 20215337 | U1 | 12/2002 |
| DE | 20314450 | U1 | 11/2003 |
| DE | 20313244 | U1 | 12/2003 |
| DE | 10302728 | A1 | 8/2004 |
| DE | 202005005124 | U1 | 6/2005 |
| DE | 202005003025 | U1 | 7/2005 |
| DE | 202005008383 | U1 | 7/2005 |
| DE | 202008006685 | U1 | 9/2008 |
| DE | 102007036524 | A1 | 2/2009 |
| DE | 102007036525 | A1 | 2/2009 |
| DE | 102008014625 | A1 | 9/2009 |
| DE | 202010003106 | U1 | 5/2010 |
| DE | 102008055043 | A1 | 8/2010 |
| DE | 202011000185 | U1 | 3/2011 |
| DE | S402013003678-0022 | | 10/2013 |
| DE | S402013003678-0023 | | 10/2013 |
| DE | S402013003678-0024 | | 10/2013 |
| DE | 102012016465 | A1 | 2/2014 |
| DE | 102012020546 | A1 | 4/2014 |
| DE | 102013007244 | A1 | 10/2014 |
| DE | 202015104811 | U1 | 9/2015 |
| DE | 102015113868 | A1 | 2/2017 |
| DE | 202018101457 | U1 | 7/2018 |
| DE | 102017105466 | A1 | 9/2018 |
| DE | 102017112798 | A1 | 12/2018 |
| DE | 102017118896 | A1 | 2/2019 |
| DE | 202019102698 | U1 | 5/2019 |
| DE | S402020200925-0007 | | 6/2020 |
| DE | S402020200925-0009 | | 6/2020 |
| EM | 000089008-0001 | | 2/2004 |
| EM | 000089008-0002 | | 2/2004 |
| EM | 000089008-0003 | | 2/2004 |
| EM | 000089008-0004 | | 2/2004 |
| EM | 000477740-0001 | | 3/2006 |
| EM | 000477740-0002 | | 3/2006 |
| EM | 000477740-0003 | | 3/2006 |
| EM | 000477740-0004 | | 3/2006 |
| EM | 000477740-0005 | | 3/2006 |
| EM | 000908033-0001 | | 4/2008 |
| EM | 000930151-0002 | | 6/2008 |
| EM | 000930151-0004 | | 6/2008 |
| EM | 002275271-0005 | | 7/2015 |
| EM | 002904508-0007 | | 6/2016 |
| EM | 002904508-0018 | | 6/2016 |
| EM | 003337963-0001 | | 10/2016 |
| EM | 003337963-0002 | | 10/2016 |
| EM | 004160786-0001 | | 9/2017 |
| EM | 006382750-0001 | | 5/2019 |
| EM | 006382750-0002 | | 5/2019 |
| EM | 006382750-0003 | | 5/2019 |
| EP | 1321086 | A2 | 6/2003 |
| EP | 1832214 | A1 | 9/2007 |
| EP | 1925247 | B1 | 7/2015 |
| EP | 2127582 | B1 | 9/2015 |
| EP | 3095367 | A1 | 11/2016 |
| EP | 3659486 | A1 | 6/2020 |
| GB | 2492579 | A | 1/2013 |
| JP | H06079447 | U | 11/1994 |
| JP | 2000229052 | A | 8/2000 |
| JP | 2011224076 | A | 11/2011 |
| JP | 2012255466 | A | 12/2012 |
| KR | 910017828 | U | 11/1991 |
| KR | 2019910017828 | U | 11/1991 |
| KR | 19970003567 | B1 | 3/1997 |
| KR | 970032698 | A | 7/1997 |
| KR | 100239165 | B1 | 1/2000 |
| KR | 1020060128415 | A | 12/2006 |
| KR | 2020120008906 | U | 12/2012 |
| WO | DM020034-1 | | 9/1991 |
| WO | DM022372-3 | | 5/1992 |
| WO | WO9935952 | A1 | 7/1999 |
| WO | 0100078 | A1 | 1/2001 |
| WO | DM059456-8 | | 5/2002 |
| WO | WO2003001958 | A1 | 1/2003 |
| WO | DM070542-1 | | 4/2009 |
| WO | DM070542-2 | | 4/2009 |

(56) References Cited

FOREIGN PATENT DOCUMENTS

| | | | |
|---|---|---|---|
| WO | WO2009144425 | A2 | 12/2009 |
| WO | WO2013102752 | A2 | 7/2013 |
| WO | WO2014128445 | A1 | 8/2014 |
| WO | DM080580-3 | | 4/2015 |
| WO | DM080580-4 | | 4/2015 |
| WO | WO2015044489 | A1 | 4/2015 |
| WO | DM081351-5 | | 7/2015 |
| WO | DM081351-6 | | 7/2015 |
| WO | WO2015176561 | A1 | 11/2015 |
| WO | WO2017196336 | A1 | 11/2017 |
| WO | DM090091-1 | | 3/2018 |
| WO | DM090091-2 | | 3/2018 |
| WO | DM101130-1 | | 6/2018 |
| WO | DM101130-2 | | 6/2018 |
| WO | DM101130-3 | | 6/2018 |
| WO | WO2018184390 | A1 | 10/2018 |
| WO | WO2020109118 | A1 | 6/2020 |

OTHER PUBLICATIONS

Bissell, “Bissell 1611322 Crevice Tool with Brush,” <https://evacuumstore.com/p-29707-bissell-1611322-crevice-tool-with-brush.aspx?utm_source=google_shopping&utm_medium=cpc&utm_campaign=Bissell+-+Shopping&utm_term=shopping&utm_content=sm78I4D8w_pcrid_99132577509_pkw_pmt pdv_c_slid_product_29707-32456--_pgrid_27170232069_ptaid_pla-525227540342_&gclid=EAIaIQobChMIwqvH8t6z6AIVmpOzCh1OjQ7VEAkYByABEgL52fD_BwE> web page visited Aug. 2, 2021.

Bissell, “Bissell 1606618 Combo Crevice and Dusting Brush Tool,” <https://evacuumstore.com/p-29787-bissell-1606618-combo-crevice-and-dusting-brush-tool.aspx?gclid=EAIaIQobChMIwqvH8t6z6AIVmpOzCh1OjQ7VEAkYCCABEgLBw_D_BwE> web page visited Aug. 2, 2021.

Shark, “Duster Crevice Tool #189FLI680; for Shark Rotator Powered Lift-Away Speed Models NV680, NV682, NV683,” <https://www.amazon.com/Crevice-189FLI680-Rotator-Powered-Lift-Away/dp/B01MXWOFY7> web page visited Aug. 2, 2021.

Dyson, “Combination Telescoping Dusting Brush Crevice Tool Dyson DC40/41/50/65 Vacuum,” <https://www.walmart.com/ip/Combination-Telescoping-Dusting-Brush-Crevice-Tool-Dyson-DC40-41-50-65-Vacuum/626384159?wmlspartner=wmtlabs&adid=22222222221118136274&wmlspartner=wmtlabs&wl0ve&wl1=0&wl2=c&wl3=75247912775726&wl4=pla-4578847477317007:aud-807615483&wl5=&wl6=&wl7=&%20wl10=Walmart&wl12=626384159_10000002530&wl14=shark%20crevice%20dusting%20brush%20duster&veh=sem> web page visited Aug. 2, 2021.

Kenmore, “Kenmore Vacuum Combination Crevice Tool and Dusting Brush Combo KC88REDCZV06,” <https://www.ezvacuum.com/kenmore-vacuum-combination-crevice-tool-and-dusting-brush-combo-kc88redczv06.html> web page visited Aug. 2, 2021.

Ridgid, “1-⅞ in. Crevice Tool Accessory for RIDGID Wet/Dry Shop Vacuums,” <https://www.homedepot.com/p/RIDGID-1-7-8-in-Crevice-Tool-Accessory-for-RIDGID-Wet-Dry-Shop-Vacuums-VT1702/100638367?mtc=Shopping-VF-F_D25T-B-D25T-25_14_WET_DRY_VACS-EMERSON-NA-Feed-PLA-NA-NA-Ridgid_WetDryVacs&cm_mmc=Shopping-VF-F_D25T-B-D25T-25_14_WET_DRY_VACS-EMERSON-NA-Feed-PLA-NA-NA-Ridgid_WetDryVacs-71700000053108217-58700005097972241-92700044617866202&msclkid=89cc4d4862571f7c24ec1332049cef78&gclid=CInpr5nzs-gCFSiNxQlddtoFIA&gclsrc=ds> web page visited Aug. 2, 2021.

Think Vacuums, “Universal Extendable Crevice Brush Attachment Set,” <https://www.thinkvacuums.com/universal-extendable-crevice-brush-attachment-set.html?gclid=EAIaIQobChMIwqvH8t6z6AIVmpOzCh1OjQ7VEAkYCSABEgl8WvD_BwE> web page visited Aug. 2, 2021.

Shark, “Multi-Angle Dusting Brush,” <https://www.sharkclean.com/parts/0/all/1297/multi-angle-dusting-brush/> web page visited Aug. 2, 2021.

Dayton, “Shop Vacuum Accessory Kit, for Hose Diameter 2 ½ In,” <https://www.grainger.com/product/4TB92?gclid=EAIaIQobChMII7Ss_-ez6AIVyf_jBx1rqgrCEAQYBSABEgl6cPD_BwE&cm_mmc=PPC:+Google+PLA&ef_id=EAIaIQobChMII7Ss_-ez6AIVyf_jBx1rqgrCEAQYBSABEgl6cPD_BwE:G:s&s_kwcid=AL!2966!3!281698275117 !!! g!472 467987775!> web page visited Aug. 2, 2021.

EZ Spares, “EZ Spares 25-inch Flexible Vacuum Crevice Attachment Crevice Tool Crevice Brush Kit for All 1-¼ or 1-⅜ (32mm-35mm) Vacuum Hoses,” <https://www.amazon.com/dp/B075K1M43V/ref=vp_d_ac_sub_Ir_pd?_encoding=UTF8&pd_rd_i=B075K1M43V&pd_rd_w=AD02h&pf_rd_p=f329f52e-728b-4ea9-918a-c6366b1009ac&pf_rd_r=b6acd15d-689e-4bc7-af51-69072862d5e1&pd_rd_r=b6acd15d-689e-4bc7-af51-69072862d5e1&pd_rd_wg=dek8n&th=1> web page visited Aug. 2, 2021.

Dyson, “Dyson Vacuum Cleaner Crevice Combination Brush Tool,” <https://www.buyspares.com/product.pl?pid=1648369&utm_source=google&utm_medium=base&utm_campaign=products&mkwid=sBBqIMUdm&pcrid=255610191298&kword=&match=&plid=&pdv=c&gclid=EAIaIQobChMI7-b7hOuz6AIVwoCfCh0Umwd8EAQYDCABEgJ3ifD_BwE> web page visited Aug. 2, 2021.

Hilti, “DD-WCS 500 V Wall Large Water Collector,” <https://www.homedepot.com/p/Hilti-DD-WCS-500-V-Wall-Large-Water-Collector-2215477/311653323> web page visited Aug. 2, 2021.

Dewalt, “DWH050K Large Hammer Dust Extraction—Hole Cleaning,” <https://www.dewalt.com/products/power-tools/dust-management/dust-extractors-and-vacs/large-hammer-dust-extraction--hole-cleaning/dwh050k> web page visited Aug. 2, 2021.

Shop-Vac, “Round Brush,” <https://www.lowes.com/pd/Shop-Vac-1-5-in-Round-Brush-Lowe-s/1001267370> web page visited Aug. 2, 2021.

Miele, “Miele SUB20 Flexible Universal Brush,” <https://www.thinkvacuums.com/miele-sub20-flexible-universal-brush.html> web page visited Aug. 2, 2021.

SEBO, “SEBO 1387GS Dusting Brush,” <https://www.thinkvacuums.com/sebo-1387gs-dusting-brush.html> web page visited Aug. 2, 2021.

Heuseen, “Pet Grooming Brush Vacuum Cleaner Hoover Clean Attachment Tool,” <https://www.amazon.com/Grooming-Vacuum-Cleaner-Hoover-Attachment/dp/B079J6Y2FZ> web page visited Aug. 2, 2021.

Ridgid, “1-¼ in. to 2-½ in. Claw Nozzle Accessory for Wet/Dry Shop Vacuums,” <https://www.homedepot.com/p/RIDGID-1-1-4-in-to-2-1-2-in-Claw-Nozzle-Accessory-for-RIDGID-Wet-Dry-Shop-Vacuums-VT2540/100391210> web page visited Aug. 3, 2021.

Ridgid, “RIDGID VT2534 6-Piece Auto Detailing Vacuum Hose Accessory Kit for 1 ¼ Inch RIDGID Vacuums,” <https://www.amazon.com/RIDGID-6-Piece-Detailing-Accessory-Vacuums/dp/B001FS4TWQ> web page visited Aug. 3, 2021.

VaccUflex, “Wet/Dry Vacuum Attachment Kit VaccUflex,” <https://www.amazon.com/VaccUFlex-vacuum-attachment-kit-VaccuFlex%C2%AE/dp/B006T8B8RQ> web page visited Aug. 3, 2021.

Milwaukee Tool, “M18 2-Gallon Wet/Dry Vacuum,” <https://www.milwaukeetool.com/Products/Power-Tools/Vacuums-and-Fans/Wet-Dry-Vacuums/0880-20> web page visited Aug. 3, 2021.

Gadjit, “Gadjit Exten Vac Flat Vacuum Cleaner Attachment Hose Extender (Gray)—36" Reach Under Fridge and Heavy Furniture, Vacuums Up Dirt and Dust Bunnies, Great for Big and Small Cleaning Projects,” <https://www.amazon.com/Gadjit-Exten-Vacuum-Extension-Attachment/dp/B00L5KMPCU> web page visited August 3, 2021.

Qualtex, “Replacement Multi-Angle Dust Brush Designed for Shark Vacuums,” <https://www.amazon.com/Replacement-Multi-Angle-FlexiSoft-Dusting-32-35mm/dp/B07JVL1CXZ> web page visited Aug. 3, 2021.

Ridgid, “1-¼ in. and 2-½ in. Spiral Flexible Crevice Tool Accessory for RIDGID Wet/Dry Shop Vacuums,” <https://www.homedepot.com/p/RIDGID-1-1-4-in-and-2-1-2-in-Spiral-Flexible-Crevice-Tool-

(56) References Cited

OTHER PUBLICATIONS

Accessory-for-RIDGID-Wet-Dry-Shop-Vacuums-VT2532/205209250> web page visited Aug. 3, 2021.

Fullclean, "Combination Tool Compatible with Dyson V11 V10 V8 V7 Absolute Animal Motorhead Trigger Cyclone Fluffy Outsize Torque Drive Car+Boat Vacuum Cleaner," <https://www.amazon.com/Fullclean-Combination-Compatible-Absolute-Motorhead/dp/B07HKYST86> web page visited Aug. 3, 2021.

Milwaukee Tool, "Milwaukee Dry Coring Dust Extraction Attachment 5319-DE," <https://www.amazon.com/MILWAUKEE-Coring-Extraction-Attachment-5319/dp/B07YKWY4B1> web page visited Aug. 3, 2021.

Ridgid, "2-½ in. Locking Accessory Round Dusting Brush for Wet/Dry Vacs," <https://www.homedepot.com/p/RIDGID-2-1-2-in-Locking-Accessory-Round-Dusting-Brush-for-Wet-Dry-Vacs-LA2501/304753663> web page visited Aug. 3, 2021.

Ridgid, "1-⅞ in. Floor Brush Accessory for RIDGID Wet/Dry Shop Vacuums," <https://www.homedepot.com/p/RIDGID-1-7-8-in-Floor-Brush-Accessory-for-RIDGID-Wet-Dry-Shop-Vacuums-VT1714/202507706> web page visited Aug. 3, 2021.

VacSure, "VacSure Pet Hair Brush Grooming Tool for Dog & Cat, Vacuum Nozzle Attachment," <https://www.amazon.com/dp/B0747V37HY> web page visited Aug. 3, 2021.

Ryobi, "P718 Vacuum Accessory Kit and Replacement Filter Assembly for RYOBI Stick Vacuum Cleaner (4-piece)," <https://www.homedepot.com/p/RYOBI-P718-Vacuum-Accessory-Kit-and-Replacement-Filter-Assembly-for-RYOBI-Stick-Vacuum-Cleaner-4-Piece-A32SV02-A32SV04/308973492> web page visited Aug. 3, 2021.

Miele, "SFD 20," <https://www.mieleusa.com/e/flexible-crevice-nozzle-sfd-20-7252100-p> web page visited Aug. 3, 2021.

Shop-Vac, "Shop-Vac 9017900 1 ¼-Inch Flexible Crevice Tool," <https://www.amazon.com/Shop-Vac-9017900-4-Inch-Flexible-Crevice/dp/B00F1BYJSC/ref=cm_cr_arp_d_product_top?ie=UTF8> web page visited Aug. 3, 2021.

Greenlee, "Power Fishing System Accessory Kit," <https://www.greenlee.com/us/en/accessory-kit-blower-392?w=2&c=159&b=86&r=30&p=1&I=4&v=c> web page visited Aug. 3, 2021.

Shop-Vac, "Shop-Vac 9064500 i.5-Inch Crevice Tool," <https://www.amazon.com/Shop-Vac-9064500-1-5-Inch-Crevice-Tool/dp/B001AMXSSI > web page visited Aug. 10, 2021.

Shark, "Anti-Allergen Dust Brush," <https://www.sharkclean.com/parts/0/all/1862/anti-allergen-dust-brush/> web page visited Aug. 10, 2021.

Dyson, "Genuine Dyson DC16, 24, 31, 34, 35, 44, 56, 58, 59 Combination Tool #914361-01," <https://www.amazon.com/Genuine-Dyson-DC16-Combination-914361-01/dp/B00LZUAF50> web page visited Aug. 10, 2021.

Shop-Vac, "Shop Vac Utility Cleaning Kit," <https://shop-vacs-com.3dcartstores.com/utility-cleaning-kit.html> web page visited Aug. 10, 2021.

Shop-Vac, "Shop-Vac 9196100 Claw Utility Nozzle, For: 1-¼ in, 1-½ in ad 2-½ in Dia Hoses," <https://www.mclendons.com/2721510/product/Shop-Vac-9196100> web page visited Aug. 10, 2021.

International Search Report and Written Opinion for Application No. PCT/US2020/039679 dated Oct. 13, 2020 (15 pages).

International Search Report and Written Opinion for Application No. PCT/US2020/039652 dated Oct. 7, 2020 (12 pages).

Ridgid, "1-⅞" Utility Nozzle Accessory for RIDGID Wet/Dry Shop Vacuums," <https://www.homedepot.com/p/RIDGID-1-7-8-in-Utility-Nozzle-Accessory-for-RIDGID-Wet-Dry-Shop-Vacuums-VT1709/100638351> Web page publicly available at least as early as Jun. 19, 2020.

Partial Supplementary European Search Report for Application No. 20830650.6 dated Jun. 23, 2023 (13 pages).

Extended European Search Report for Application No. 20830650.6 dated Sep. 25, 2023 (11 pages).

Partial Supplementary European Search Report for Application No. 20832517.5 dated Dec. 8, 2023 (13 pages).

Shark Home, "Duster Crevice Tool—Shark® Rocket® Complete," <https://www.youtube.com/watch?v=DQNW6AqGWNM> youtube video published Apr. 4, 2017 (5 pages).

Shark, "Navigator® Pet Plus Upright Vacuum," NV250 Series Owner's Guide, © 2018 (9 pages).

Rubber & Plastics, "Welcome to Rubber and Plastics," <https://web.archive.org/web/20180807190339/http://rubberplastics.com/> web page visited Jan. 29, 2025 (17 pages).

Shop-Vac, "Shop-Vac 9196000 Inflator Nozzle, Ideal For Inflatable Items, Easy To Attach And Use, Fits 1.25 Inc and 2.5 Inch Diameter Hoses," <https://www.amazon.com/Shop-Vac-9196000-Inflator-Nozzle/dp/B000HJ94ZQ> web page visited Apr. 24, 2025 (9 pages).

European Patent Office Action for Application No. 20832517.5 dated Mar. 31, 2025 (5 pages).

Partial European Search Report for Application No. 26150298.3 dated Apr. 20, 2026 (15 pages).

* cited by examiner 100
136d
120
160
144a
124
104
154
152
116
136b
140b
144b
112
132
136c 112
136d
132
104
116
128
120
160
152a
152
152b
154a
154
144b
136c
154b
140a
136a
144a

100

200
296
292
204b
208
276
284
220
288
216
224
236
232
212
256
268
204a
212
266a
256a
260
240b
252c
264c
248c
252d
248d
244b
256b
228
266b
244a
236
240a
256
274
252b
248b
270
264a
248a
252a 400
416
404
452
460
456
420
444a
444
432
412a
440
436
412
440a
448
428
424

536a
536c
536b
504a
504
504b
524
548a
548b
516
520
512
548d
540
500
532
528

504b
536b
536c
504
548c
536a
520
516
548a
500
512
540
504a
532

500"
504a"
536d"
536a"
536c"
536b"
536e"
524"
548e"
548a"
528"
504"
548d"
548f"
532"
512"
516"
520"
504b"

504b"
520"
516"
536e"
536b"
536c"
536a"
548c"
548e"
536d"
500"
504"
548a"
504a"
512"
532"

VACUUM TOOLS

CROSS-REFERENCE TO RELATED APPLICATIONS

This application claims priority to U.S. Non-Provisional patent application Ser. No. 18/582,883 filed on Feb. 21, 2024, which claims priority to U.S. Non-Provisional patent application Ser. No. 17/058,813 filed on Nov. 25, 2020, which is a national phase filing of International Application No. PCT/US2020/039652 filed on Jun. 25, 2020, which claims priority to U.S. Provisional Patent Application No. 63/000,656 filed on Mar. 27, 2020, U.S. Provisional Patent Application No. 62/980,041 filed on Feb. 21, 2020, U.S. Provisional Patent Application No. 62/955,070 filed on Dec. 30, 2019, and U.S. Provisional Patent Application No. 62/866,883 filed on Jun. 26, 2019, the entire contents of each of which are incorporated herein by reference.

FIELD OF INVENTION

The present invention relates to vacuum cleaners, and more particularly to vacuum tools for use with a vacuum cleaner.

SUMMARY

The present invention provides, in one aspect, a vacuum tool configured to be removably coupled to hose or wand of a vacuum and including a body having a first end, a second end, and a first longitudinal axis extending between the first end and the second end, a head coupled to the first end of the body, a connection portion coupled to the second end of the body and configured to couple the body to a hose or wand of a vacuum cleaner; and a brush coupled to the head, wherein the brush includes an elongate support defining a second axis perpendicular to the longitudinal axis of the body and configured to couple the brush to the head, and a plurality of bristles positioned on the elongate support.

The present invention provides, in another aspect, a vacuum tool configured to be removably coupled to a hose or wand of a vacuum and including a body including a first end, a second end, and a longitudinal axis extending between the first end and the second end, a head coupled to the first end of the body, a connection portion coupled to the second end of the body and configured to couple the body to a hose or wand of a vacuum cleaner, and a non-marring coating applied to at least one of the body, the head, and the connection portion, wherein the non-marring coating is composed of an elastomeric material.

The present invention provides, in another aspect, a vacuum tool configured to be removably coupled to hose or wand of a vacuum and including a body including a first end, a second end, and a longitudinal axis extending through the first end and the second end, a head coupled to the first end of the body, a connection portion coupled to the second end of the body and configured to couple the body to a hose or wand of a vacuum cleaner, and a first magnet coupled to the head.

Other features and aspects of the invention will become apparent by consideration of the following detailed description and accompanying drawings.

DETAILED DESCRIPTION

Figure 1A:
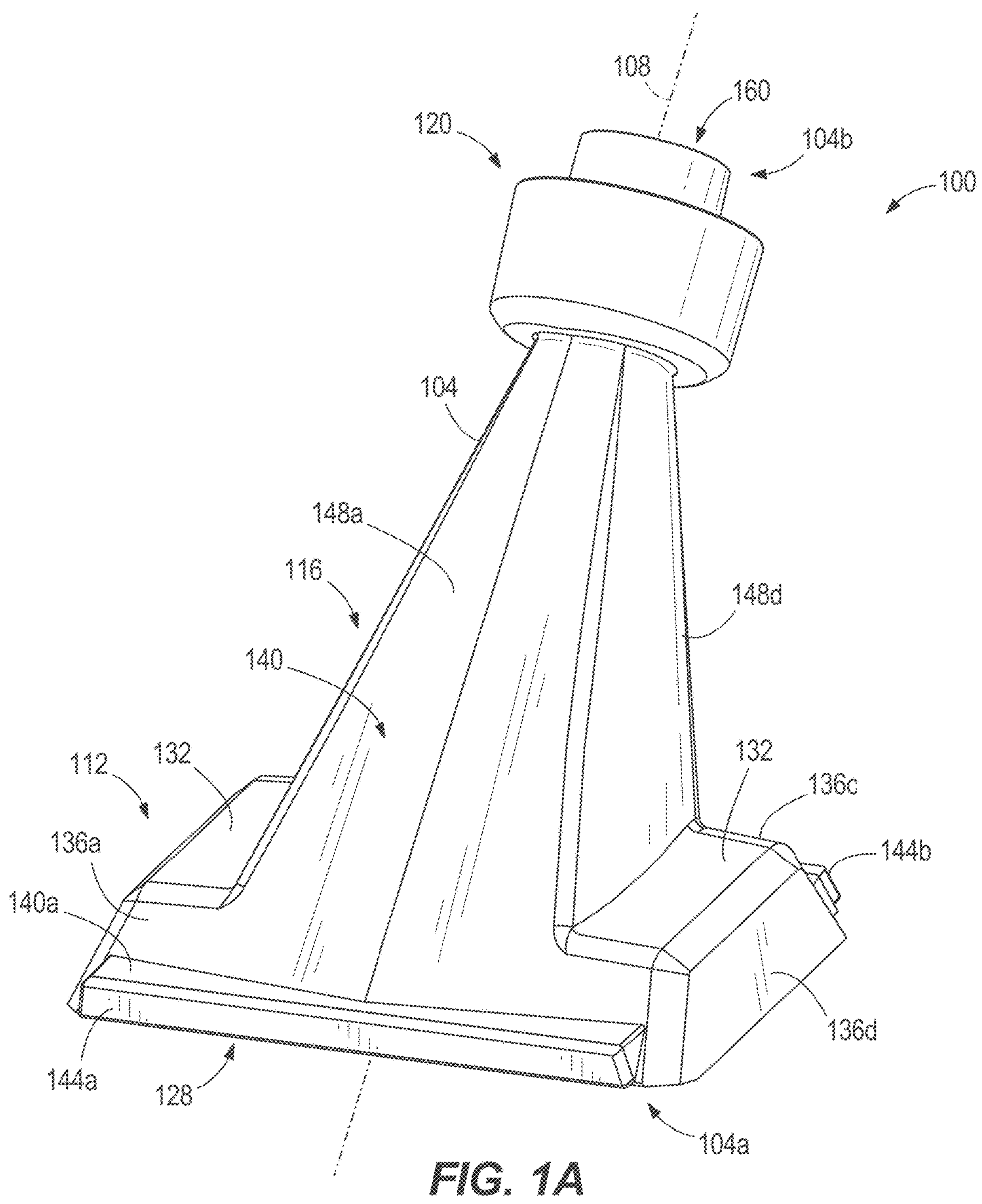
FIG. 1A is a perspective view of a vacuum tool according to one embodiment of the invention.

Before any embodiments are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways. It should be understood that the description of specific embodiments is not intended to limit the disclosure from covering all modifications, equivalents and alternatives falling within the spirit and scope of the disclosure as defined in the appended claims. Also, it is to be understood that the phraseology and terminology used herein is for the purpose of description and should not be regarded as limiting. For example, use of relative directional terms such as "right," "left," "front," "back," "lower," "upper," "over," "under," "up," "down," "top," "bottom," "vertical," and "horizontal," "left," "right," as well as derivatives of such terms (e.g., "downwardly" and "upwardly") should be construed to refer to exemplary orientation as then described or as shown in the drawing under discussion. These relative terms are for convenience of description and do not require that the apparatus be constructed or operated in a particular orientation.

Disclosed herein illustrate and described are a variety of vacuum tools for use in different applications and work environments. Each of the vacuum tools is capable of being removably coupled to a hose or wand that is in communication with a vacuum configured for use at a worksite or similar environment. Each of the vacuum tools illustrated and described herein may include a universal coupler, which will be described in greater detail below. It should be understood that any of the embodiments shown and described herein may include the universal coupler even if not explicitly shown or discussed.

FIGS. 1A-1K illustrate exemplary embodiments of a vacuum tool 100 operable to separate metal from other debris during a vacuum operation, thereby allowing for easy retrieval of the metal and preventing damage to the hose and other components of the vacuum.

The embodiment of the vacuum tool 100 shown in FIGS. 1A-1H includes a body 104 having a first end 104*a*, a second end 104*b* opposite the first end 104*a*, and a longitudinal axis 108 extending between the first end 104*a* and the second end 104*b*. The body 104 further includes a base portion 112, an intermediate portion 116, and a connection portion 120. The base portion 112 is positioned adjacent the first end 104*a*, the connection portion 120 is positioned adjacent the second end 104*b*, and the intermediate portion 116 is positioned between the base portion 112 and the connection portion 120. In the exemplary embodiments, the base portion 112 is integrally formed with the intermediate portion 116, and the intermediate portion 116 is integrally formed with the connection portion 120. In other embodiments, the base portion 112, intermediate portion 116, and connection portion 120 may be formed as separate parts assembled together as a single unit. The tool 100 further includes an opening 124 in the base portion 112 extending through the body 104 from the first end 104*a* to the second end 104*b*.

The base portion 112 and the opening 124 define an inlet 128 for collecting dirt and debris and a cavity in fluid communication with the inlet and tapering in a direction away from the inlet. In the exemplary embodiments, the base portion 112 is generally rectangular (e.g., a frustopyramidal base portion as shown in FIG. 1A) and includes a main wall 132, and four major sidewalls 136*a*, 136*b*, 136*c*, 136*d* extending from the main wall 132. The base portion 112 can also be shaped in a variety of other different configurations. Specifically, in the illustrated embodiment, the base portion 112 includes a first sidewall 136*a*, a second sidewall 136*b*, a third sidewall 136*c*, and a fourth sidewall 136*d*. The first sidewall 136*a* is positioned opposite the second sidewall 136*b*, such that the first and second sidewalls 136*a*, 136*b* are oriented parallel relative to each other. The third and fourth sidewalls 136*c*, 136*d* are positioned between the first sidewall 136*a* and the second sidewall 136*b*. The third sidewall 136*c* is positioned opposite the fourth sidewall 136*d*, such that the third and fourth sidewalls 136*c*, 136*d* are oriented parallel relative to each other. In some embodiments, a distal end of some of all of the sidewalls 136*a*, 136*b*, 136*c*, 136*d* may include teeth and/or bristles configured to scrub a work surface. In addition to the four major sidewalls 136*a-d*, the illustrated embodiment is shown having chamfered corners between the major sidewalls 136*a-d*, such that the base portion has eight sidewalls including the four major sidewalls 136*a-d*.

The base portion 112 includes a first ledge 140*a* coupled to the first sidewall 136*a*, and a second ledge 140*b* coupled to the second sidewall 136*b*. The ledges 140*a*, 140*b* extend along and protrude outward from the first and second sidewalls 136*a*, 136*b*. With continued reference to FIGS. 1A-1H, a first magnet 144*a* is coupled to the first ledge 140*a* and a second magnet 144*b* is coupled to the second ledge 140*b*. The magnets 144*a*, 144*b* in the illustrated embodiments are generally rectangular, elongate strips positioned along an outer edge of the ledges 140*a*, 140*b*. In some embodiments, the magnets 144*a*, 144*b* may have alternative different shapes and sizes, and the base portion 112 may include fewer or additional magnets. In other embodiments, the magnets 144*a*, 144*b* may be positioned on any surface of the base portion 112 (e.g., the third and fourth sidewalls 136*c*, 136*d*). In the illustrated embodiments, the magnets 144*a*, 144*b* are positioned on portions of the base portion 112 adjacent the outer periphery of the inlet 128. In some embodiments, the magnets 144*a*, 144*b* may be positioned on alternative parts of the body 104.

Figures 1B, 1C:
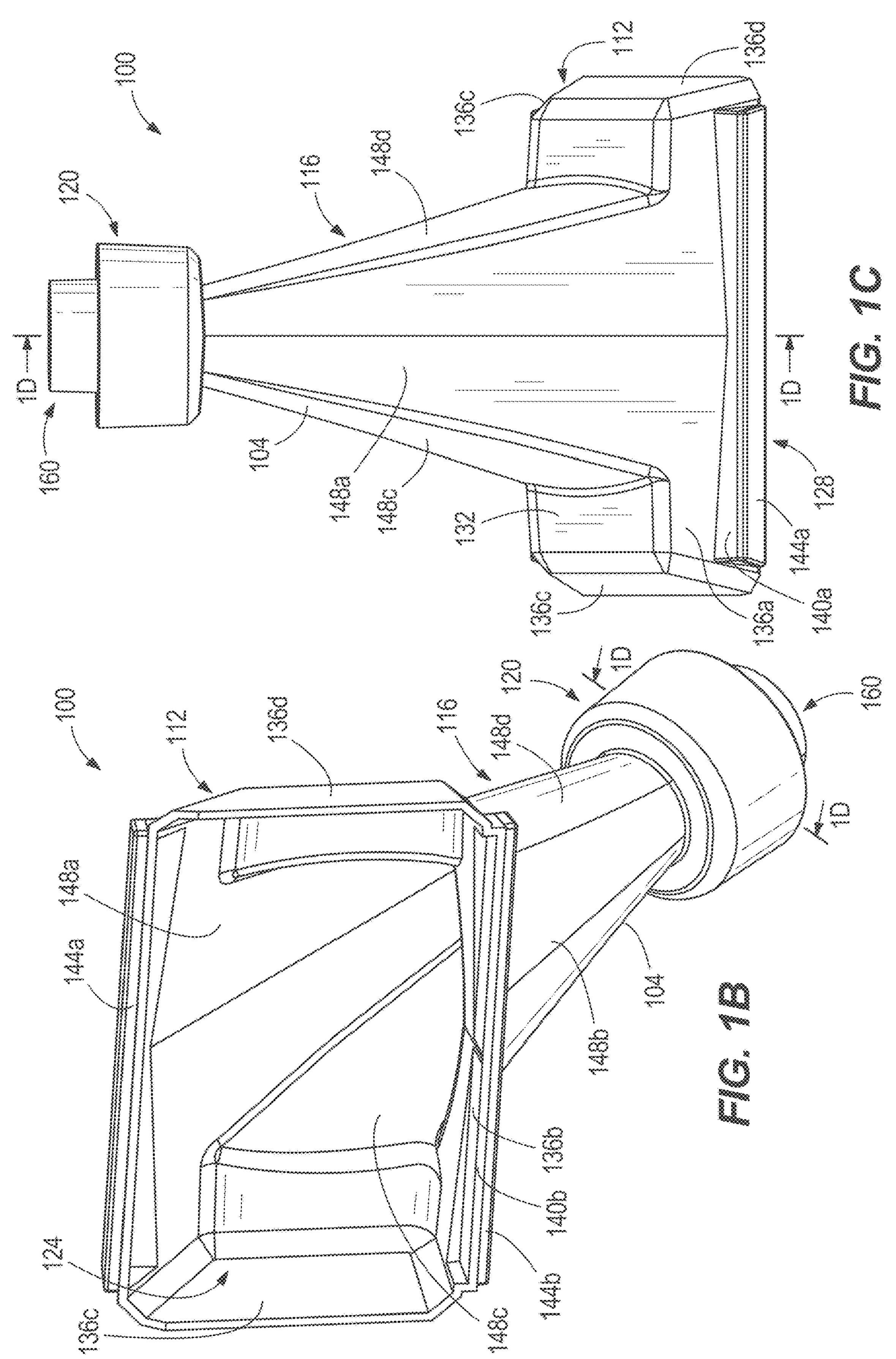
FIG. 1B is another perspective view of the vacuum tool of FIG. 1A.
FIG. 1C is a top view of the vacuum tool of FIG. 1A.
Figure 1D:
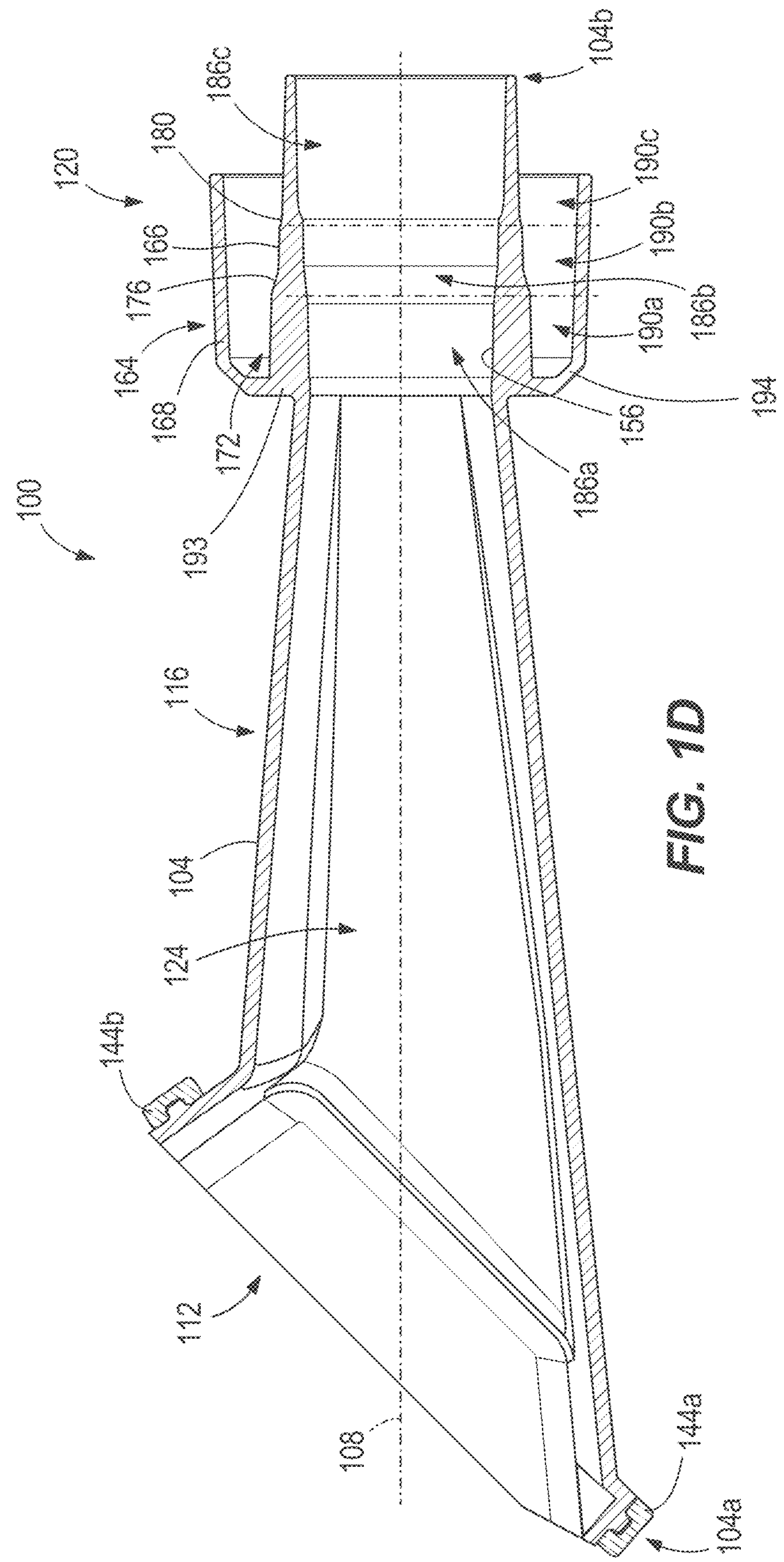
FIG. 1D is a cross-sectional view of the vacuum tool of FIG. 1A, taken along section line 1D-1D of FIGS. 1B and 1C.

The intermediate portion 116 includes a first wall 148*a*, a second wall 148*b* opposite the first wall 148*a*, a third wall 148*c*, and a fourth wall 148*d* opposite the third wall 148*c*. The walls 148*a-d* define a conduit through the intermediate portion 116 as shown in FIGS. 1B and 1D. The third wall 148*c* and the fourth wall 148*d* extend between the first wall 148*a* and the second wall 148*b*. In the illustrated embodiment, the first sidewall 136*a* of the base portion 112 is coplanar and integrally formed with the first wall 148*a* of the intermediate portion 116. In other embodiments, the first sidewall 136*a* of the base portion 112 and the first wall 148*a* of the intermediate portion 116 may be positioned in different configurations relative to one another and, as mentioned above, may be formed and assembled as separate parts.

In some embodiments (FIGS. 1F-1H), the intermediate portion 116 comprises one contiguous curved wall, rather than four distinctly configured walls. Specifically, the intermediate portion 116 is formed by a first curved wall section 152 that flows into a second curved wall section 154. In the illustrated embodiment, the first curved wall section 152 is integrally formed with the connection portion 120, and the second curved wall section 154 is integrally formed with the base portion 112. The first curved wall section 152 includes a first end 152*a* positioned adjacent the connection portion 120, and a second end 152*b* positioned adjacent the second curved wall 154. Similarly, the second curved wall 154 includes a first end 154*a* positioned adjacent the second end 152*b* of the first curved wall 152, and a second end 154*b* positioned adjacent the base portion 112 (FIG. 1H). The curved walls 152, 154 are tapered, cylindrical walls. That is, a diameter of the first curved wall 152 increases from the first end 152*a* to the second end 152*b*, and a diameter of the second curved wall 154 increases from the first end 154*a* to the second end 154*b*.

With reference to FIGS. 1A-1H, the connection portion 120 is integrally formed with or otherwise coupled to and extends from the second end 104*b* of the body 104. For example, in some embodiments connection portion 120 may be rotatably coupled by a swivel joint to the second end 104*b* of the body 104. The connection portion 120 includes a conduit 156 formed by an inner wall 166 that defines an outlet 160 that is in fluid communication with the opening 160. The outlet 160 is in fluid communication with the wand or hose of the vacuum cleaner. In the illustrated embodiments, the opening 124 is tapered in a direction from the inlet 128 to the outlet 160 to funnel dirt and debris from the inlet 128 to the outlet 160. That is, a diameter of the opening 124 decreases from the inlet 128 to the outlet 160. In other embodiments, the opening 124 may be substantially constant. In the illustrated embodiments, the connection portion 120 is substantially parallel to the longitudinal axis 108. However, in alterative embodiments, the connection portion 120 may be angled relative to the longitudinal axis 108. As shown in FIG. 1D, the inlet 128 lies along an inlet plane, the outlet 160 lies along an outlet plane, and the inlet and outlet planes form an oblique angle relative to each other.

Figure 1E:
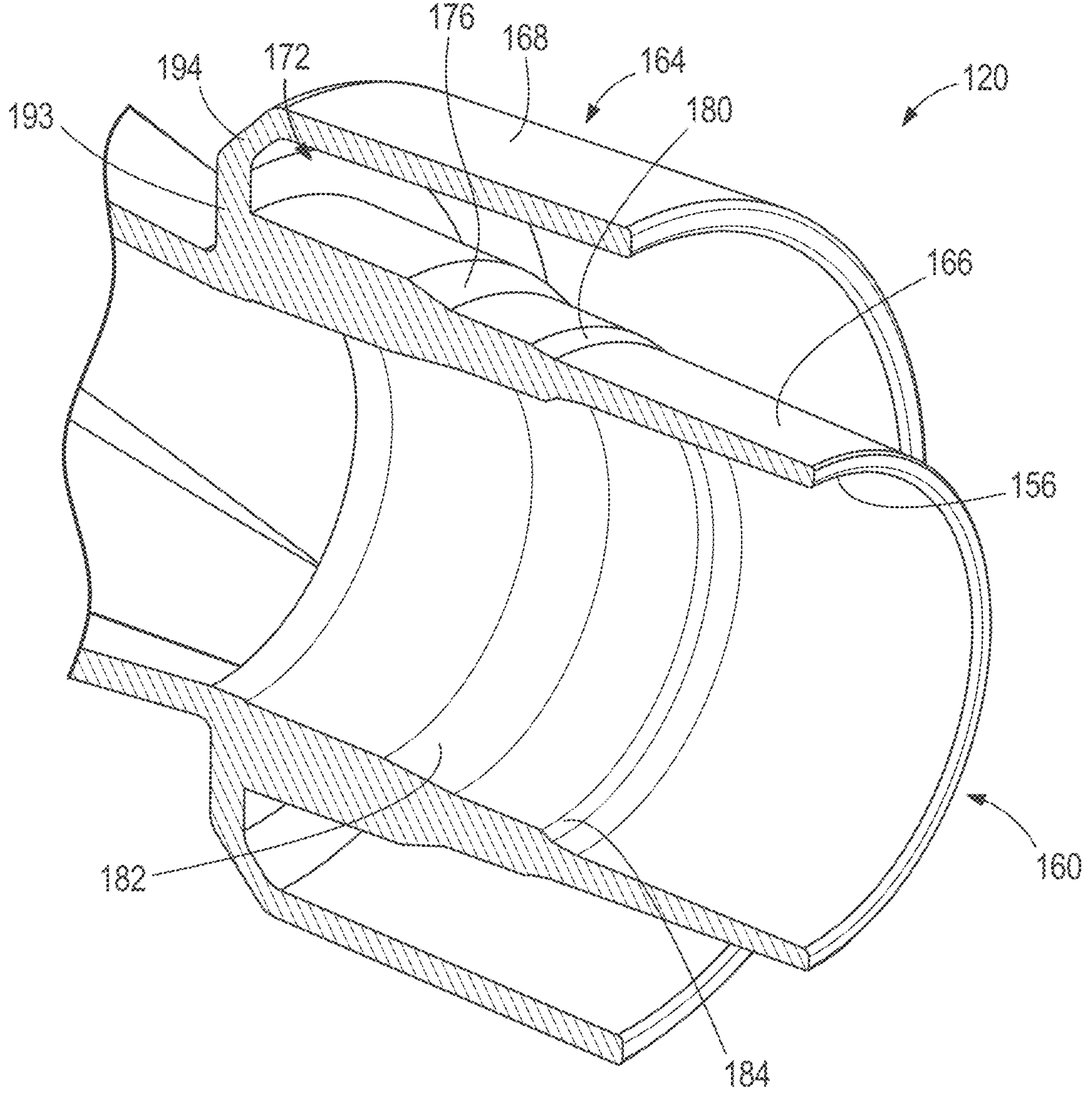
FIG. 1E is an enlarged, perspective cross-sectional view of a universal coupler of the vacuum tool of FIG. 1A.
Figure 1F:
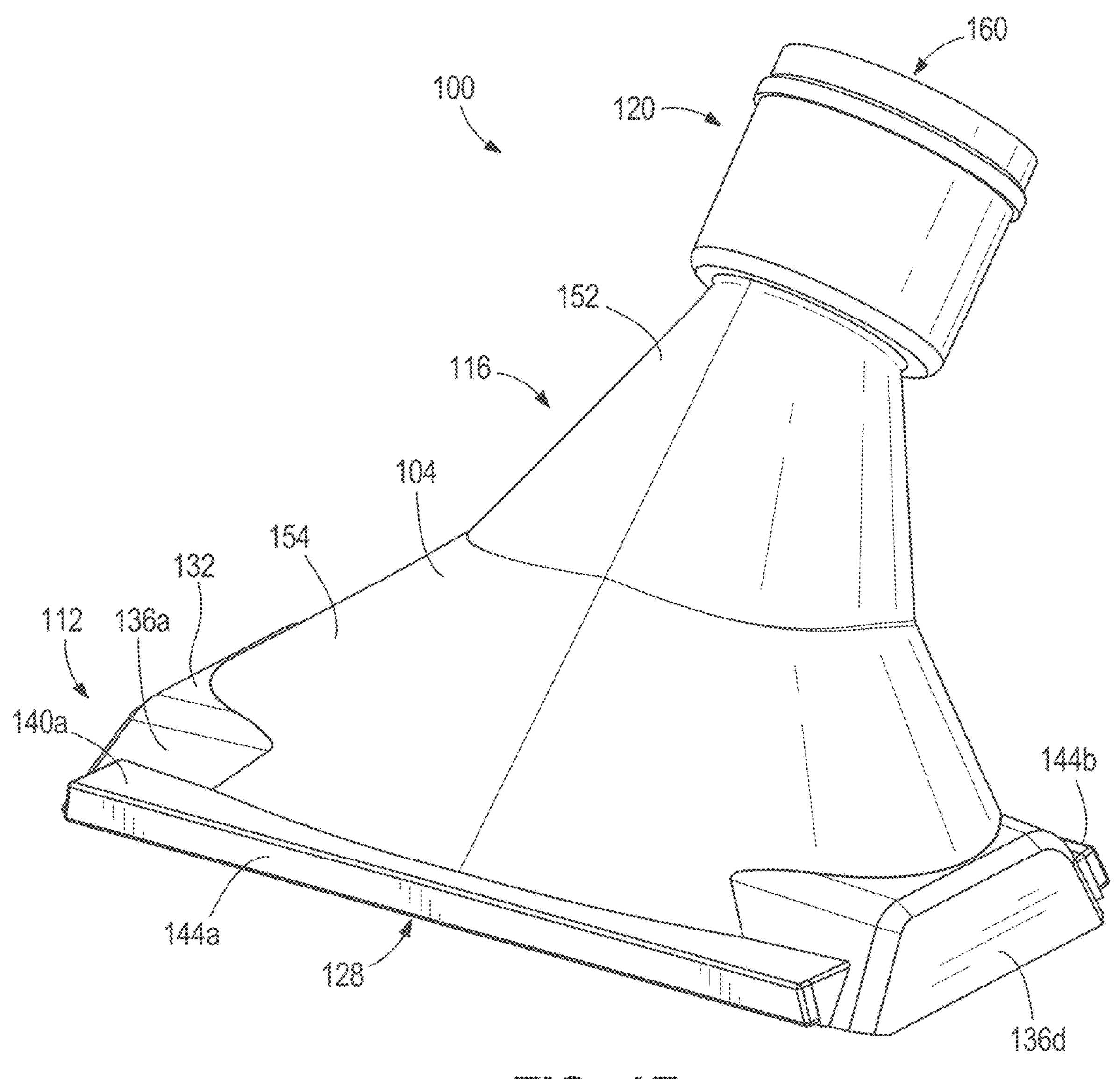
FIG. 1F is a perspective view of another vacuum tool according to another embodiment of the invention.
Figures 1G, 1H:
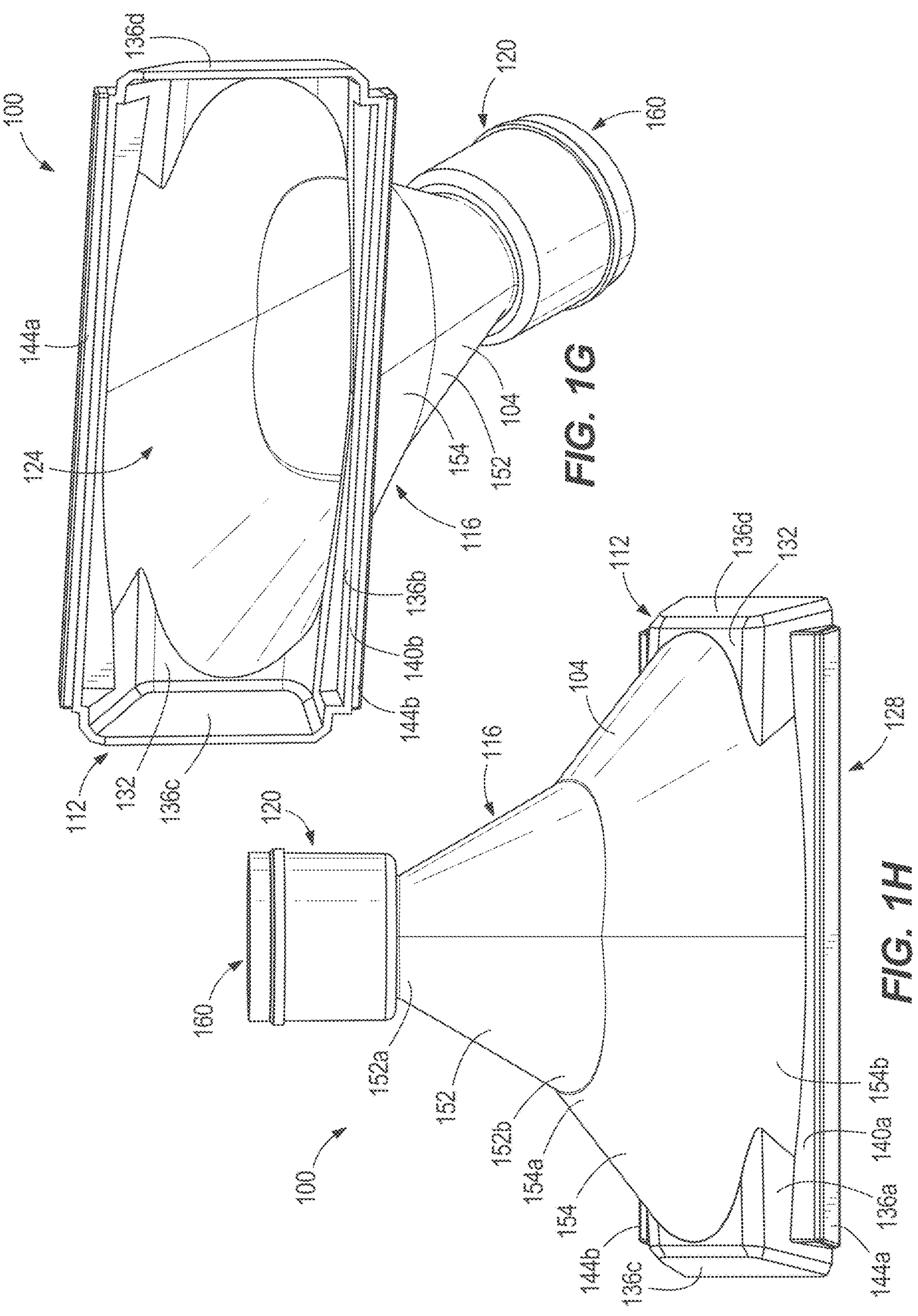
FIG. 1G is another perspective view of the vacuum tool of FIG. 1F.
FIG. 1H is a top view of the vacuum tool of FIG. 1F.

With continued reference to FIGS. 1A-1E, the connection portion 120 may include a universal coupler 164 extending from the conduit 156 and configured to couple to vacuum hoses and wands having different diameters. In some embodiments, the universal coupler provides an annular channel formed between an inner wall (which itself forms the conduit 156) and an outer wall that surrounds a majority of the inner wall, the annular channel having a varying diameter to receive and couple different sized hoses and wands. In the embodiment of FIGS. 1D and 1E, the universal coupler 164 includes a first cylindrical wall (e.g., the inner wall) 166, a second cylindrical wall (e.g., the outer wall) 168, and a channel (e.g., the annular channel) 172 formed therebetween. The second cylindrical wall 168 surrounds the first cylindrical wall 166, such that the second cylindrical wall 168 has a diameter greater than a diameter of the first cylindrical wall 166 to space the two walls apart and form channel 172 between the two walls. The first cylindrical wall 166 is tapered in a direction from the intermediate portion 116 toward the second end 104*b* of the body 104. Also shown in the embodiment of FIGS. 1D and 1E, the connection portion 120 includes an annular end wall 193 surrounding the intermediate portion 116 where the connection portion 120 couples to the intermediate portion 116, a flare wall 194 extending radially outwardly from the annular end wall 193 at an oblique angle, and the outer wall 168 extending from the flare wall 194. As can be seen in FIG. 1D, an extended imaginary line of the outer wall 168 intersects perpendicularly with an extended imaginary line of the annular end wall 193 of the connection portion 120. Similarly, an extended imaginary line of the inner wall 166 intersects perpendicularly with the extended imaginary line of the annular end wall 193 of the connection portion 120.

With reference to FIGS. 1D and 1E, the first cylindrical wall 166 includes a first shoulder 176 and a second shoulder 180 formed in an outer surface of the first cylindrical wall 166. The first and second shoulders 176, 180 divide the channel 172 into a first section 190*a*, a second section 190*b*, and a third section 190*c*, such that each section 190*a*-190*c* has a different diameter. Accordingly, hoses or wands having different diameters may be coupled to the first cylindrical wall 166 within one of the sections 190*a*-190*c* of channel 172 to secure the hose or wand to wall 166 in channel 172. In some embodiments, the first cylindrical wall 166 may include fewer or additional shoulders. In further embodiments, the second cylindrical wall 168 may be tapered, or both the first and second cylindrical walls 166, 168 may be tapered.

Instead of or in addition to channel 172, with continued reference to FIGS. 1D and 1E, the conduit 156 may be tapered in a direction from the second end 104*b* of the body 104 toward the intermediate portion 116. An inner surface of the conduit 156 includes a third shoulder 182 and a fourth shoulder 184 extending into the opening 124. The third and fourth shoulders 182, 184 divide the conduit 156 into a fourth section 186*a*, a fifth section 186*b*, and a sixth section 186*c*, such that each section 186*a*-186*c* has a different diameter. Furthermore, the fourth section 186*a*, the fifth section 186*b*, and the sixth section 186*c* have different diameters than the first section 190*a*, the second section 190*b*, and a third section 190*c*. Accordingly, hoses or wands having different diameters may be received within one of the sections 186*a*-186*c* within the conduit 156, thereby coupling the hose and/or wand to the connection portion 120. In some embodiments, the conduit 156 may include fewer or additional shoulders.

In the illustrated embodiment, the universal coupler 164 is integrally formed with the connection portion 120 and the conduit 156. In other embodiments, the universal coupler 164 may be otherwise coupled to the conduit 156, such as by a swivel joint. In some embodiments, such as in FIGS. 1F-1H, the connection portion 120 may include a different coupler configuration.

In some embodiments, the base portion 112 of the tool 100 has a width (measured between the first and second sidewalls 136*a*, 136*b* of the base portion 112) of approximately 7-10 inches. In the illustrated embodiments, the width is approximately 178 mm. In alternative embodiments, the tool 100 may have a smaller or greater width. The tool 100 additionally has a height (measured between the first end 104*a* of the body 104 and the second end 104*b* of the body 104) of approximately 170 mm. In alternative embodiments, the tool 100 may have a smaller or greater height.

In operation, suction generated by the vacuum cleaner and applied through the connection portion 120 draws dirt and debris from a work surface into the inlet 128. The magnets 144*a*, 144*b*, which are positioned at opposite peripheries of the inlet 128, attract and hold metal debris picked up from the work surface before the inlet 128 would pass over the metal debris so that the metal debris is not drawn into the inlet 128. Thus, metal debris present on the work surface is not drawn into the inlet by the suction generated by the vacuum cleaner, which otherwise might damage the vacuum cleaner or its hose.

Figure 1I:
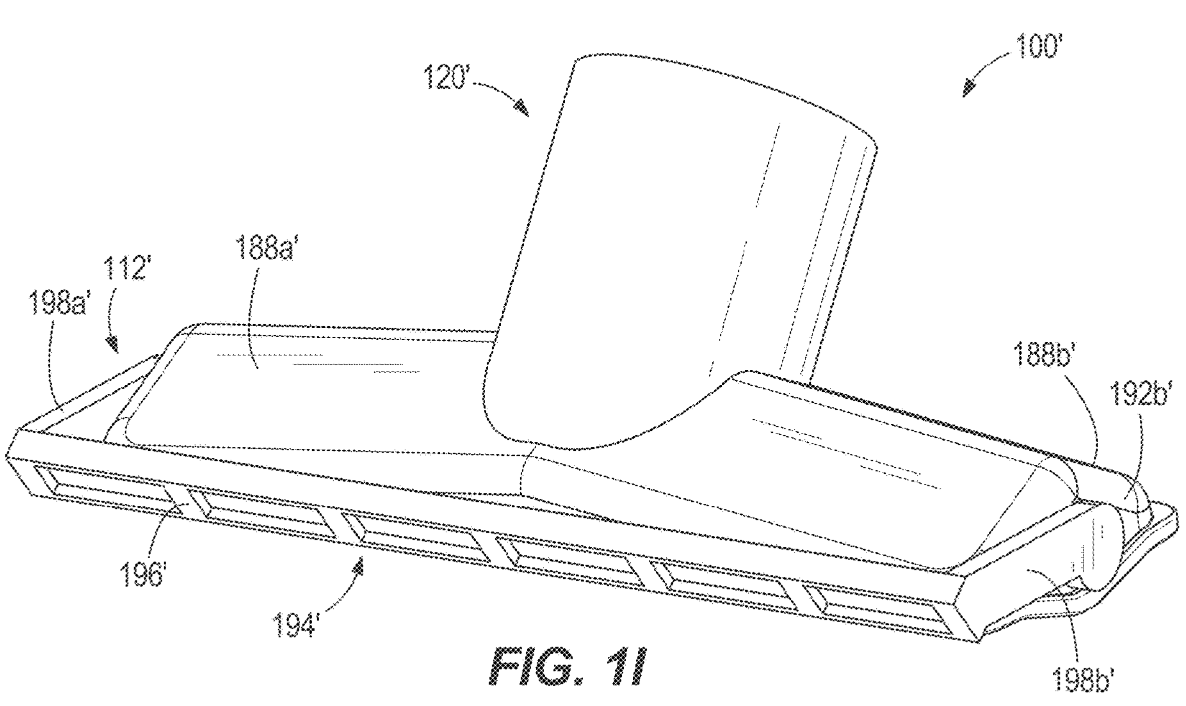
FIG. 1I is a perspective view of another vacuum tool according to another embodiment of the invention.
Figure 1J:
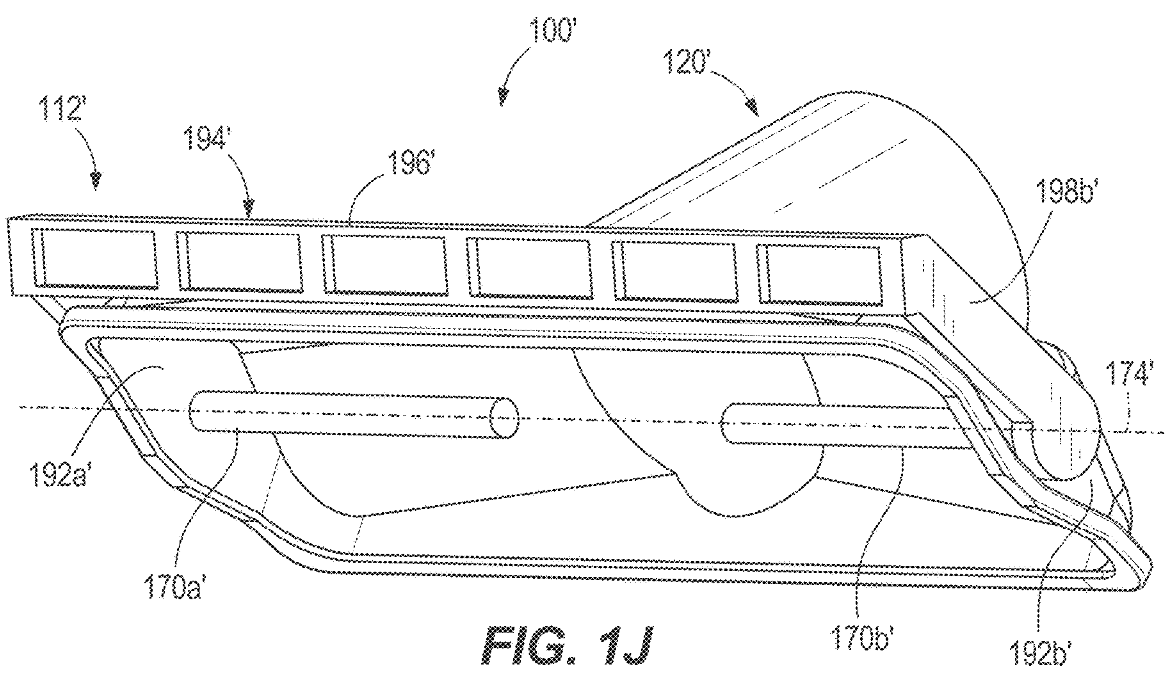
FIG. 1J is another perspective view of the vacuum tool of FIG. 1I.
Figure 1K:
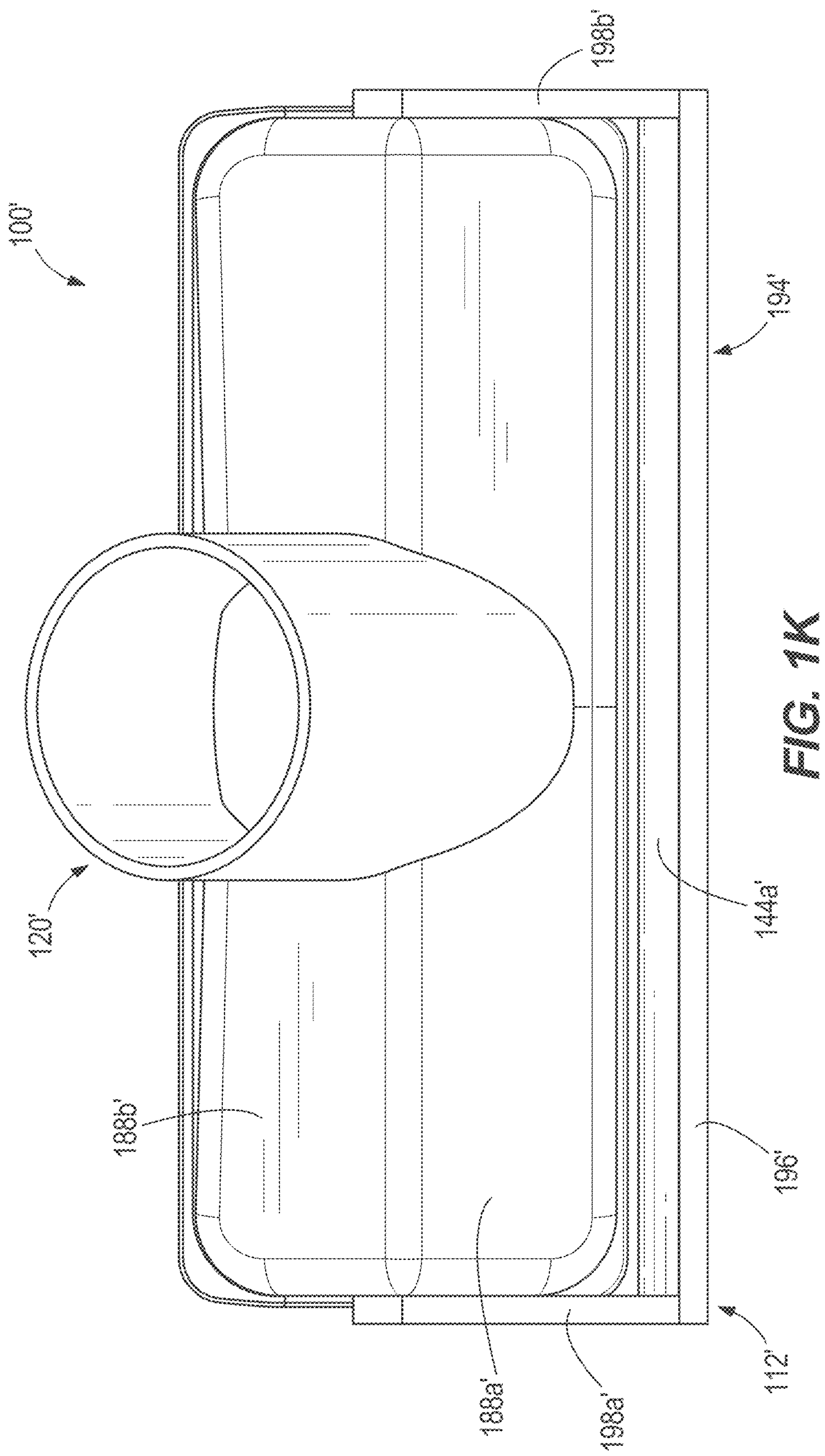
FIG. 1K is a top view of the vacuum tool of FIG. 1I.

FIGS. 1I-1K illustrate another embodiment of a tool 100', with like components designated with an apostrophe. The tool 100' is substantially identical to the tool 100, with a different base portion configuration.

As illustrated in FIGS. 1I-1K, the tool 100' includes a base portion 112' coupled to a connection portion 120'. The base portion 112' includes a first wall 188*a'* angled relative to a second wall 188*b'*, a first sidewall 192*a'*, and a second sidewall 192*b'*. The first and second walls 188*a'*, 188*b'* are angled relative to each other.

The base portion 112' further includes a rotating member, or bar, 194'. The member 194' rotates and locks in up (out of the way) and down (deployed for use) positions. More specifically, the member 194' is movably (e.g., pivotably) coupled to the base portion 112'. The member 194' includes an elongate portion 196' that extends between a first coupling portion 198*a'* and a second coupling portion 198*b'*. The first and second coupling portions 198*a'*, 198*b'* are movably (e.g., pivotably) coupled (e.g., by fasteners or the like) to the first and second sidewalls 192*a'*, 192*b'*, respectively. In the illustrated embodiment of FIG. 1J, the first and second coupling portions 198*a'*, 198*b'* are coupled to the sidewalls 192*a'*, 192*b'* via a first pin 170*a'* and a second pin 170*b'*. The first and second pins 170*a'*, 170*b'* are positioned between the first and second sidewalls 192*a'*, 192*b'*. The first pin 170*a'* extends through the first sidewall 192*a'* and the second pin 170*b'* extends through the second sidewall 192*b'*. The pins 170*a'*, 170*b'* define an axis 174' that is parallel to a longitudinal axis of the tool 100'. The first and second coupling portions 198*a'*, 198*b'* are pivotable about the axis 174'.

One or more magnets 144*a'* are coupled to the member 194' and are configured to selectively engage or otherwise be positioned adjacent to a work surface. The magnets 144*a'* are positioned on a first surface of the member 194'. The plane defined by the first surface may be positioned at a desired angle relative to the longitudinal axes of the coupling portions 198*a'*, 198*b'*. The member 194' is movable (e.g., pivotable) about the axis 174' between a first, stowed position in which the magnets 144*a'* are spaced away from the work surface and a second, use or deployed position in which the magnets 144*a'* engage or are otherwise positioned adjacent to the work surface. The plane defined by the first surface may be positioned at a desired angle (e.g., oblique angle) relative to the longitudinal axes of the coupling portions 198*a'*, 198*b'* so that the plane of the first surface is also angled relative to the plane defined by the work surface in the use position. In some embodiments, the plane defined by the first surface may be positioned parallel to the longitudinal axes of the coupling portions 198*a'*, 198*b'* and, therefore, the work surface as well, when in the use position.

In some embodiments, there may be fewer or more magnets coupled to the first surface of the elongate portion 196'. In yet other embodiments, all or a portion of the member 194' may be magnetized in any suitable way.

FIGS. 2A-2D illustrate a vacuum tool 200 according to another embodiment that includes brush bristles that facilitate scrubbing of various types of surfaces.

The exemplary embodiment of the vacuum tool 200 shown in FIGS. 2A-2E includes a body 204 having a first end 204*a*, a second end 204*b* opposite the first end 204*a*, and a longitudinal axis 208 (FIG. 2C) extending between the first end 204*a* and the second end 204*b*. The body 204 further includes a head portion 212, an intermediate portion 216, and a connection portion 220. The head portion 212 is positioned adjacent the first end 204*a*, the connection portion 220 is positioned adjacent the second end 204*b*, and the intermediate portion 216 is positioned between the head portion 212 and the connection portion 220. In the illustrated embodiment, the head portion 212 is integrally formed with the intermediate portion 216, and the intermediate portion 216 is integrally formed with the connection portion 220. In other embodiments, the head portion 212, intermediate portion 216, and connection portion 220 may be formed as separate parts assembled together as a single unit. The tool 200 further includes an opening 224 extending through the body 204 from the first end 204*a* to the second end 204*b*. At least a portion of the opening 224 is parallel to the longitudinal axis 208.

The head portion 212 and the opening 224 define an inlet 228 for collecting dirt and debris. The head portion 212 includes a top wall 232, a bottom wall 236, a first sidewall 240*a*, a second sidewall 240*b*, a first tapered sidewall 244*a*, and a second tapered sidewall 244*b*. The top wall 232 is positioned opposite the bottom wall 236, such that the top wall 232 and the bottom wall 236 are oriented parallel relative to each other. Similarly, the first sidewall 240*a* is positioned opposite the second sidewall 240*b*, such that the first and second sidewalls 240*a*, 240*b* are oriented parallel relative to each other. The first tapered sidewall 244*a* and the second tapered sidewall 244*b* are tapered such that the width of the opening 224 extending through the head portion 212 decreases from the first end 204*a* of the body 204 (e.g., adjacent the inlet 228) toward the second end 204*b* of the body 204 to funnel dirt and debris drawn into the inlet 228 to the intermediate portion 216.

The head portion 212 further includes a first aperture 248*a* and a second aperture 248*b* (FIG. 2D) extending through the first sidewall 240*a*, and a third aperture 248*c* and a fourth aperture 248*d* (FIGS. 2A-B, 2D) extending through the second sidewall 240*b*. In the illustrated embodiments, the apertures 248*a*-248*d* are generally cylindrical. However, in alternative embodiments, the apertures 248*a*-248*d* may be formed in alternative shapes and sizes. With reference to FIG. 2D, the first sidewall 240*a* includes a first groove 252*a* and a second groove 252*b* formed in an inner surface of the first sidewall 240*a*. The first groove 252*a* extends from the first aperture 248*a* to the outer end of the first sidewall 240*a*, and the second groove 252*b* extends from the second aperture 248*b* to the outer end of the first sidewall 240*a*. Similarly, the second sidewall 240*b* includes a third groove 252*c* and fourth groove 252*d* formed in an inner surface of the second sidewall 240*b*. The third groove 252*c* extends from the third aperture 248*c* to the outer end of the second sidewall 240*b*, and the fourth groove 252*d* extending from the fourth aperture 248*d* to the outer end of the second sidewall 240*b*.

With continued reference to FIG. 2D, the tool 200 includes a brush member 256 removably coupled to the head portion 212. The brush member 256 can be selectively positioned within the head portion 212 in a first position and a second position. The member 256 includes an elongate support portion 260 that extends between a first coupling portion 264*a* and a second coupling portion 264*b*. A series of several bristles 268 are coupled to the elongate support portion 260 and are configured to selectively engage or otherwise be positioned adjacent to a work surface during use. The bristles 268 extend outwardly away from a first surface of the elongate support portion 260. The bristles 268 positioned on the member 256 are configured to loosen dirt and debris caked on a work surface to help clean and/or protect the work surface from damage. The position of the brush member 256 within the head portion 212 allows air to flow above and/or below the bristles 268 during use. More specifically, the position of the member 256 within the head portion 212 allows air to flow within a first space 266*a* between an upper side 256*a* of the brush member 256 and the top wall 232, and within a second space 266*b* between a lower side 256*b* of the brush member 256 and the bottom wall 236. In other embodiments, the brush member 256 may be disposed in an alternative position within the head portion 212. Furthermore, in some embodiments, the bristles 268 may be oriented different patterns and/or configurations. In some embodiments, the brush member 256 may additionally or alternatively include a squeegee or a soft pad extending along the elongate support portion 260 instead of the bristles 268. In some embodiments, a skirt (e.g., a rubber skirt) may be provided around the outer periphery of the opening 224 of the head portion 212 to create a seal against the work surface when scrubbing the work surface with the brush member 256.

The first and second coupling portions 264*a*, 264*b* are removably coupled to the first and second sidewalls 240*a*, 240*b*, respectively. Specifically, the first and second coupling portions 264*a*, 264*b* are shaped and sized to fit within the apertures 248*a*-248*d* formed in the sidewalls 240*a*, 240*b*. In order to position the brush member 256 within the head portion 212 in the first position, the first and second coupling portions 264*a*, 264*b* are slid along the first groove 252*a* and the third groove 252*c* and into engagement with the first aperture 248*a* and the third aperture 248*c*, respectively. Alternatively, in order to position the brush member 256 within the head portion 212 in the second position, the first and second coupling portions 264*a*, 264*b* are slid along the second groove 252*b* and the fourth groove 252*d* and into engagement with the second and fourth apertures 248*b*, 248*d*, respectively. When the brush member 256 is positioned in the first position, the brush member 256 extends along a first axis 270, which is perpendicular to the longitudinal axis 208. When the brush member 256 is positioned in the second position, the brush member 256 extends along a second axis 274, which is offset and parallel to the first axis 270. The user can selectively position the brush member 256 in the first position or the second position depending on the location of the debris relative to the head portion 212. In some embodiments, the first and second coupling portions 264*a*, 264*b* are coupled via fasteners or the like to the first and second sidewalls 240*a*, 240*b*. In some embodiments, the elongate portion 260 of the brush member 256 is rotatable about the first axis 270 and the second axis 274 during operation.

Figure 2A:
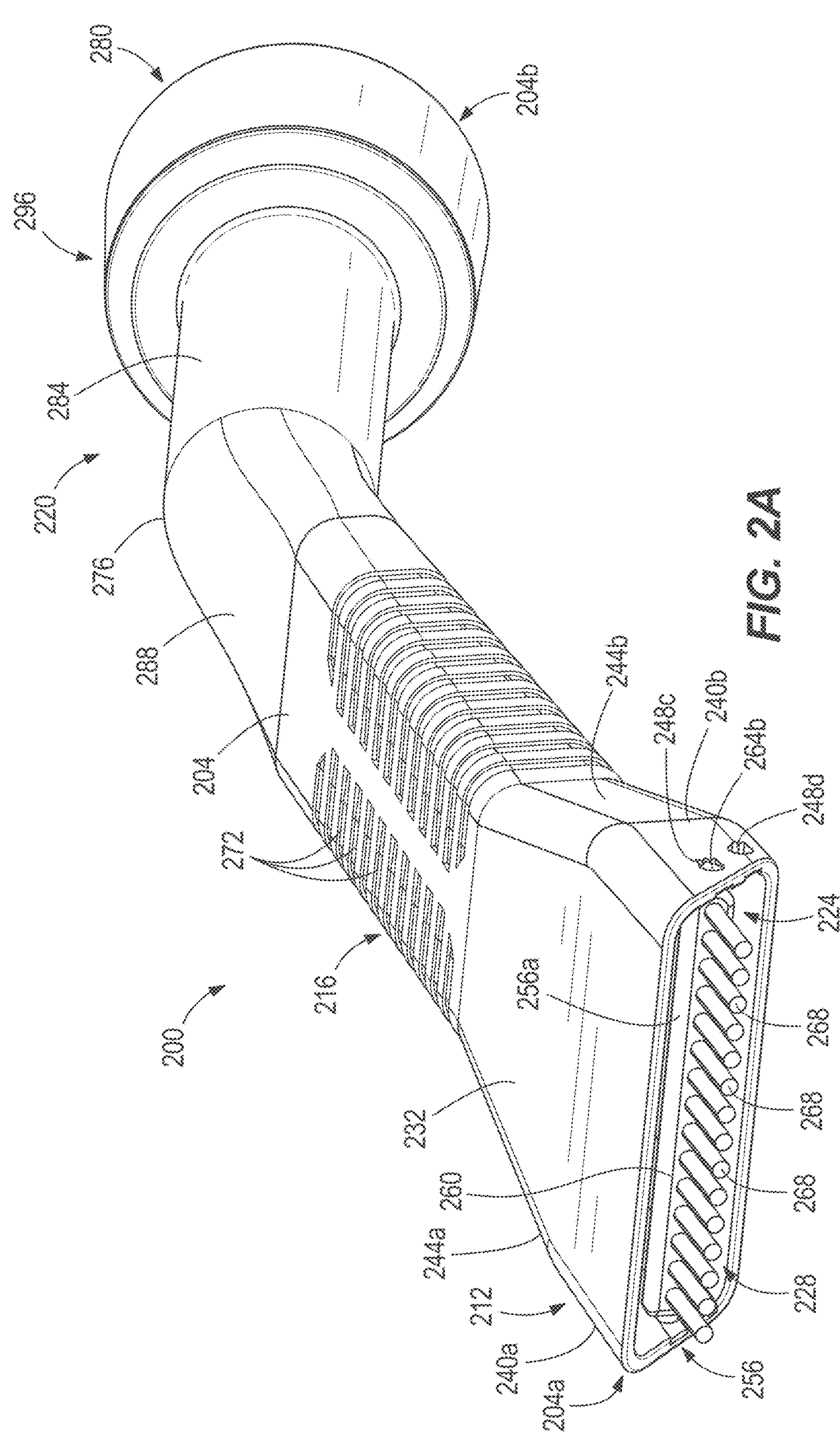
FIG. 2A is a perspective view of another vacuum tool according to another embodiment of the invention.
Figure 2B:
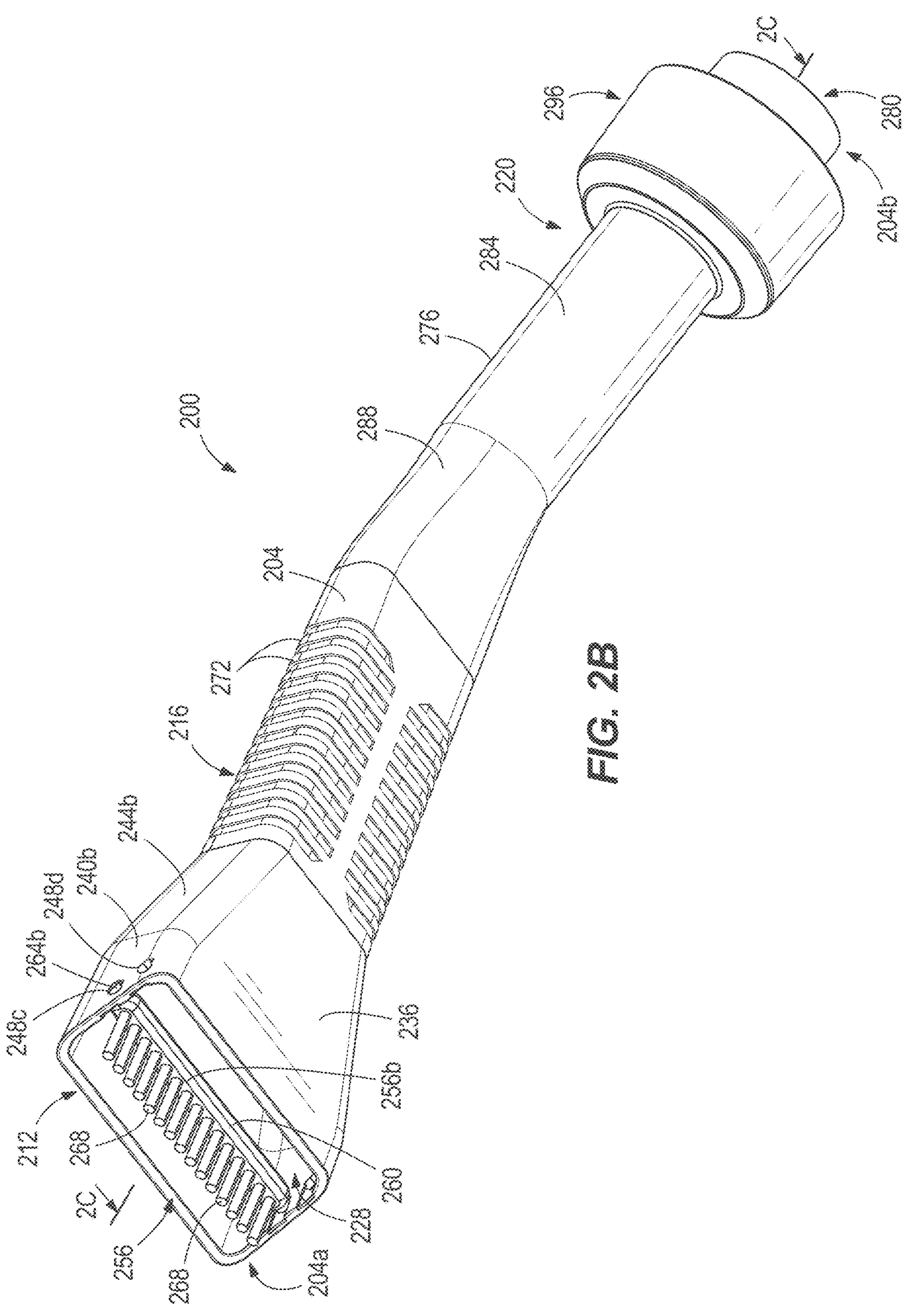
FIG. 2B is another perspective view of the vacuum tool of FIG. 2A.
Figures 2C, 2D:
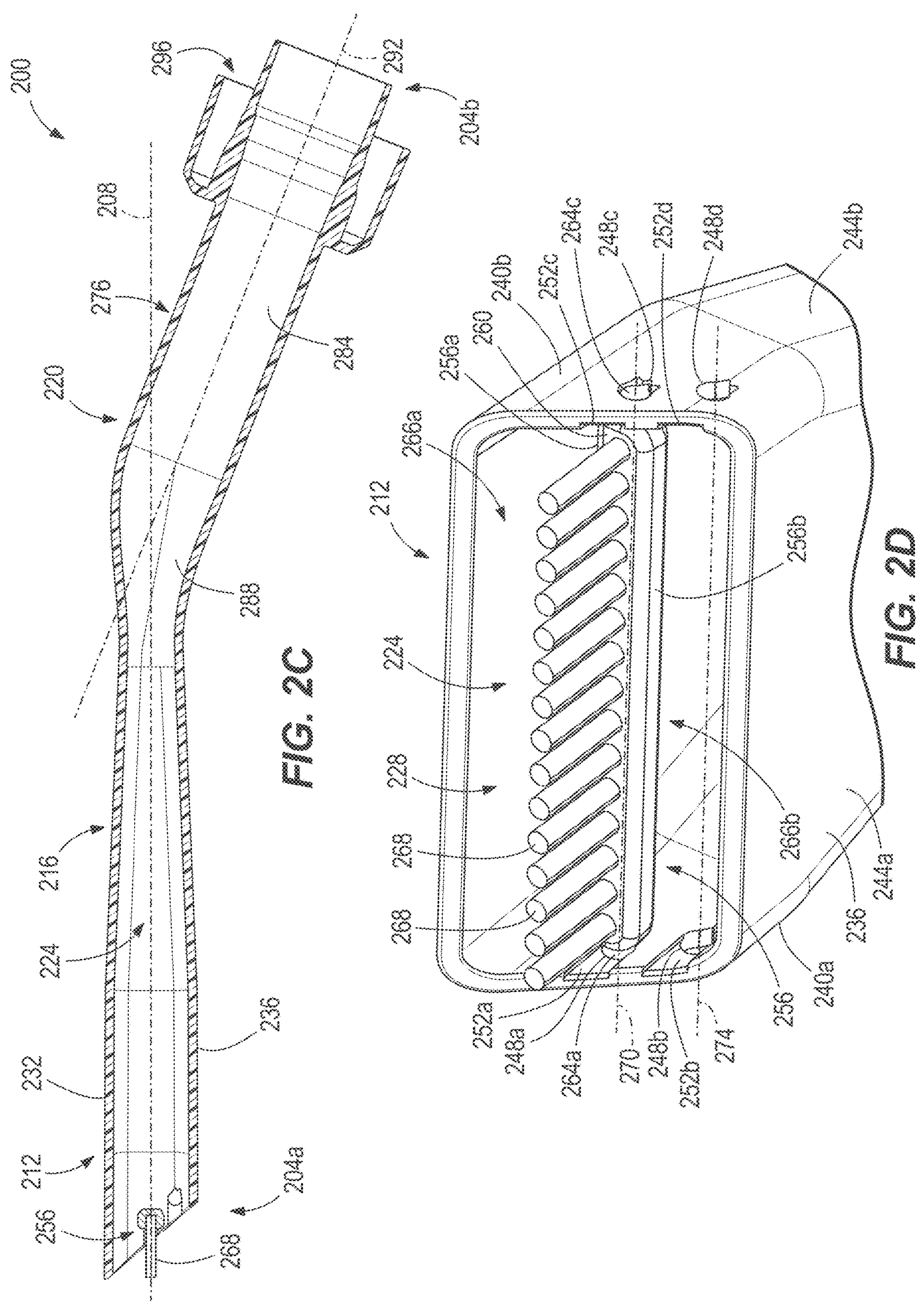
FIG. 2C is a cross-sectional view of the vacuum tool of FIG. 2A, taken along section line 2C-2C of FIG. 2B.
FIG. 2D is an enlarged perspective view of a base portion of the vacuum tool of FIG. 2A.

With reference to the embodiment illustrated in FIGS. 2A-2B, the intermediate portion 216 is a generally rectangular tube. In the illustrated embodiment, the intermediate portion 216 includes two series of opposed, parallel elongate grooves 272 formed in and extending partially around an outer surface of the intermediate portion 216. In other embodiments, the intermediate portion 216 may be formed from alternative shapes and may be tapered.

With further reference to the embodiment illustrated in FIGS. 2A-2C, the connection portion 220 may be integrally formed with or otherwise coupled to the second end 204*b* of the body 204. An outer surface of the connection portion 220 defines a gripping surface for a user to grasp during operation. The connection portion 220 includes a conduit 276 (FIG. 2C) that defines an outlet 280 that is in fluid communication with the opening 224. When attached to a wand or hose of a vacuum cleaner, the outlet 280 is in fluid communication with the interior conduit of the wand or hose. The conduit 276 includes a cylindrical portion 284 and a tapered portion 288 (FIGS. 2A, 2C). The tapered portion 288 is positioned between the intermediate portion 216 and the cylindrical portion 284. The tapered portion 288 is tapered in a direction from the inlet 228 to the outlet 280. That is, a width of portion 288 decreases in a direction from the intermediate portion 216 to the connection portion 220. In other embodiments, the entire connection portion 220 is cylindrical. With reference to FIG. 2C, the connection portion 220 extends along an axis 292 obliquely oriented relative to the longitudinal axis 208. Therefore, when positioning the tool 200 against the work surface, the head portion 212 and the intermediate portion 216 are positioned at an angle relative to the connection portion 220. More specifically, when the user is using the tool 200, the axis 292 is oriented substantially parallel to the work surface, orienting the head portion 212 and the intermediate portion 216 at an angle. As such, the user may comfortably grip the tool 200 while vacuuming dirt and debris in hard-to-reach locations. Additionally, the orientation of the connection portion 220 allows the user to apply greater force or leverage to the tool against the work surface during use.

With reference to FIGS. 2A-2C, the connection portion 220 additionally includes a universal coupler 296 extending from the conduit 276 and configured to couple to vacuum hoses and wands having different dimensions. The universal coupler 296 is substantially identical to the universal coupler 164 described above with respect to FIGS. 1A-1D. Reference is hereby made to the description of the universal coupler 164 above. In some embodiments, the connection portion 220 may include alternative configurations.

In some embodiments, the base portion 212 of the tool 200 has a width (measured between the first and second sidewalls of the head portion) of approximately 100.7 mm. In alternative embodiments, the tool 200 may have a smaller or greater width. The tool 200 additionally has a length (measured between the first end 204*a* of the body 204 and the second end 204*b* of the body 204) of approximately 384.2 mm. In alternative embodiments, the tool 200 may have a smaller or greater height.

In operation, suction is generated by the vacuum cleaner through the connection portion 220 and draws dirt and debris from a work surface into the inlet 228 and carries the dirt and debris on a stream of air to the outlet 280. A user can grasp the gripping surface of the tool 200 to position the bristles 268 against the work surface. In this orientation, the connection portion 220 extends substantially parallel to the work surface, and the head portion 212 and the intermediate portion 216 are positioned at an oblique angle relative to the work surface. This angled orientation allows the user to exert greater force or leverage on the tool 200 (and the bristles 268) against the work surface. Scrubbing the work surface with the bristles 268 loosens dirt and debris caked on the work surface and aids in cleaning the surface, while also protecting the surface from damage. Due to the position of the bristles 268 within the head portion 212, air flows over and below the brush member 256 throughout the cleaning operation to remove dirt and debris from the work surface. The relatively narrow height of the head portion 212 allows the user to position the tool 200 in hard to access areas (e.g., underneath furniture).

FIGS. 3A-3E illustrate an embodiment of a vacuum tool 300 shaped and sized to effectively clean a corner area of a work surface.

Figure 3A:
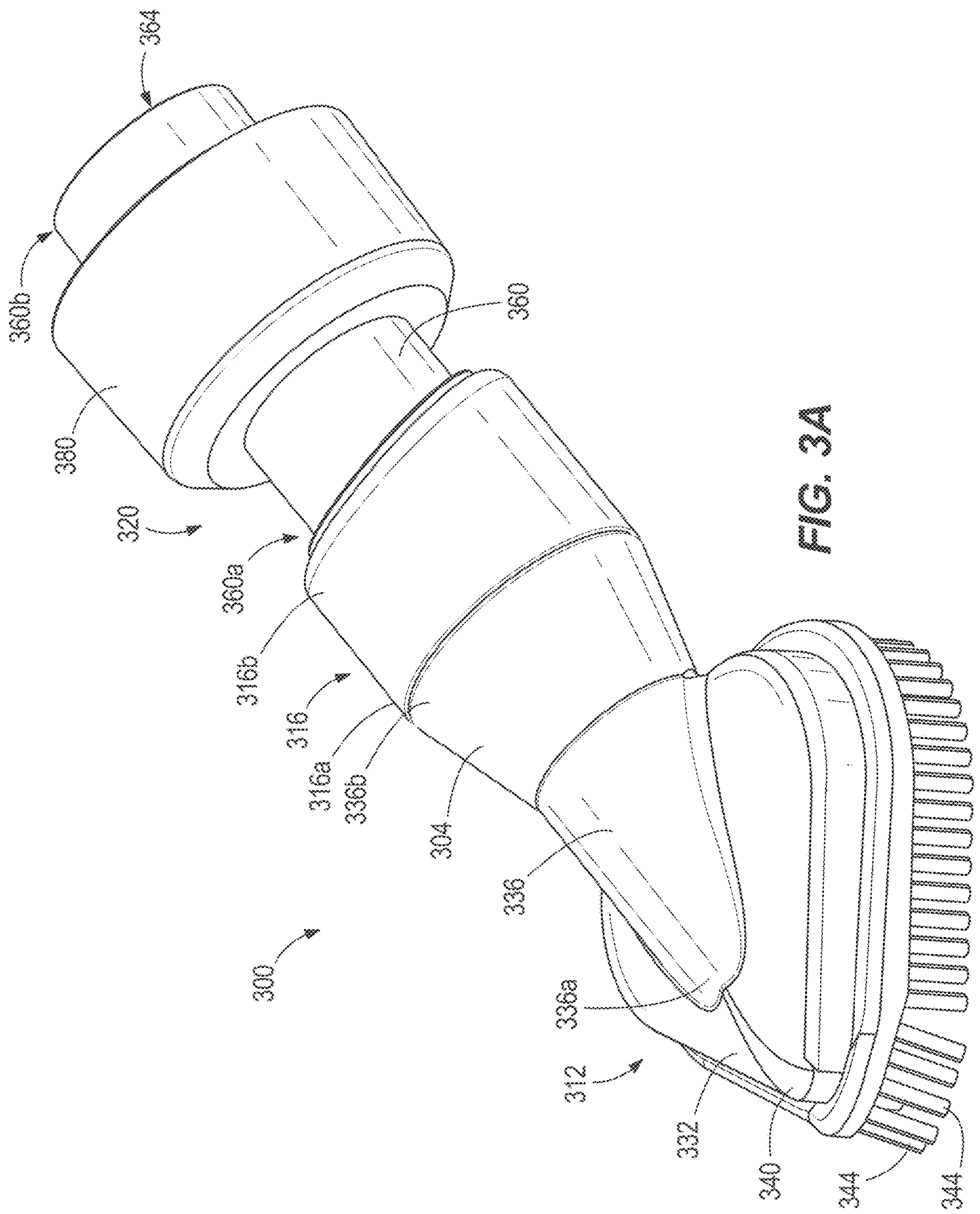
FIG. 3A is a perspective view of another vacuum tool according to another embodiment of the invention.
Figure 3B:
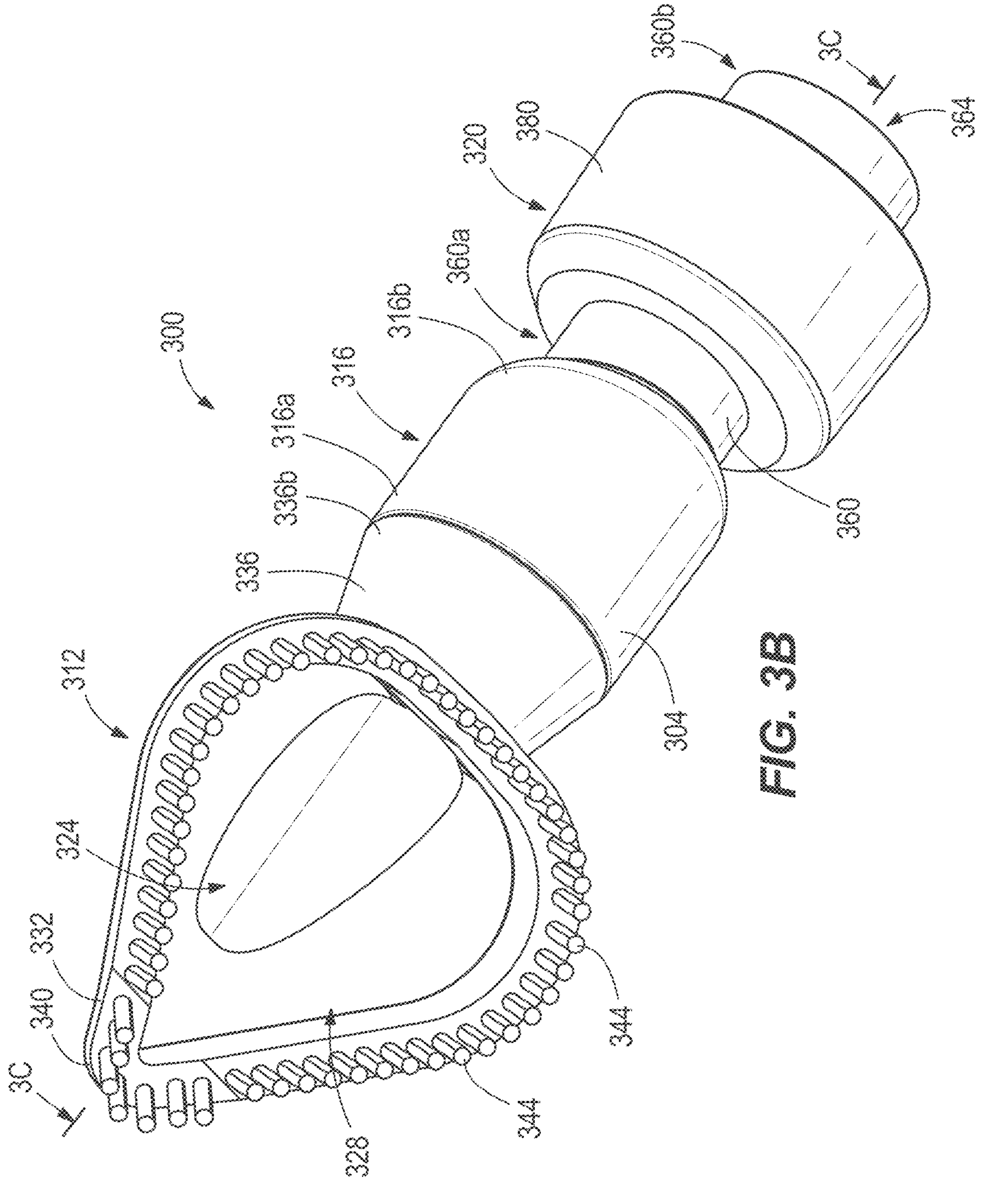
FIG. 3B is another perspective view of the vacuum tool of FIG. 3A.
Figure 3C:
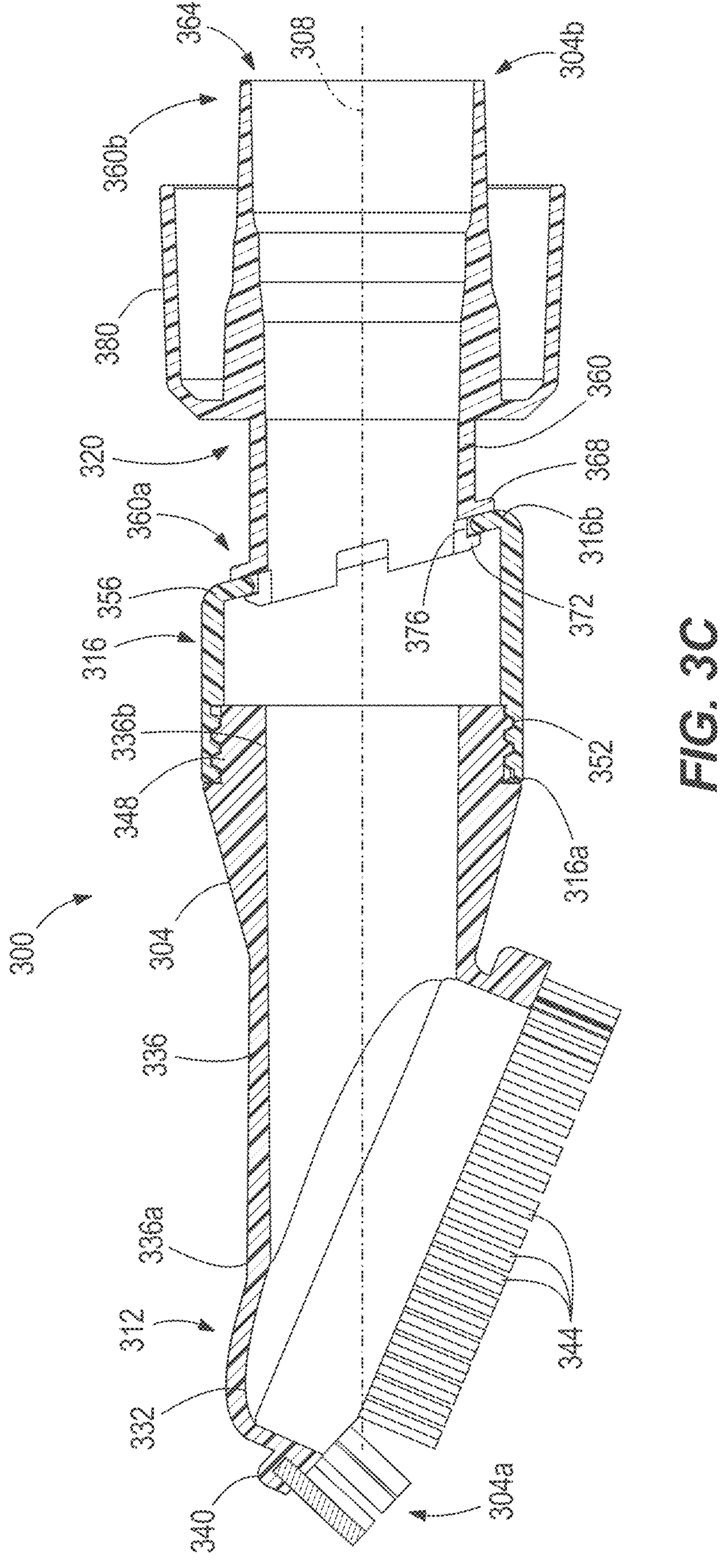
FIG. 3C is a cross-sectional perspective view of the vacuum tool of FIG. 3A, taken along section line 3C-3C of FIG. 3B.

The embodiment of the vacuum tool 300 shown in FIGS. 3A-3E includes a body 304 having a first end 304*a*, a second end 304*b* opposite the first end 304*a*, and a longitudinal axis 308 extending between the first end 304*a* and the second end 304*b* (FIG. 3C). The body 304 further includes a head portion 312, an intermediate portion 316, and a connection portion 320. The head portion 312 is positioned adjacent the first end 304*a*, the connection portion 320 is positioned adjacent the second end 304*b*, and the intermediate portion 316 is positioned between the head portion 312 and the connection portion 320. With reference to the embodiment illustrated in FIGS. 3A-3D, the head portion 312 is removably coupled to the intermediate portion 316, and the intermediate portion 316 is removably coupled to the connection portion 320. The tool 300 further includes an opening 324 extending through the body 304 from the first end 304*a* to the second end 304*b*. At least a portion of the opening 324 is parallel to the longitudinal axis 308. In some embodiments, such as in FIG. 3E, the tool 300 is formed as an integral piece. More specifically, the head portion 312 is integrally formed with the intermediate portion 316, and the intermediate portion 316 is integrally formed with the connection portion 320.

The head portion 312 and the opening 324 define an inlet 328 for collecting dirt and debris. The head portion 312 includes a head 332 and a connector 336. The head 332 is shaped to fit within a corner area of a work surface. Specifically, the head 332 is generally teardrop shaped, such that the head 332 is generally cylindrical and includes a somewhat pointed edge 340. A perimeter of an outer surface of the head 332 includes a series of several apertures shaped and sized to receive bristles 344. The bristles 344 extend away from the bottom surface and are configured to selectively engage or otherwise be positioned adjacent to a work surface. The bristles 344 positioned on the pointed edge 340 of the head 332 extend in an outward direction, allowing for access in corners and tight spaces.

The connector 336 is generally tapered and cylindrical. The connector 336 includes a first end 336*a* adjacent the head 332, and a second end 336*b* opposite the first end 336*a*. The connector 336 is tapered in a direction from the second end 336*b* of the connector 336 to the first end 336*a*. That is, a diameter of the portion of the opening 324 within the connector 336 decreases from the second end 336*b* to the first end 336*a*. In some embodiments (FIG. 3E), the connector 336 is cylindrical and the portion of the opening 324 extending through the connector 336 has a constant diameter. In the disclosed embodiment, the first end 336*a* of the connector 336 is integrally formed with the head 332, and the second end 336*b* of the connector 336 is removably coupled to the intermediate portion 316. More specifically, the second end 336*b* of the connector includes male threads 348. Other embodiments may include a connector 336 of a different shape.

Figure 3D:
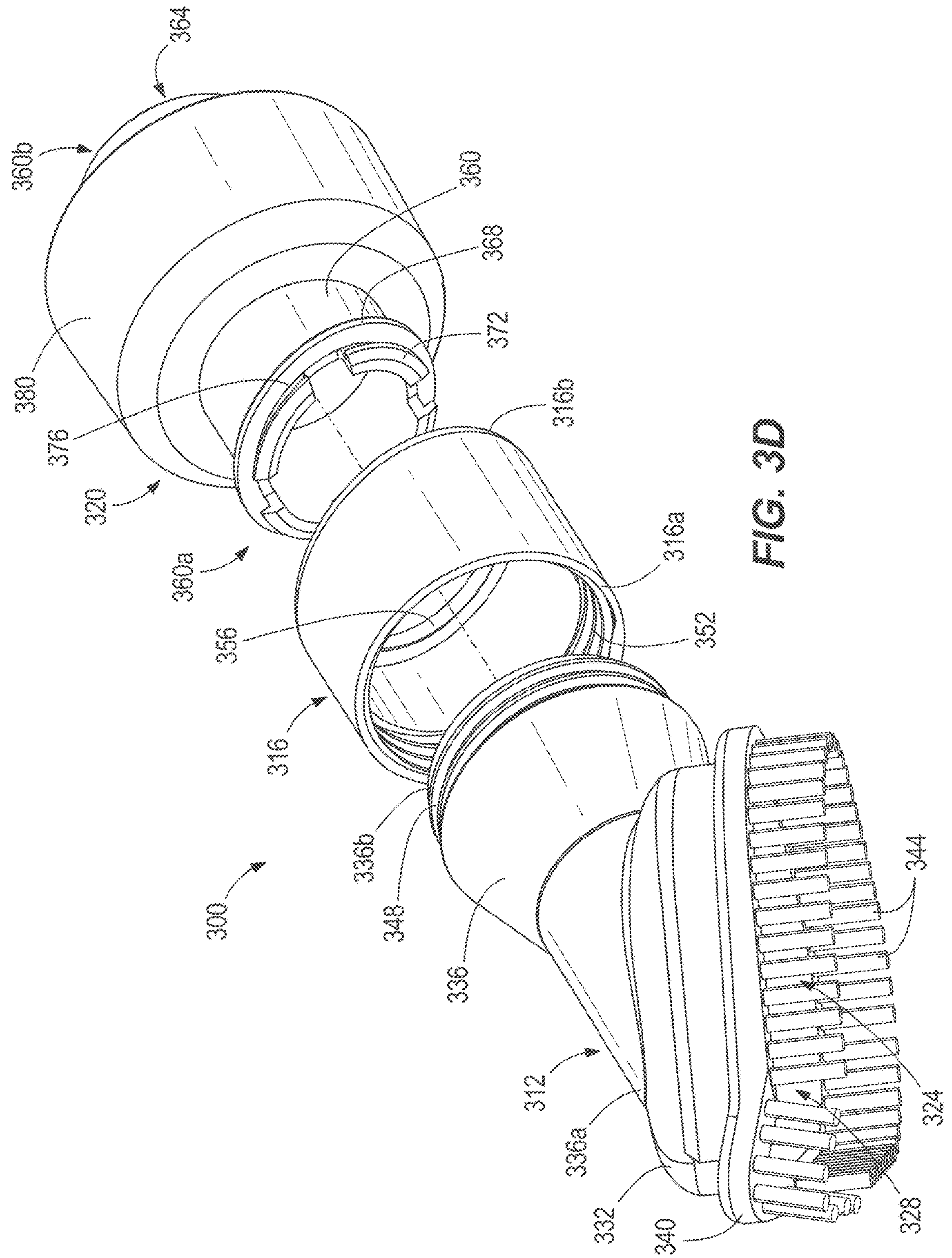
FIG. 3D is an exploded view of the vacuum tool of FIG. 3A.
Figure 3E:
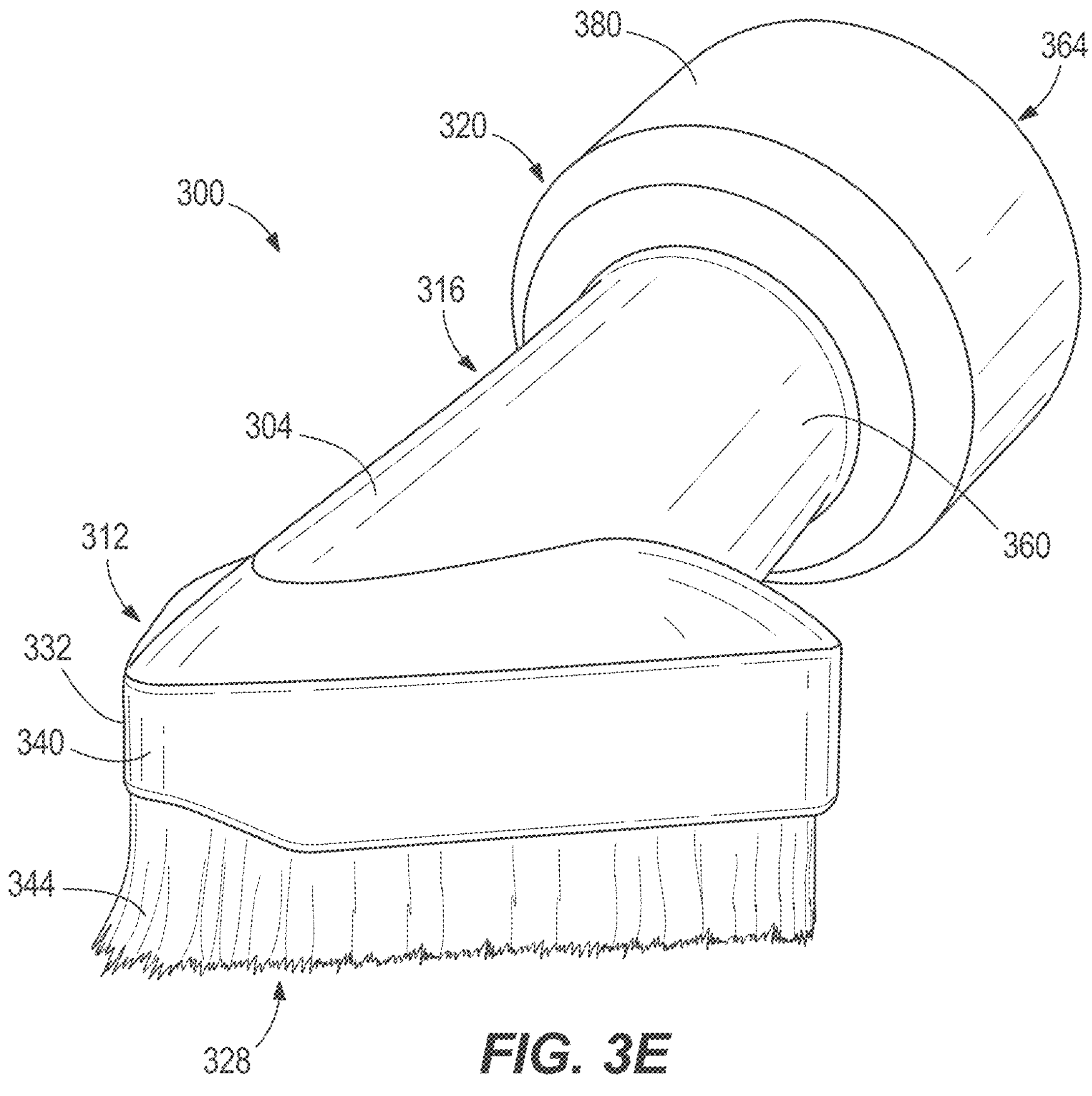
FIG. 3E is a perspective view of another vacuum tool according to another embodiment of the invention.

With reference to FIGS. 3A, 3B, and 3D, the intermediate portion 316 is generally cylindrical and includes a first end 316*a*, and a second end 316*b* opposite the first end 316*a*. The first end 316*a* is positioned adjacent the head portion 312, and the second end 316*b* is positioned adjacent the connection portion 320. The first end 316*a* of the intermediate portion 316 includes female threads 352 configured to engage the male threads 348 on the connector 336 of the head portion 312. The head portion 312 can thus be threadably coupled to the intermediate portion 316. In alternative embodiments, the head portion 312 may be secured to the intermediate portion 316 via an alternative mechanism (e.g., fasteners, etc.). In some embodiments, the intermediate portion 316 and/or the head portion 312 may include a swivel joint, allowing the head portion 312 to swivel or rotate relative to the intermediate portion 316. The second end 316*b* of the intermediate portion 316 includes a flange 356 positioned on an inner surface of the intermediate portion 316 (FIG. 3D). More specifically, the flange 356 extends around a perimeter of the inner surface and secures the intermediate portion 316 to the connection portion 320.

The connection portion 320 extends from the second end 304*b* of the body 304. The connection portion 320 includes a conduit 360 that defines an outlet 364 that is in fluid communication with the opening 324 and with the wand or hose of the vacuum cleaner. The conduit 360 of the illustrated embodiment is generally cylindrical and includes a first end 360*a* adjacent the intermediate portion 316, and a second end 360*b* opposite the first end 360*a*. With reference to FIGS. 3C and 3D, the conduit 360 includes a first shoulder 368, a second shoulder 372 having a smaller diameter than the first shoulder 368 and spaced inwardly from the first shoulder 368, and a groove 376 formed therebetween. The first and second shoulders 368, 372 extend from the conduit 360 with the second shoulder 372 positioned on the first end 360*a* of the conduit 360. The groove 376 is shaped and sized to receive the flange 356 on the intermediate portion 316. That is, when the intermediate portion 316 is coupled to the connection portion 320, the flange 356 is positioned within the groove 376, and in engagement with the first shoulder 368 and the second shoulder 372 to removably couple the intermediate portion 316 to the connection portion 320. This connection between the flange 356 of the intermediate portion 316 and the groove 376 can thus be configured as either a snap fit or a bayonet fit. The intermediate portion 316 and connection portion 320 can therefore be coupled to each other such that they can rotate or swivel relative to one another.

With reference to FIGS. 3A-3E, the connection portion 320 additionally includes a universal coupler 380 extending from the conduit 360 and configured to couple to vacuum hoses and wands having different dimensions. The universal coupler 380 is substantially identical to the universal coupler 164 described above with respect to FIGS. 1A-1D. Reference is hereby made to the description of the universal coupler 164 above. In some embodiments, the connection portion 320 may include alternative configurations.

In some embodiments, the head portion 312 of the tool 300 has a width (measured between the widest points on the circumference of the head 332) of approximately 76.2 mm. In alternative embodiments, the tool 300 may have a smaller or greater width. The tool 300 additionally has a height (measured between a distal end of the bristles 344 and an upper edge of the connection portion 320) of approximately 92.5 mm. In alternative embodiments, the tool 300 may have a smaller or greater height.

In operation, suction is generated by the vacuum cleaner and applied through the connection portion 320 to draw dirt and debris from a work surface into the inlet 328. The dirt and debris are carried on a stream of air generated by the suction of the vacuum cleaner to the outlet 364. The pointed edge 340 of the head portion 312 allows the user to position the tool 300 in corners for cleaning. Scrubbing the work surface with the bristles 344 loosens dirt and debris caked on the work surface and aids in cleaning the surface while also protecting the surface from damage. The bristles 344 positioned on the pointed edge 340 of the head portion 312 allow the tool 300 to access dirt and debris located in tight corners and joints.

FIGS. 4A-4E illustrate an embodiment of a vacuum tool 400 configured to scrub a work surface clean.

Figures 4A, 4B:
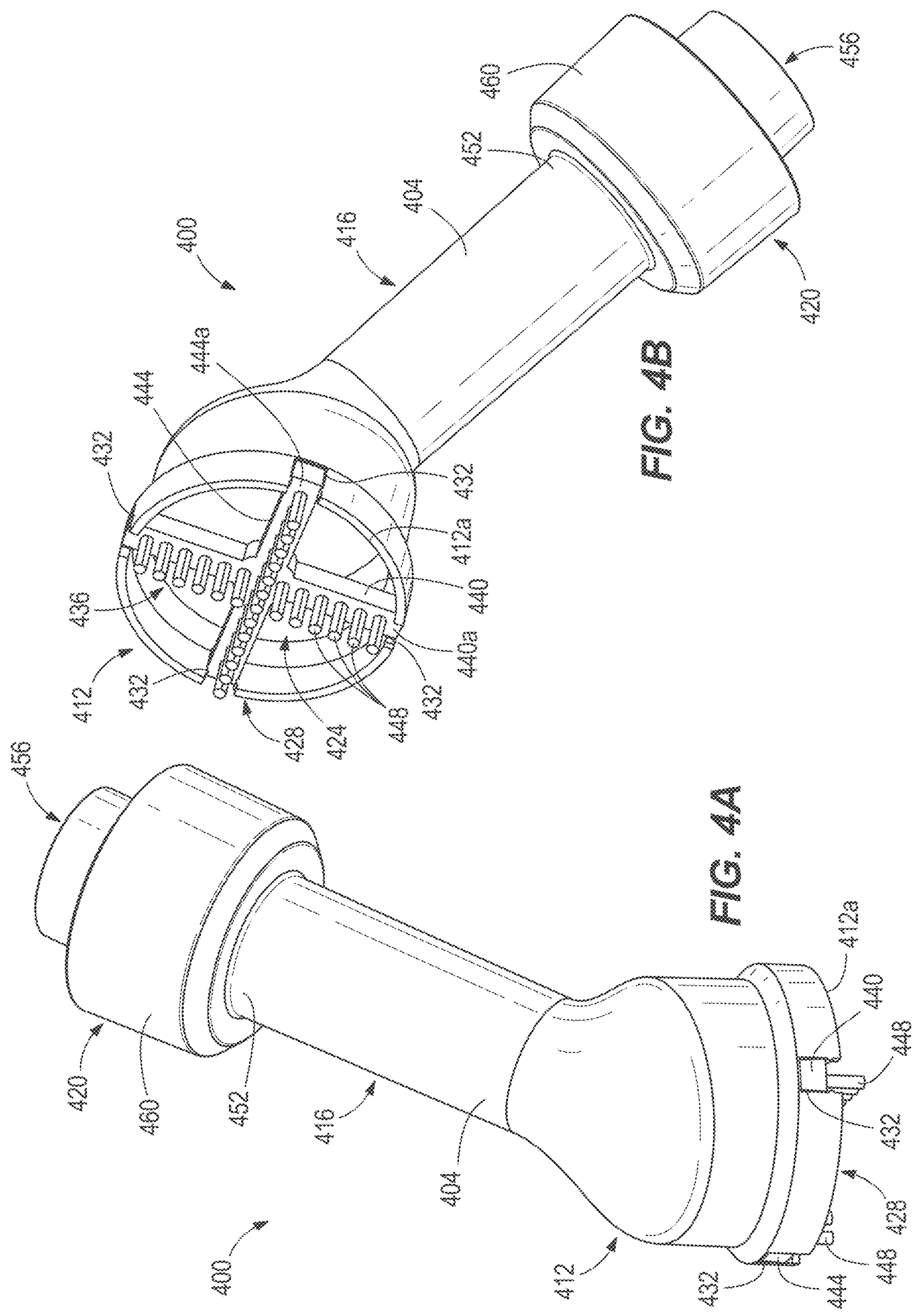
FIG. 4A is a perspective view of another vacuum tool according to another embodiment of the invention.
FIG. 4B is another perspective view of the vacuum tool of FIG. 4A.
Figure 4C:
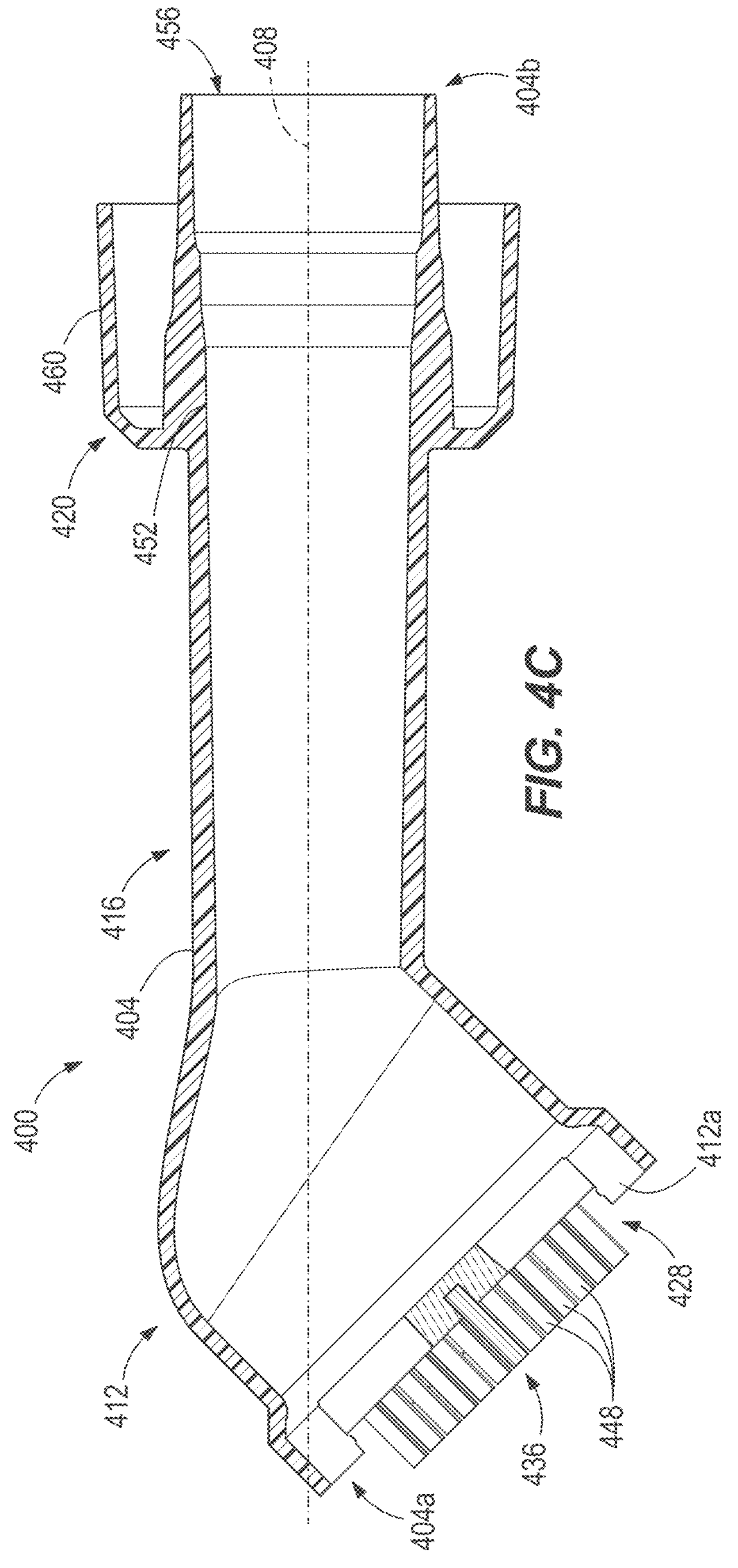
FIG. 4C is a cross-sectional perspective view of the vacuum tool of FIG. 4A.

The embodiment of the vacuum tool 400 shown in FIGS. 4A-4E includes a body 404 having a first end **404*a*, a second end 404*b* opposite the first end 404*a*, and a longitudinal axis 408 extending between the first end 404*a* and the second end 404*b* (FIG. 4C). The body 404 further includes a head portion 412, an intermediate portion 416, and a connection portion 420. The head portion 412 is positioned adjacent the first end 404*a*, the connection portion 420 is positioned adjacent the second end 404*b*, and the intermediate portion 416 is positioned between the head portion 412 and the connection portion 420. The head portion 412 is integrally formed with the intermediate portion 416, and the intermediate portion 416 is integrally formed with the connection portion 420. In other embodiments, the intermediate portion 416, the intermediate portion 416, and the connection portion 420 may be formed from separate parts assembled together as a single unit. The tool 400 further includes an opening 424 extending through the body 404 from the first end 404*a* to the second end 404*b*. At least a portion of the opening 424 is parallel to the longitudinal axis 408**.

The head portion 412 and the opening 424 define an inlet 428 for collecting dirt and debris. The head portion 412 is generally cylindrical. In some embodiments, the head portion 412 may be configured in alternative shapes. A distal end **412*a* of the head portion 412 includes grooves 432 extending through a portion of the head portion 412. The grooves 432 are equidistantly spaced around the perimeter of the distal end 412*a* of the head portion 412. In the illustrated embodiment, the head portion 412 includes four grooves 432. However, in alternative embodiments, the head portion 412 may include fewer or more grooves 432**.

Figure 4D:
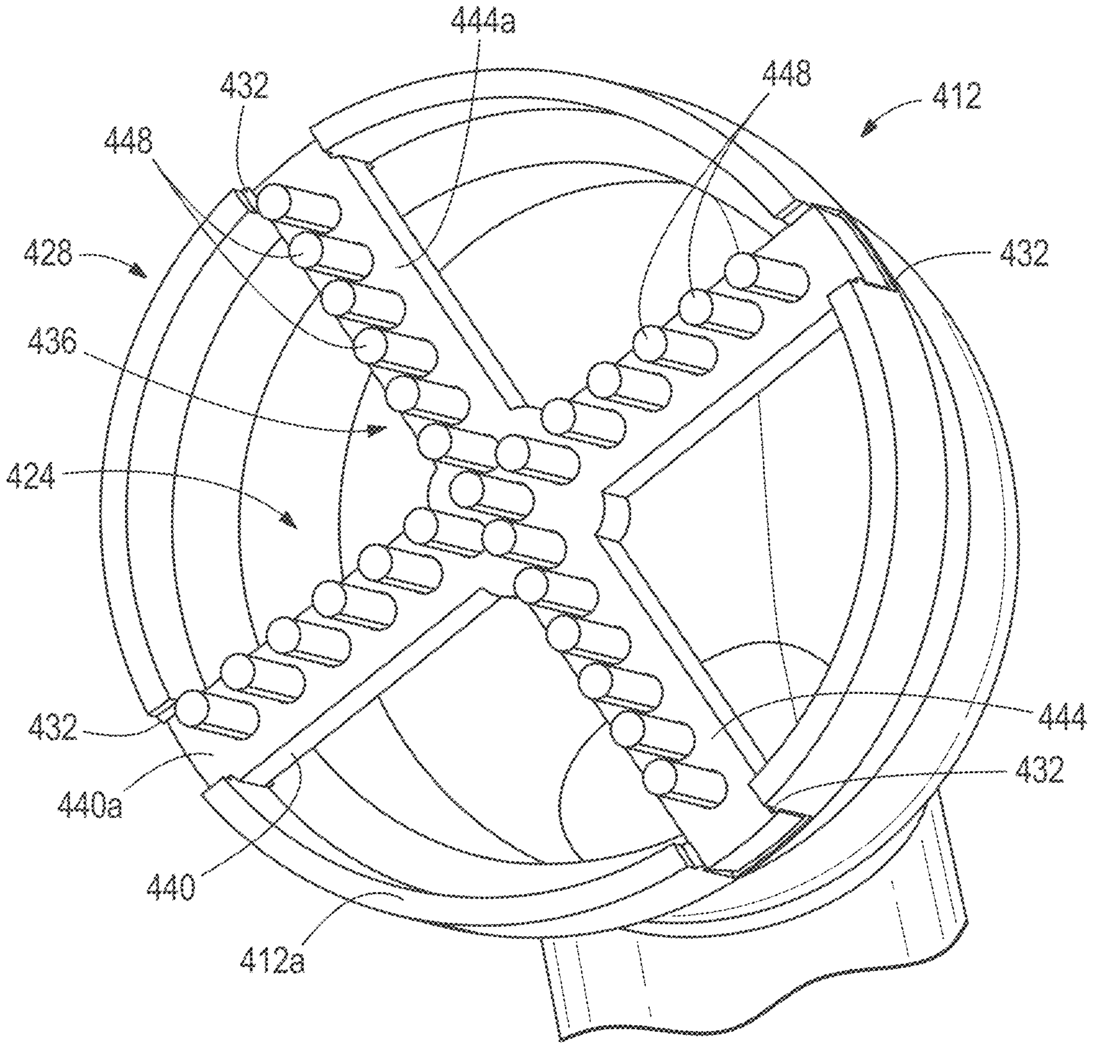
FIG. 4D is an enlarged perspective view of a head portion of the vacuum tool of FIG. 4A.

With reference to FIGS. 4B and 4D, the tool 400 includes a brush member 436 coupled to the distal end **412*a* of the head portion 412. In the illustrated embodiment, the brush member 436 is formed in a shape resembling an "X." That is, the brush member 436 includes a first elongate support portion 440 integrally formed with a second elongate support portion 444. In the disclosed embodiment, the elongate support portions 440, 444 are generally rectangular and oriented perpendicular to each other. In some embodiments, the brush member 436 may be formed in alternative configurations. For example, in some embodiments the brush member 436 may form a shape resembling a "V." A series of several bristles 448 are coupled to the bottom surface 440*a* of the first elongate support portion 440 and the bottom surface 444*a* of the second elongate support portion 444. The bristles 448 are configured to selectively engage or otherwise be positioned adjacent to a work surface for scrubbing the surface. The bristles 448 extend outwardly away from the bottom surfaces 440*a*, 444*a* of the first and second elongate support portions 440, 444, respectively. Scrubbing with the bristles 448** helps to loosen dirt and debris caked on a work surface and protect the work surface from damage.

Distal ends of the first elongate support portion 440 and the second elongate support portion 444 are seated within the grooves 432 on the head portion 412. The brush member 436 may be secured to the head portion 412 via any suitable fastening mechanism (e.g., fasteners, adhesive, etc.), and in some embodiments is removably coupled to the head portion 412.

Figure 4E:
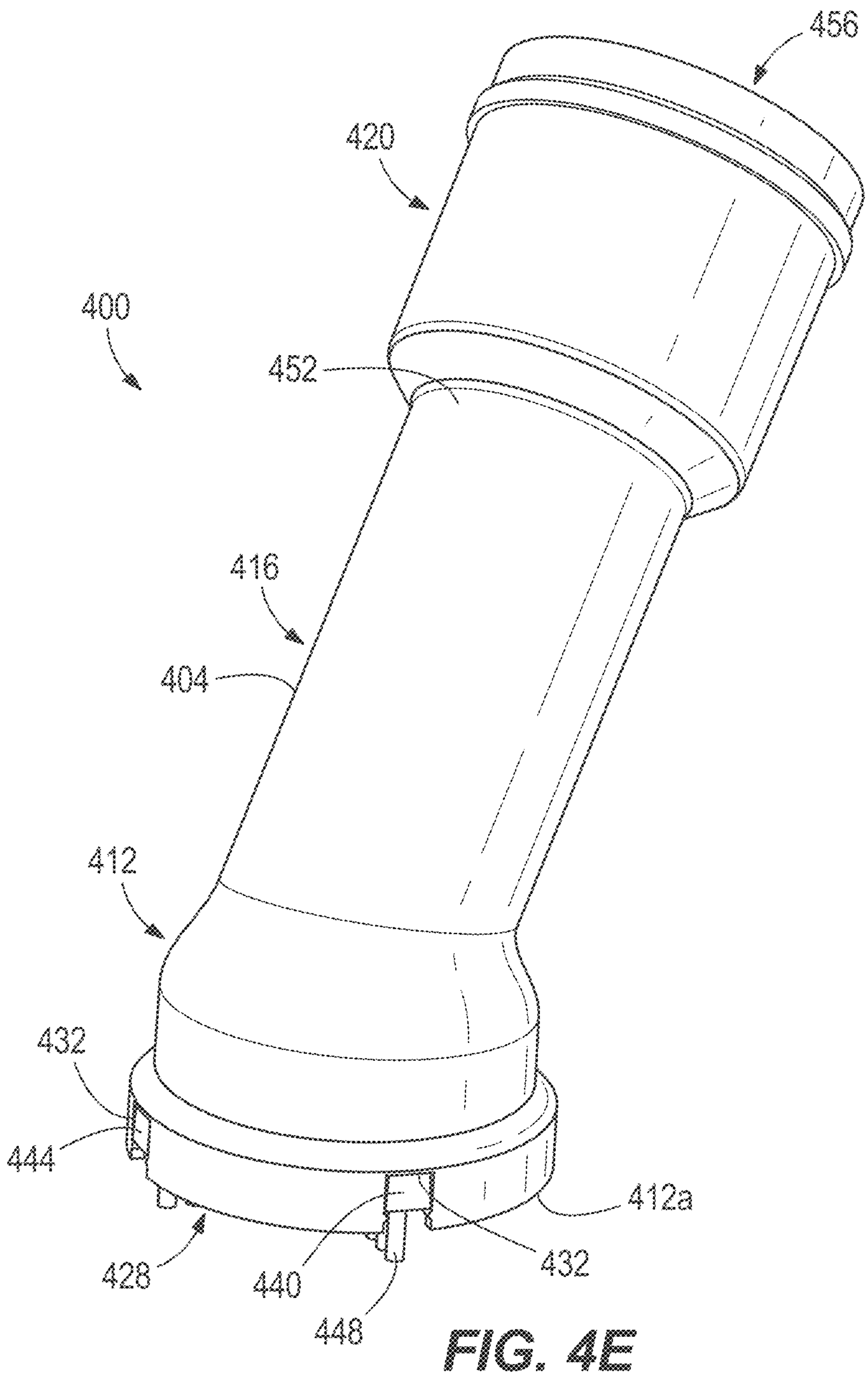
FIG. 4E is a perspective view of another vacuum tool according to another embodiment of the invention.

With reference to the embodiment illustrated in FIGS. 4A-4B, the intermediate portion 416 is cylindrical. In other embodiments, the intermediate portion 416 may be formed from alternative shapes and may be tapered. For example, the intermediate portion 416 illustrated in FIG. 4E is cylindrical and includes a larger diameter than the intermediate portion 416 of FIGS. 4A-4D.

With reference to FIGS. 4A-4C, the connection portion 420 may be integrally formed with or otherwise coupled to the second end **404*b* of the body 404. For example, the connection portion 420 may be coupled to the intermediate portion 416 by a swivel joint. An outer surface of the connection portion 420 defines a gripping surface for a user to grasp during operation. The connection portion 420 includes a conduit 452 that defines an outlet 456 that is in fluid communication with the opening 424 (FIG. 4C). When attached to a wand or hose of a vacuum cleaner, the outlet 456 is in fluid communication with the interior conduit of the wand or hose. The conduit 452 in the illustrated embodiment is cylindrical. In some embodiments, the conduit 452 may be formed from alternative shapes and sizes. For example, the conduit 452 illustrated in FIG. 4E has a larger diameter than the conduit 452 of FIGS. 4A-4D**.

With reference to FIGS. 4A-4C, the connection portion 420 additionally includes a universal coupler 460 extending from the conduit 452 and configured to couple to vacuum hoses and wands having different dimensions. The universal coupler 460 is substantially identical to the universal coupler 164 described above with respect to FIGS. 1A-1D. Reference is hereby made to the description of the universal coupler 164 above. In some embodiments, the connection portion 420 may be formed by alternative configurations.

In some embodiments, the head portion 412 of the tool 400 has a width (measured between the widest points on the circumference of the head 432) of approximately 71.0 mm. In alternative embodiments, the tool 400 may have a smaller or greater width. The tool 400 additionally has a height (measured between a distal end of the bristles 448 and the second end **404*b* of the body 404) of approximately 134.0 mm. In alternative embodiments, the tool 400** may have a smaller or greater height.

In operation, suction is generated by a vacuum cleaner and applied through the connection portion 420 to draw dirt and debris from a work surface into the inlet 428. The dirt and debris are carried on a stream of air created by the vacuum cleaner suction to the outlet 456. A user positions the tool 400 with the bristles 448 placed against the work surface. Scrubbing the work surface with the bristles 448 loosens dirt and debris caked on the work surface and aids in cleaning the surface, while also protecting the surface from damage. The X-shaped pattern of the brush member 436 allows the user to effectively scrub the work surface in a level "side-to-side" motion. More specifically, because the bristles 448 are closely positioned along the first and second elongate support portions 440, 444, the brush member 436 can be used to achieve an enhanced scrubbing to effectively remove caked on dirt and debris from the work surface.

With reference to FIGS. 5A-5F, another embodiment of a vacuum tool 500 is shown. This vacuum tool embodiment 500 includes a body 504 having a first end 504*a* and a second end 504*b* opposite the first end 504*a*. The body 504 further includes a base portion 512, an intermediate portion 516, and a connection portion 520. The base portion 512 is positioned adjacent the first end 504*a*, the connection portion 520 is positioned adjacent the second end 504*b*, and the intermediate portion 516 is positioned between the base portion 512 and the connection portion 520. The base portion 512 is integrally formed with the intermediate portion 516, and the intermediate portion 516 is integrally formed with the connection portion 520. In other embodiments, the base portion 512, the main portion 516, and the connection portion 520 may be formed as separate parts assembled together as a single unit. The tool 500 further includes an opening 524 extending through the body 504 from the first end 504*a* to the second end 504*b*.

Figures 5A, 5B:
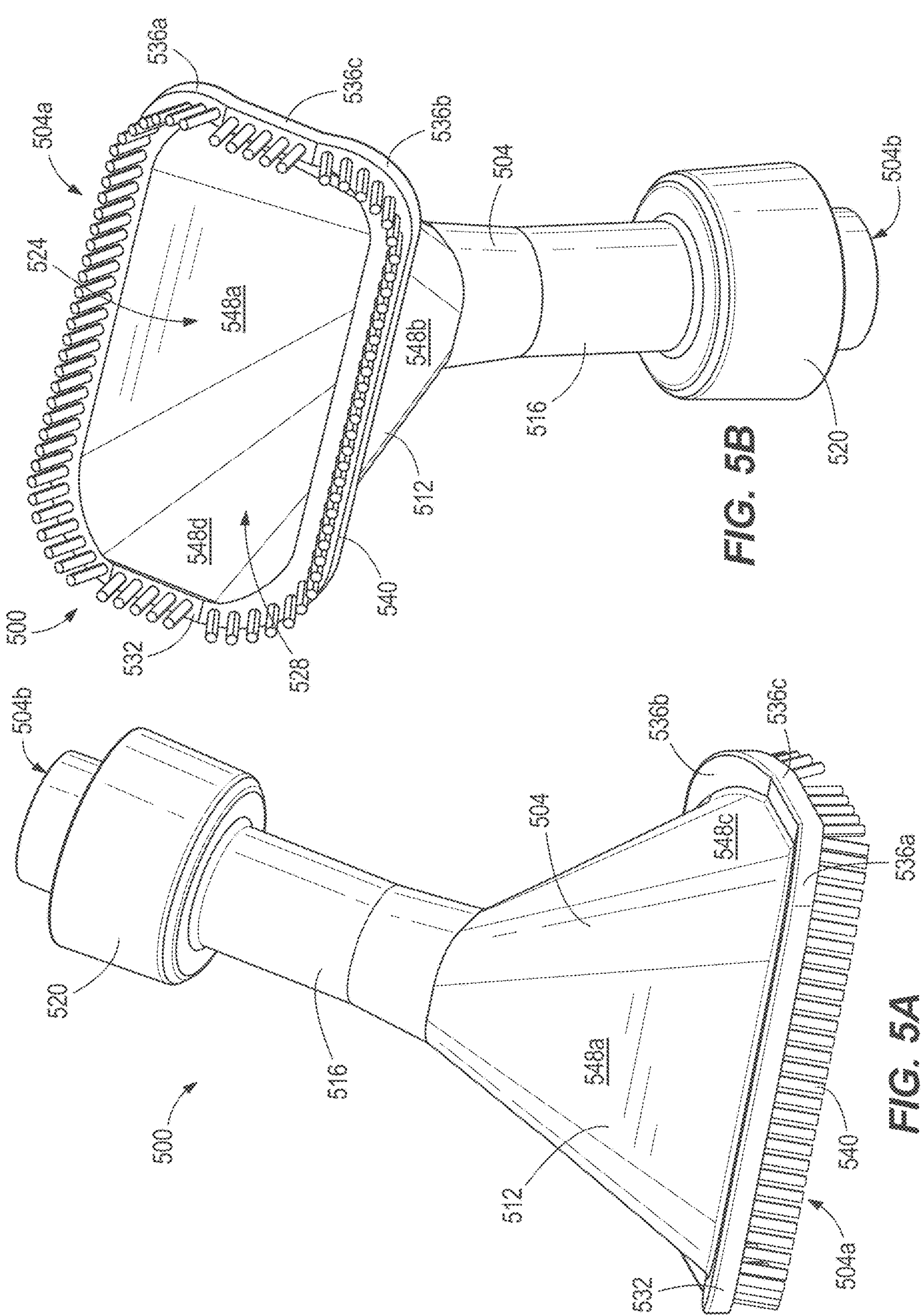
FIG. 5A is a top perspective view of a vacuum tool according to another embodiment of the invention.
FIG. 5B is a bottom perspective view of the vacuum tool of FIG. 5A.
Figures 5C, 5D:
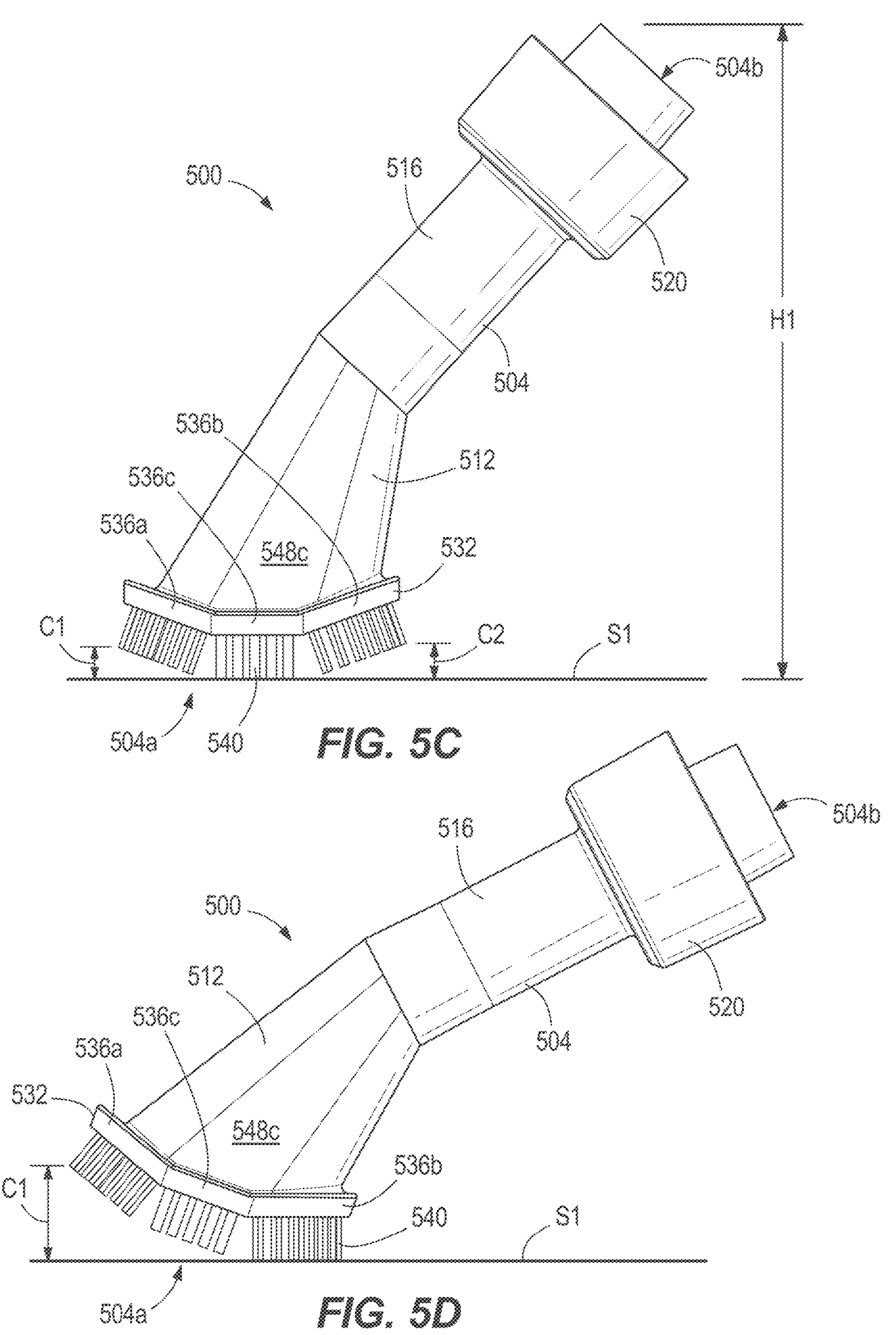
FIG. 5C is a side elevation view of the vacuum tool of FIG. 5A in a neutral position.
FIG. 5D is a side elevation view of the vacuum tool of FIG. 5A in a forward-moving position.

The base portion 512 and the opening 524 define an inlet 528 for collecting dirt and debris. The base portion 512 includes a flange 532 extending about the perimeter of the base portion 512. The flange 532 includes a first inclined section 536*a*, a second inclined section 536*b*, and a middle section 536*c* of the base portion 512 (FIG. 5C). The first inclined section 536*a* and the second inclined section 536*b* are on opposite sides of the middle section 536*c* from each other. Each of the first inclined section 536*a* and the second inclined section 536*b* is obliquely angled relative to the middle section 536*c*. In some embodiments, the middle section 536*c* can be omitted and an angled or rounded section may instead be located between the first inclined section 536*a* and the second inclined section 536*b*.

The illustrated embodiment further includes a plurality of bristles 540 attached to the flange 532 adjacent the first end 504*a*. Each of the plurality of bristles 540 generally extends away from the bottom of the flange 532 at a substantially right angle to the flange 532. As such, the bristles 540 attached to the first inclined section 536*a* and the second inclined section 536*b* are obliquely angled relative to the bristles 540 attached to the middle section 536*c*. In the illustrated embodiment, each of the plurality of bristles 540 is generally the same length. Other embodiments, however, may include bristles 540 of varying lengths.

The base portion 512 is generally in the shape of a truncated pyramid having rounded edges, with the top of the truncated pyramid connected to the intermediate portion 516. The shape of the base portion 512 allows for and facilitates funneling of the dirt and debris into the intermediate portion 516 and subsequently into a wand or hose of a vacuum. The base portion 512 includes a first wall 548*a*, a second wall 548*b* opposite the first wall 548*a*, a third wall 548*c*, and a fourth wall 548*d* opposite the third wall 548*c*. The third wall 548*c* and the fourth wall 548*d* extend between the first wall 548*a* and the second wall 548*b*. The first wall 548*a* is connected to the flange 532 at the first inclined section 536*a* of the base portion 512. The second wall 548*b* is connected to the flange 532 at the second inclined section 536*b* of the base portion 512. The third wall 548*c* and the fourth wall 548*d* are each connected to the flange 532 at opposite ends of the middle section 536*c* of the base portion 512. The base portion 512 further includes rounded corners where each wall 548*a*, 548*b*, 548*c*, 548*d* meets an adjacent wall 548*a*, 548*b*, 548*c*, 548*d*. Other embodiments may include a base portion 512 of a different shape, such as a truncated cone (frustoconical) or a truncated pyramid having angular corners, for instance. In some embodiments, the flange 532 may be omitted and the plurality of bristles 540 may be connected directly to the end of each of the walls 548*a*, 548*b*, 548*c*, 548*d* of the base portion 512.

The intermediate portion 516 is generally in the shape of a cylindrical tube, but other shapes are also contemplated herein. The intermediate portion 516 conveys dirt and debris from the base portion 512 to the connection portion 520. In some embodiments, the intermediate portion 516 can also function as a handle of the vacuum tool 500.

The connection portion 520 is integrally formed with the intermediate portion 516, although some embodiments may include the connection portion 520 removably coupled to the intermediate portion 516, such as by a swivel joint. The connection portion 520 is substantially identical to the connection portion 120 discussed above. As such, the connection portion 520 will not be described in detail for the sake of brevity.

Figure 5E:
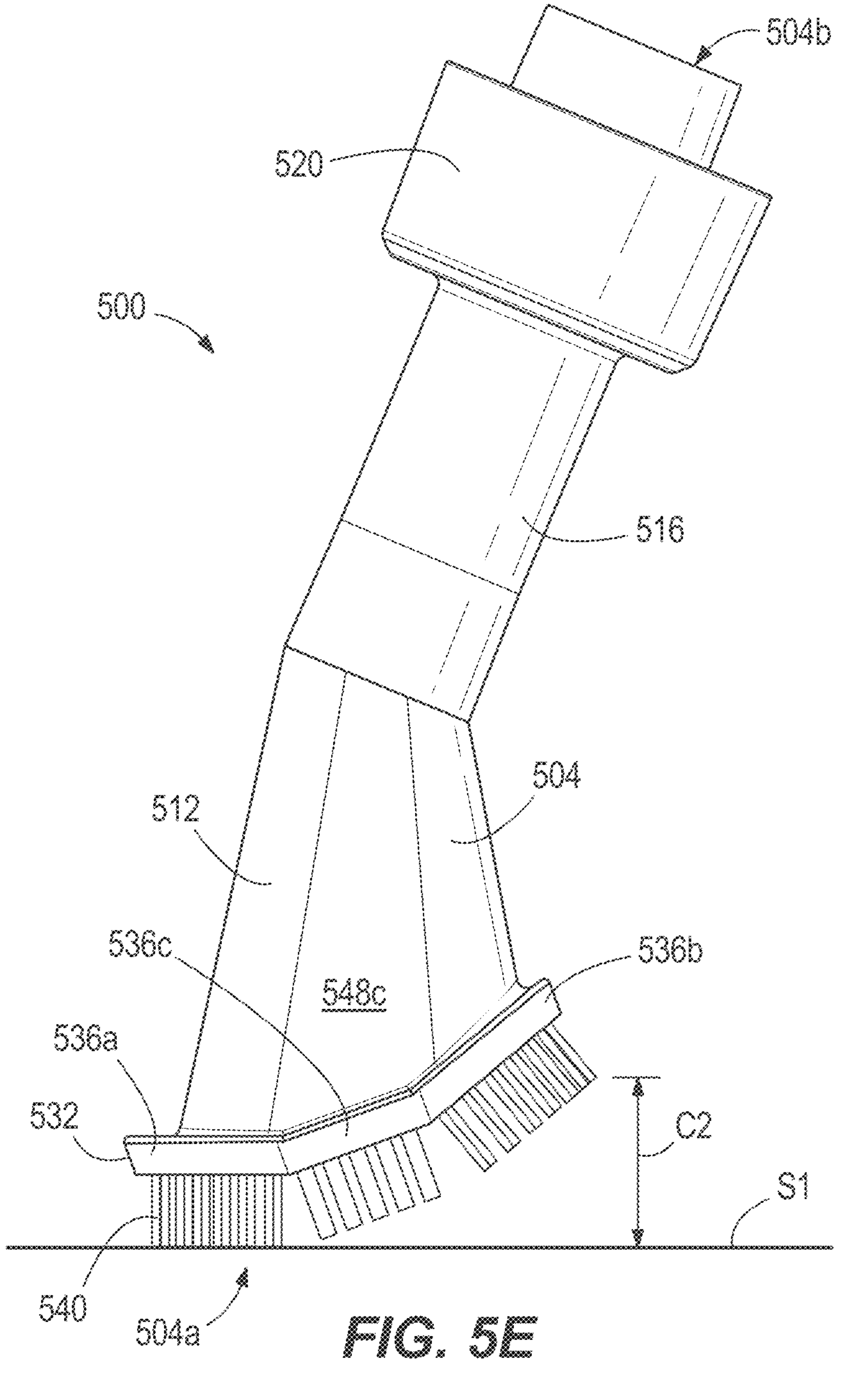
FIG. 5E is a side elevation view of the vacuum tool of FIG. 5A in a rearward-moving position.
Figure 5F:
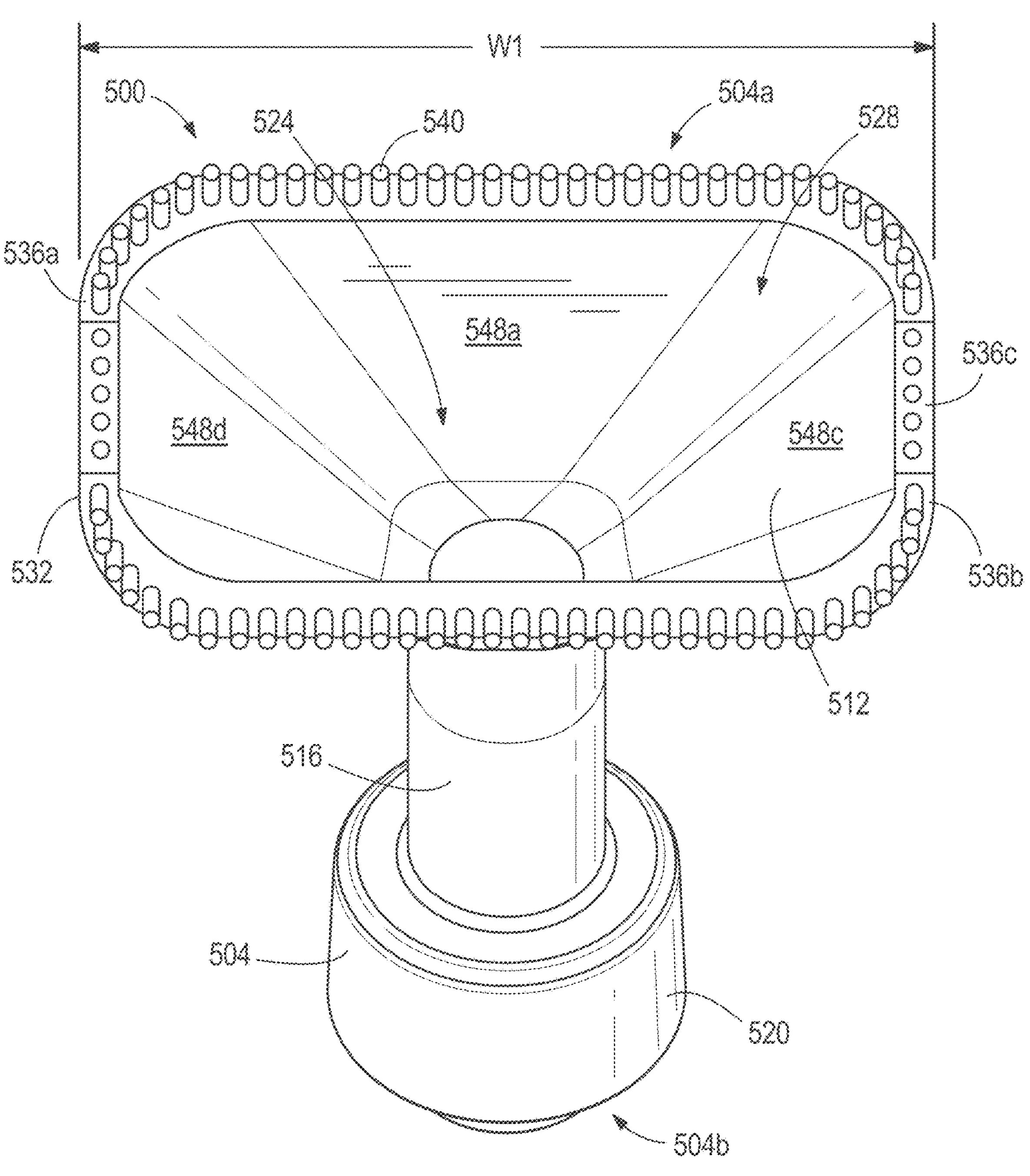
FIG. 5F is bottom plan view of the vacuum tool of FIG. 5A.

During operation of the vacuum tool 500, a user generally engages a work surface S1 with at least some of the plurality of bristles 540. If the user engages the work surface S1 with the bristles 540 extending from the middle section 536*c* as shown in FIG. 5C, a forward clearance C1 between the work surface S1 and the bristles 540 extending from the first inclined section 536*a* is present. Likewise, a rearward clearance C2 between the work surface S1 and the bristles 540 extending from the second inclined section 536*b* is present. As such, dirt and debris can readily enter the inlet 528 and pass through the opening 524 by moving through the forward clearance C1 while the user moves the vacuum tool 500 in a forward direction and through the rearward clearance C2 while the user moves the vacuum tool 500 in the rearward direction. Further, if the user elects to utilize the vacuum tool 500 with a rocking motion, each of the forward clearance C1 and the rearward clearance C2 can be increased. As shown in FIG. 5D, the user may engage the work surface S1 with the bristles 540 extending from the second inclined section 536*b* while pushing the vacuum tool 500 in the forward direction, which provides a greater forward clearance C1 between the work surface S1 and the bristles 540 extending from the first inclined section 536*a*. As shown in FIG. 5E, the user may also engage the work surface S1 with the bristles 540 extending from the first inclined section 536*a* while pulling the vacuum tool 500 in the rearward direction, which provides a greater rearward clearance C2 between the work surface S1 and the bristles 540 extending from the second inclined section 536*b*. This configuration allows the bristles 540 to be used to scrub a work surface to break up or loosen dirt and debris that may be adhered to the work surface S1 and also move the front and by providing clearances C1, C2 allows for the vacuum tool 500 to be used to pick up larger items that would normally be too large to pass through the bristles 540.

The vacuum tool 500 can be of various different sizes and/or shapes. In some embodiments, the vacuum tool 500 has a height H1 of between 20 and 25 centimeters. In some embodiments, the height H1 is 22 centimeters. In some embodiments, the vacuum tool 500 has a base width W1 of between 13 and 18 centimeters. In some embodiments, the base width W1 is between 15 and 16 centimeters. In some embodiments, each of the bristles 540 is between 1 and 2 centimeters long.

Figure 5G:
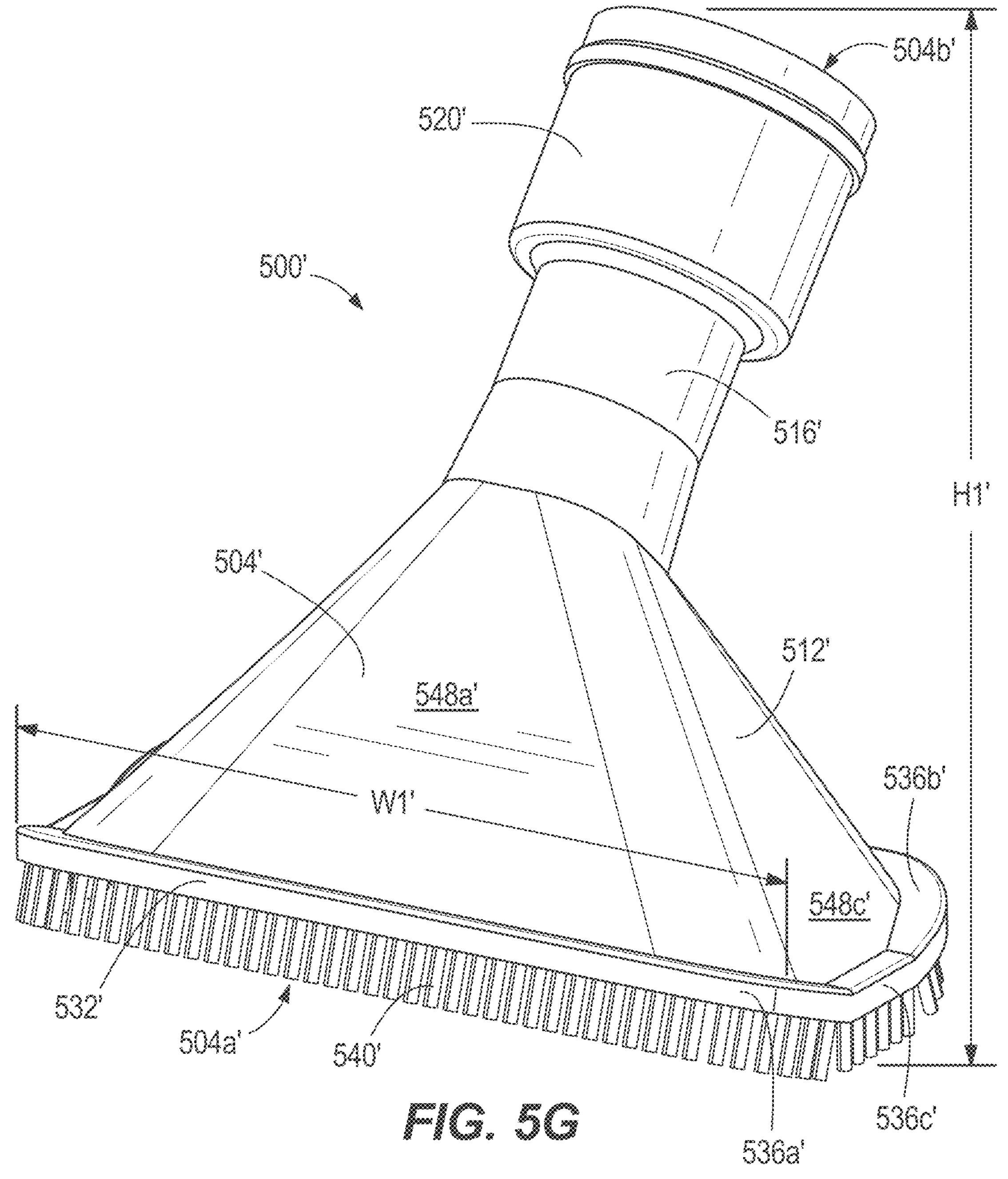
FIG. 5G is a top perspective view of a vacuum tool according to another embodiment of the invention.
Figures 5H, 5I:
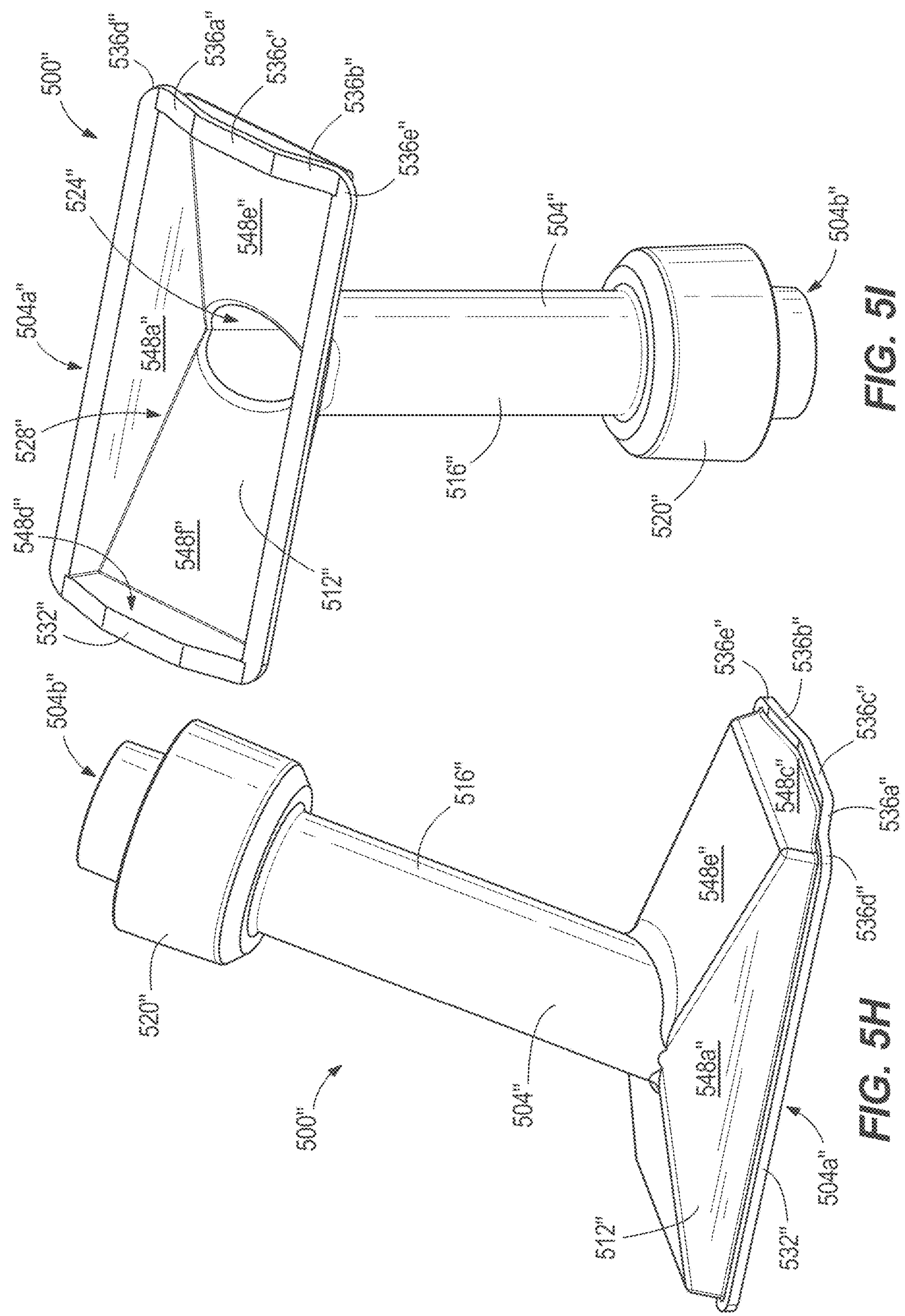
FIG. 5H is a top perspective view of a vacuum tool according to another embodiment of the invention.
FIG. 5I is a bottom perspective view of the vacuum tool of FIG. 5H.
Figures 5J, 5K:
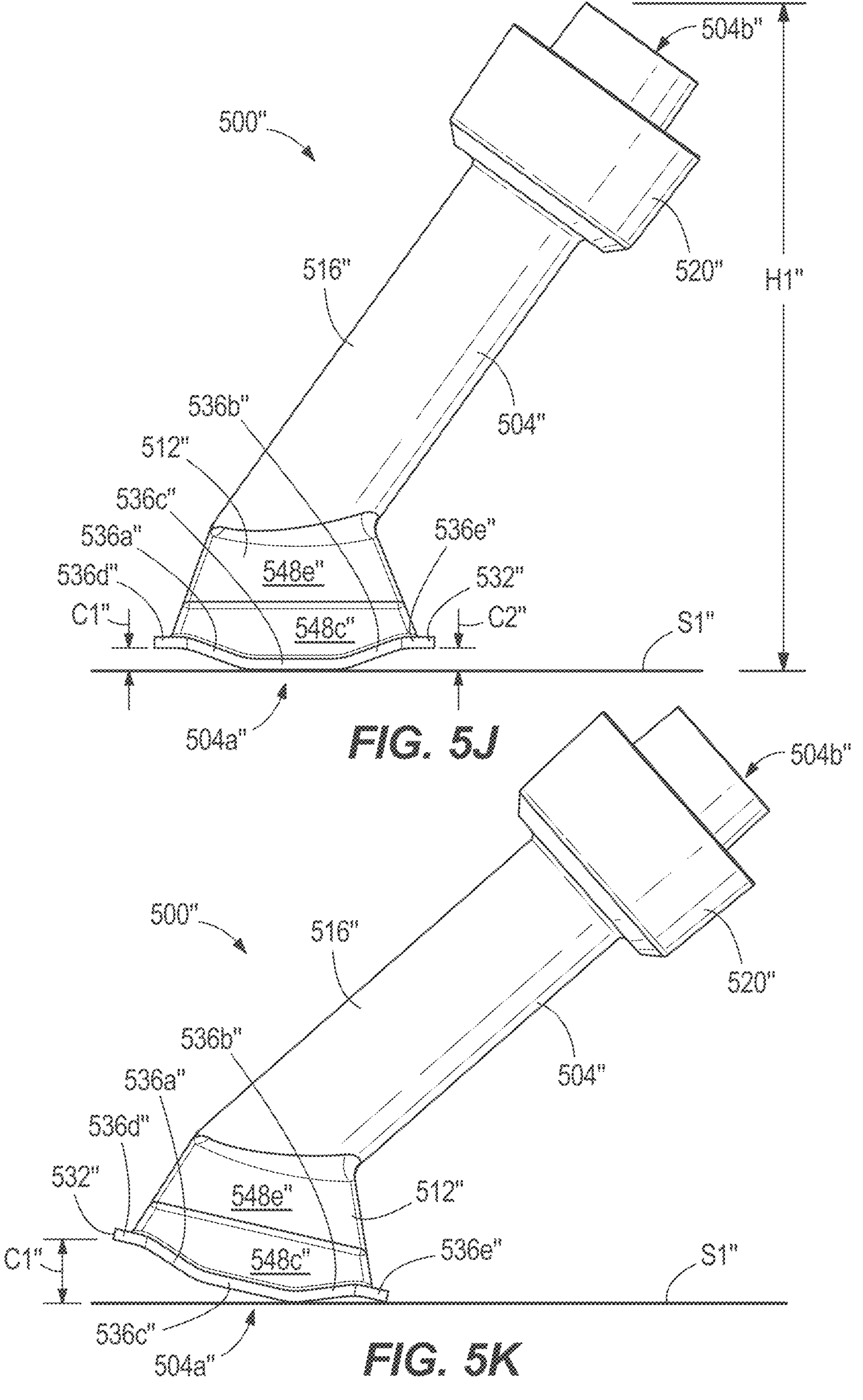
FIG. 5J is a side elevation view of the vacuum tool of FIG. 5H in a neutral position.
FIG. 5K is a side elevation view of the vacuum tool of FIG. 5H in a forward-moving position.
Figure 5L:
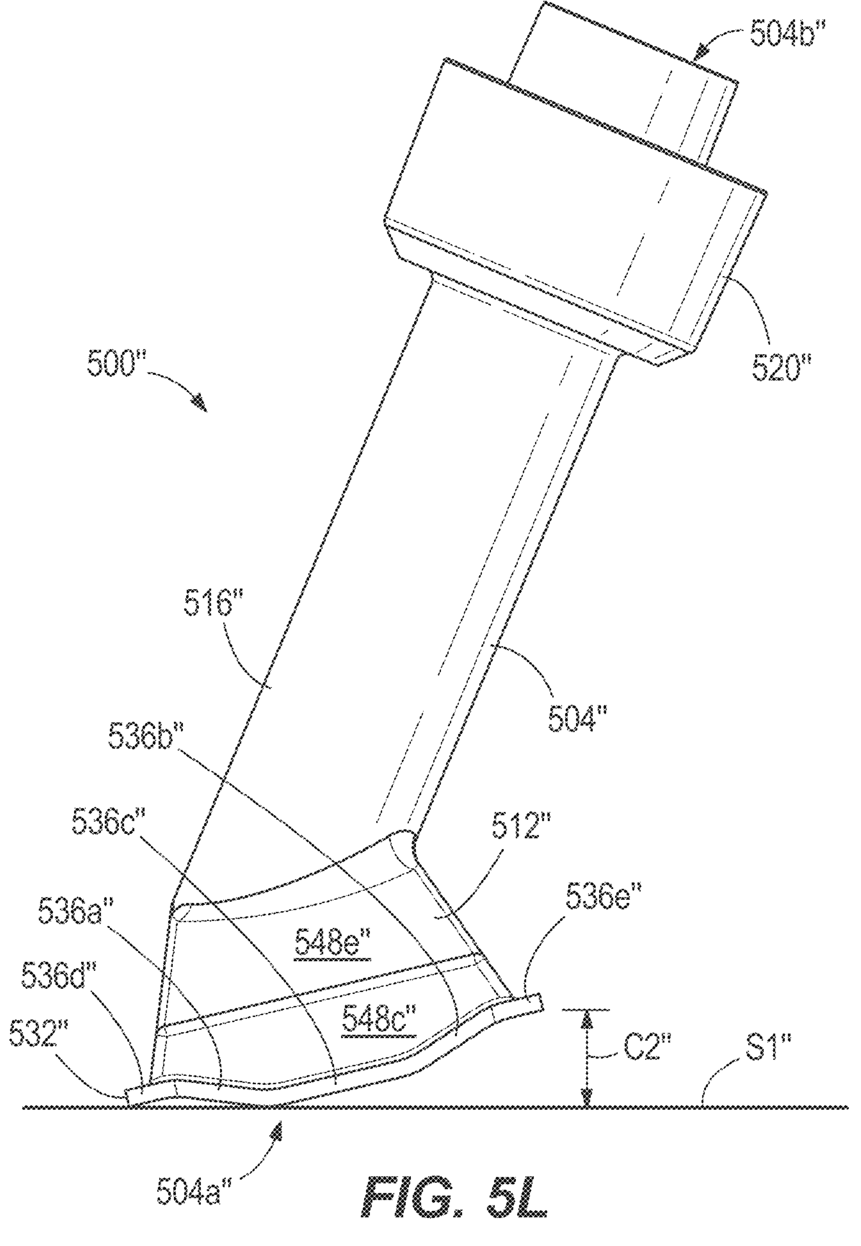
FIG. 5L a side elevation view of the vacuum tool of FIG. 5H in a rearward-moving position.
Figure 5M:
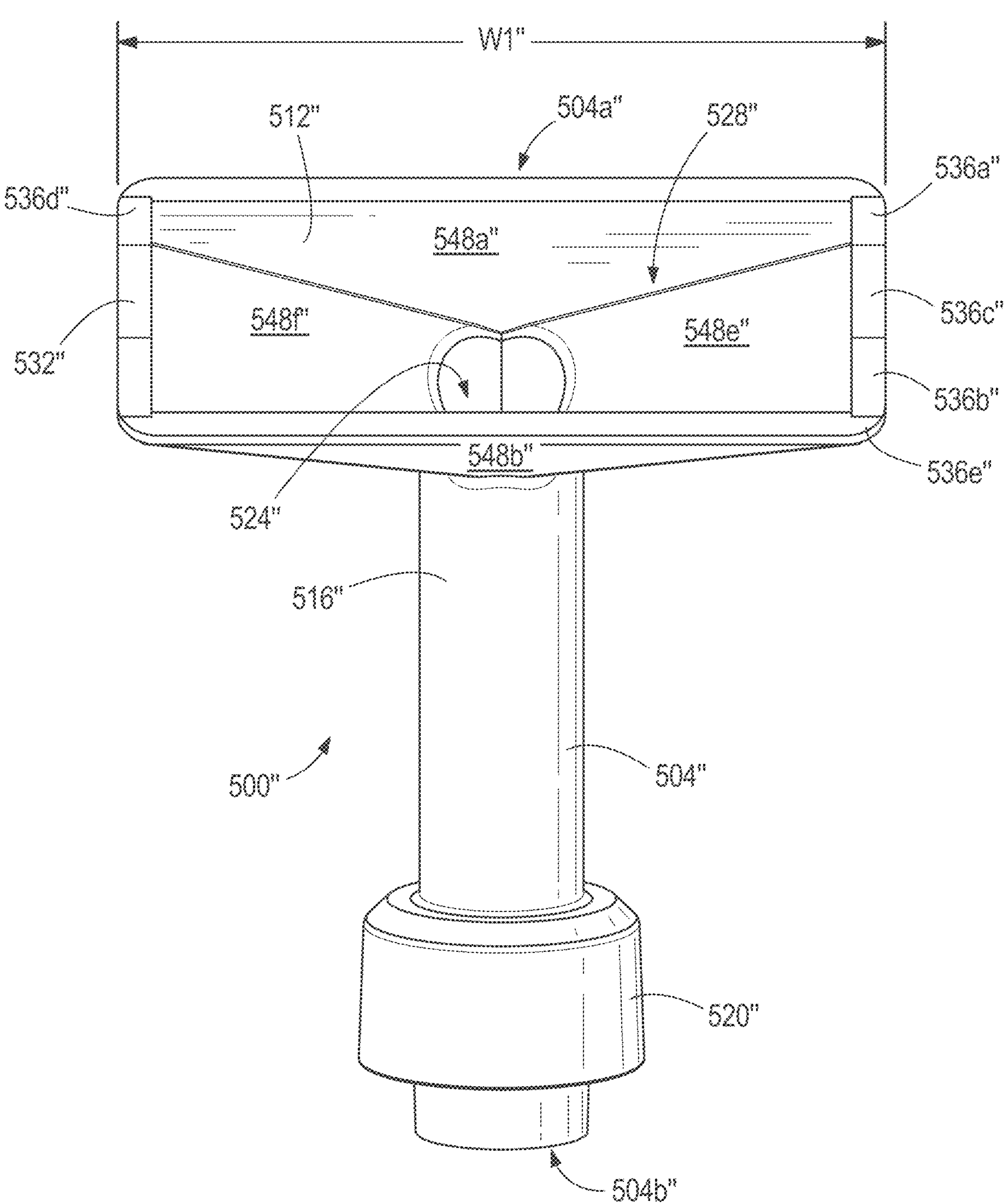
FIG. 5M is a bottom plan view of the vacuum tool of FIG. 5H.

With reference to FIG. 5G, another embodiment of a vacuum tool 500' is shown, with like components designated with an apostrophe. The vacuum tool 500' is largely identical to the vacuum tool 500 discussed above, but with a larger base width W1' and, therefore, a larger inlet 528. The vacuum tool 500' further includes a shorter intermediate portion 516', such that the height H1' is substantially similar to the height H1 of the vacuum tool 500 discussed above.

With reference to FIGS. 5H-5M, another embodiment of a vacuum tool 500" is shown, with like components designated with a double apostrophe. The vacuum tool 500" has many similarities with the vacuum tools 500, 500' discussed above. For the sake of brevity, only the differences will be described herein.

The vacuum tool 500" includes a base portion 512" having a first wall 548*a*", a second wall 548*b*", a third wall 548*c*", a fourth wall 548*d*", a fifth wall 548*e*", and a sixth wall 548*f*". The walls 548*a*", 548*b*", 548*c*", 548*d*", 548*e*", 548*f*" form a generally trapezoidal three-dimensional shape. The base portion 512" further includes a flange 532". The flange 532" includes a first inclined section 536*a*", a second inclined section 536*b*", a middle portion 536*c*", a first portion 536*d*", and a second portion 536*e*". In the illustrated embodiment, no bristles are included. Instead, the flange 532" directly engages the work surface S1" and is operated in substantially the same manner as the vacuum tools 500 and 500'.

With reference to FIGS. 6A-6F, another embodiment of a vacuum tool 600 is shown. This vacuum tool 600 includes a flexible tube 604, an adapter 608, and a connection portion 620. The flexible tube 604 is removably coupled to the adapter 608. The adapter 608 is removably coupled to the connection portion 620.

The flexible tube 604 is configured to resiliently bend when a user manipulates the flexible tube 604. In this manner, the end of the flexible tube 604 can be directed to a desired area to be vacuumed. The flexible tube 604 is smaller in diameter than a typical vacuum hose or wand such that a user is able to access relatively small areas that could not accommodate a typical vacuum hose nozzle or wand nozzle. The flexible tube 604 may be made of a variety of suitable materials, including a polymer material as used in the illustrated embodiment of flexible tube 604. In some embodiments, the flexible tube 604 may be opaque, but in other embodiments, the flexible tube 604 may be at least partially translucent or transparent. In embodiments (FIG. 6F) allowing at least some light to pass through the walls of the flexible tube 604, a user may be able to more readily deduce whether a clog is present in the flexible tube 604.

Figures 6A, 6B:
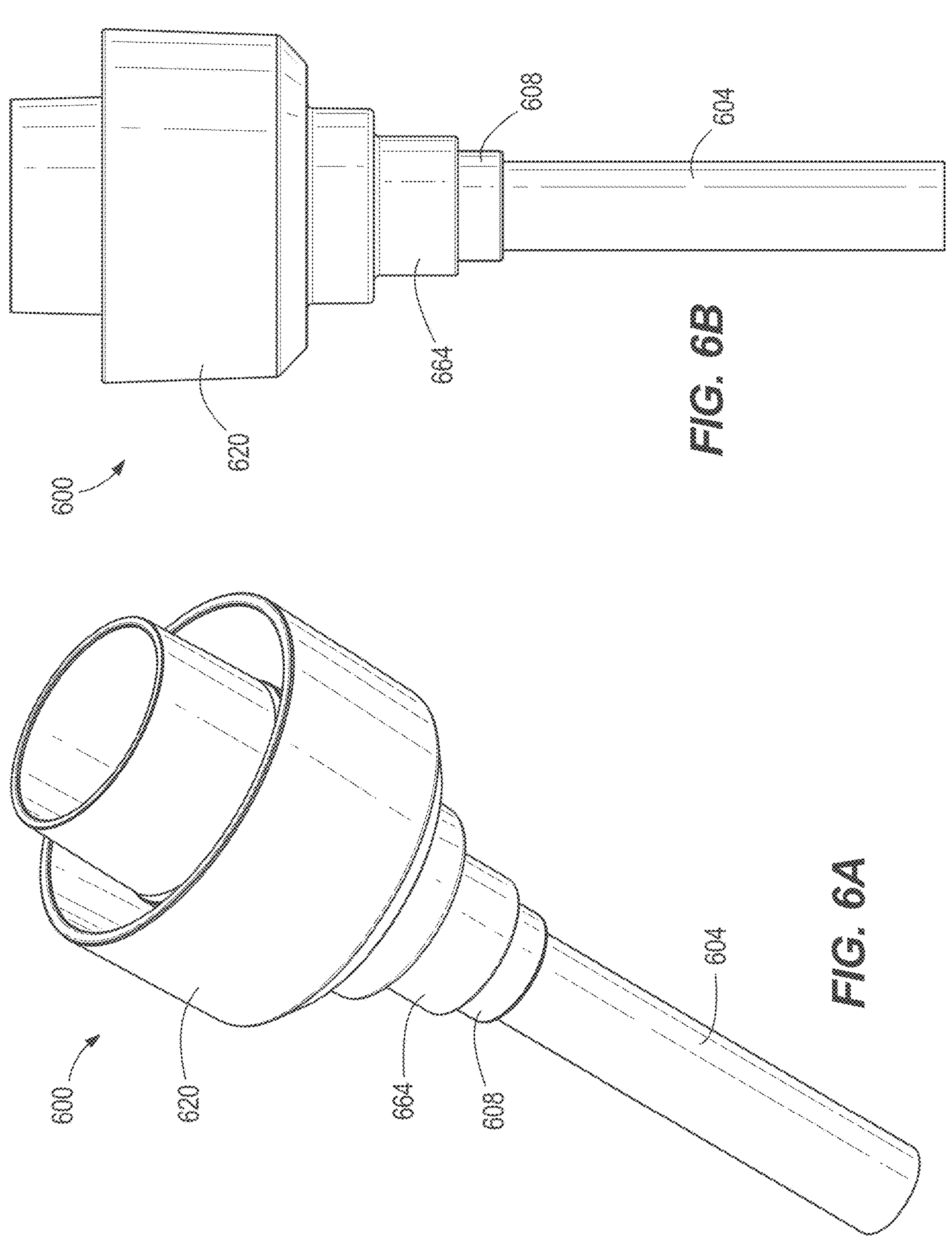
FIG. 6A is a top perspective view of a vacuum tool according to another embodiment of the invention.
FIG. 6B is a side elevation view of the vacuum tool of FIG. 6A.
Figure 6C:
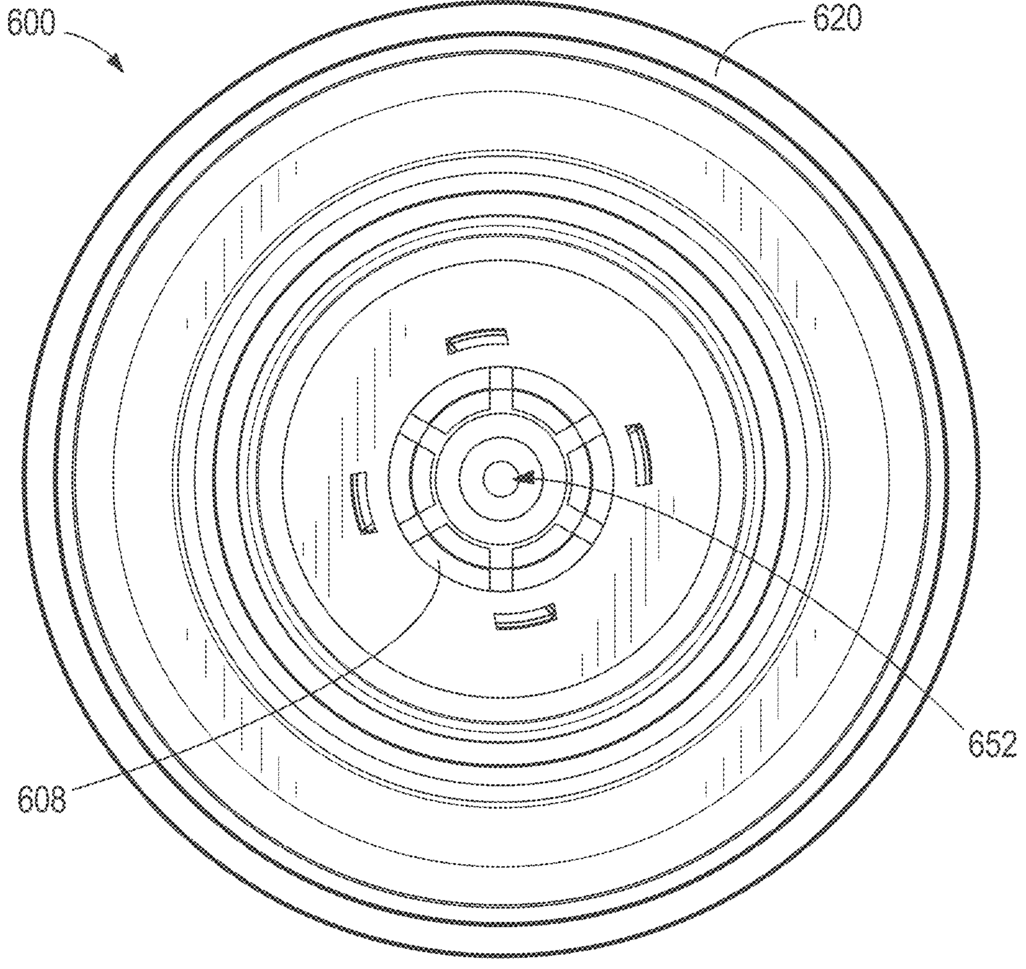
FIG. 6C is a top plan view of the vacuum tool of FIG. 6A.
Figure 6D:
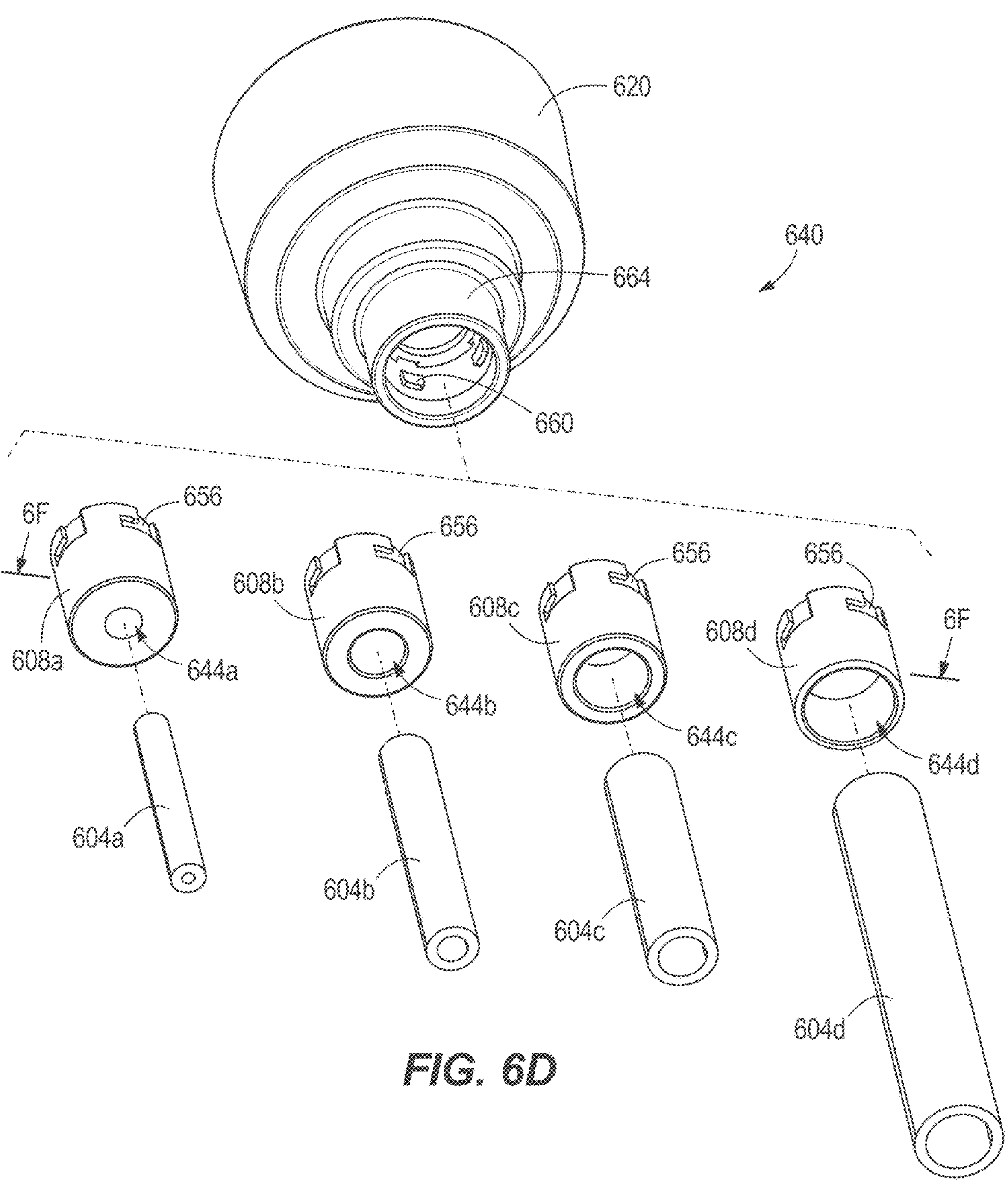
FIG. 6D is an exploded bottom perspective view of the vacuum tool of FIG. 6A with various sized tubes and corresponding adapters.
Figure 6E:
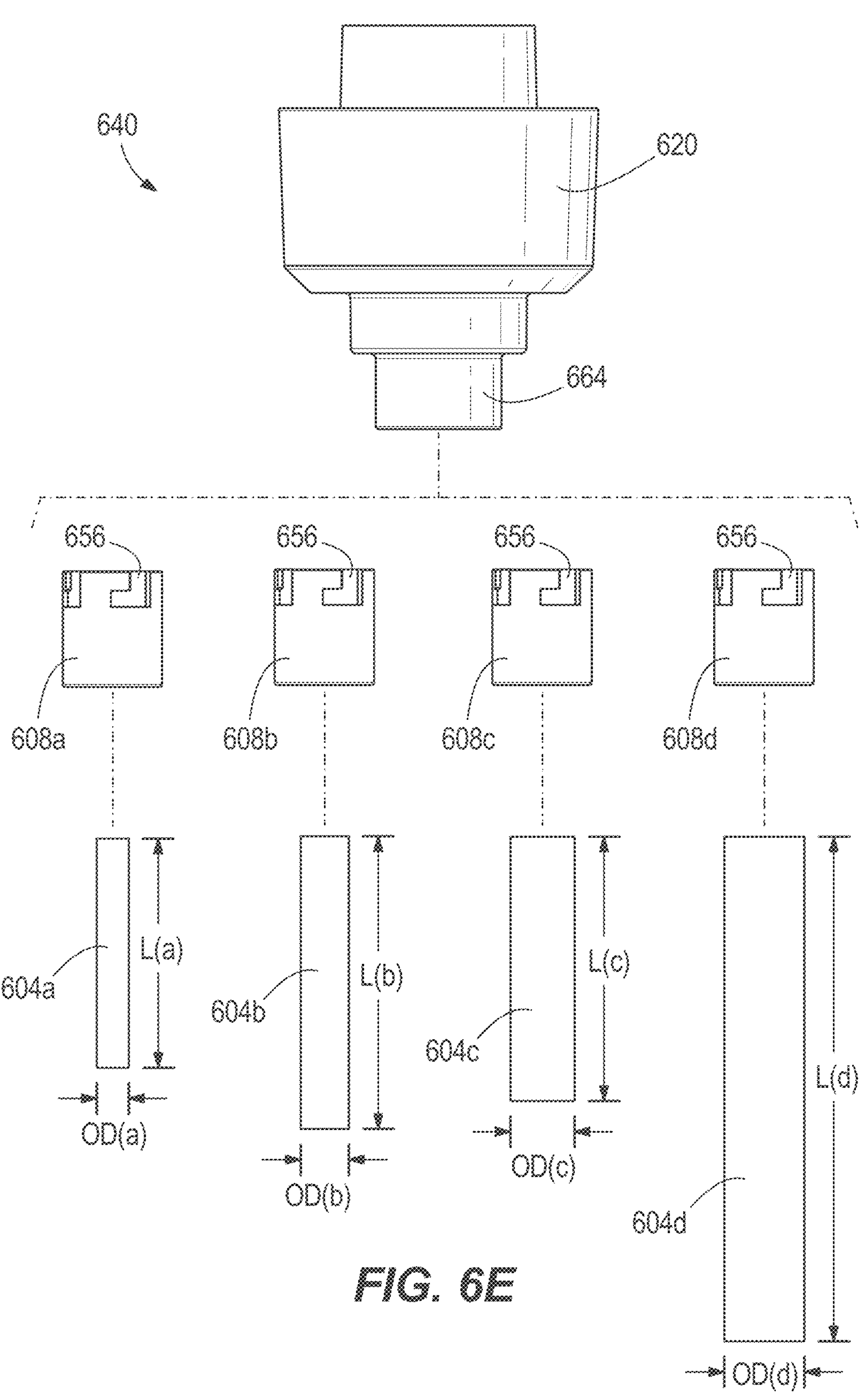
FIG. 6E is an exploded side elevation view of the vacuum tool of FIG. 6A with the various sized tubes and corresponding adapters.
Figure 6F:
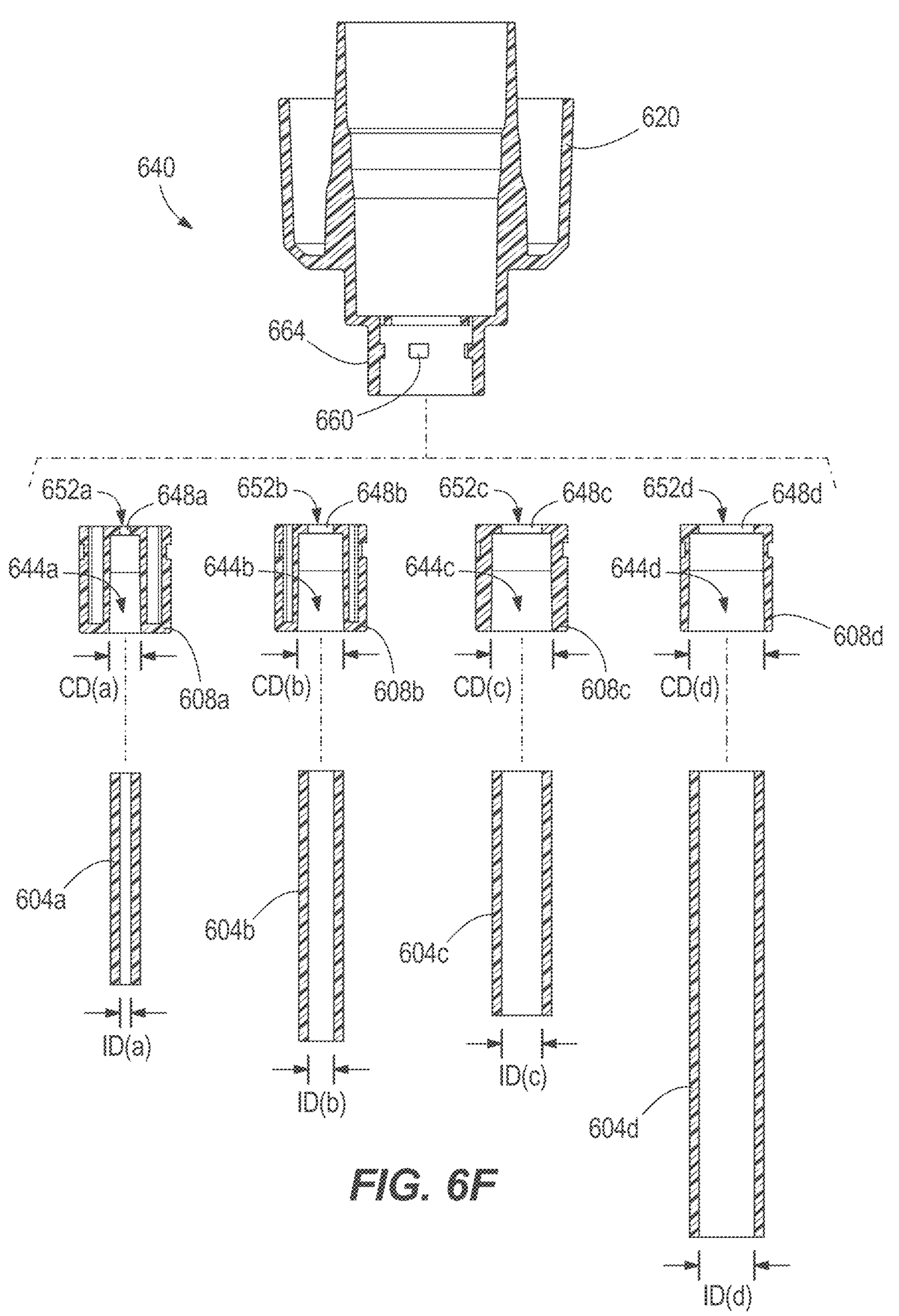
FIG. 6F is an exploded cross-sectional side elevation view of the vacuum tool of FIG. 6A with the various sized tubes and corresponding adapters.

As shown in FIGS. 6D-6F, the vacuum tool 600 may include a kit 640 having a plurality of different sized flexible tubes 604*a*, 604*b*, 604*c*, 604*d*. These flexible tubes 604*a*, 604*b*, 604*c*, 604*d* are different from each other in length, in diameter, or in length and diameter in order to provide a user with a variety of tube options. Of course, any number of flexible tubes 604 can be included as part of a vacuum tool kit 640. Some embodiments of the kit 640 include only one flexible tube 604, while other embodiments of the kit 640 include two, three, four, five, or more flexible tubes 604. In the illustrated embodiment, the smallest flexible tube 604*a* has an inner diameter ID(a) of ¼ inch (approximately 6.4 millimeters) and a length L(a) of 12 inches (approximately 30.5 centimeters). The flexible tube 604*b* has an inner diameter ID(b) of ⅜ inch (approximately 9.5 millimeters) and a length L(b) of 16 inches (approximately 40.6 centimeters). The flexible tube 604*c* has an inner diameter ID(c) of ½ inch (approximately 12.7 millimeters) and a length L(c) of 15 inches (approximately 38.1 centimeters). The largest flexible tube 604*d* has an inner diameter ID(d) of ⅝ inch (approximately 15.9 millimeters) and a length L(d) of 28 inches (approximately 71.1 centimeters). Of course, other inner diameter and length combinations are contemplated for alternative or additional flexible tubes 604 including, but not limited to, ½ inch by 12 inches (approximately 12.7 millimeters by 30.5 centimeters), ⅜ inch by 12 inches (approximately 9.5 millimeters by 30.5 centimeters), ⅜ inch by 24 inches (approximately 9.5 millimeters by 61 centimeters), ⅝ inch by 24 inches (approximately 15.9 millimeters by 61 centimeters), or the like.

With reference to FIG. 6A, the vacuum tool 600 further includes an adapter 608 removably connected to each of the flexible tube 604 and the connection portion 620. In the kit 640 illustrated in FIGS. 6D-6F, each of the flexible tubes 604*a*, 604*b*, 604*c*, 604*d* has a corresponding adapter 608*a*, 608*b*, 608*c*, 608*d*. In embodiments having different numbers of flexible tubes 604, there may be a corresponding number of adapters 608. In some embodiments, there may be only as many adapters 608 as there are flexible tubes 604 of varying diameters.

As shown in FIGS. 6D-6F, each of the adapters 608*a*, 608*b*, 608*c*, 608*d* has a tube receiving cavity 644*a*, 644*b*, 644*c*, 644*d*. Each tube receiving cavity 644*a*, 644*b*, 644*c*, 644*d* has a respective cavity diameter CD(a), CD(b), CD(c), CD(d) that corresponds to the outer diameter OD(a), OD(b), OD(c), OD(d) of each corresponding flexible tube 604*a*, 604*b*, 604*c*, 604*d*. In the illustrated embodiment, each flexible tube 604*a*, 604*b*, 604*c*, 604*d* is removably pressed into the tube receiving cavity 644*a*, 644*b*, 644*c*, 644*d* of the respective adapter 608*a*, 608*b*, 608*c*, 608*d* in, for instance, a transition fit arrangement. Each of the adapters 608*a*, 608*b*, 608*c*, 608*d* further includes a cavity end wall 648*a*, 648*b*, 648*c*, 648*d* (FIG. 6F) that is configured to function as a stop that engages an end of the corresponding flexible tube 604*a*, 604*b*, 604*c*, 604*d* to limit the distance the flexible tube 604*a*, 604*b*, 604*c*, 604*d* is inserted into the tube receiving cavity 644*a*, 644*b*, 644*c*, 644*d*. Each of the cavity end walls 648*a*, 648*b*, 648*c*, 648*d* defines a passage 652*a*, 652*b*, 652*c*, 652*d* that is in fluid communication with the corresponding tube receiving cavity 644*a*, 644*b*, 644*c*, 644*d*. Each passage 652*a*, 652*b*, 652*c*, 652*d* has a diameter that is roughly equivalent to the inner diameter ID(a), ID(b), ID(c), ID(d) of the corresponding flexible tube 604*a*, 604*b*, 604*c*, 604*d*. Each of the adapters 608*a*, 608*b*, 608*c*, 608*d* is removably couplable to the connection portion 620, such that the adapters 608*a*, 608*b*, 608*c*, 608*d* can be swapped in and out depending on the flexible tube 604*a*, 604*b*, 604*c*, 604*d* the user requires for a particular task. In the illustrated embodiment, each of the adapters 608*a*, 608*b*, 608*c*, 608*d* includes one or more twist-and-lock channels 656 defined therein (FIG. 6E).

The connection portion 620 is substantially identical to the connection portion 120 discussed above. As such, only the differences between the connection portion 120 discussed above and the connection portion 620 will be discussed below for the sake of brevity. As discussed above, each of the adapters 608*a*, 608*b*, 608*c*, 608*d* in the illustrated embodiment includes one or more twist-and-lock channels 656 defined therein. The connection portion 620 in the illustrated embodiment includes one or more corresponding posts 660 (FIG. 6F) that enter and engage the corresponding twist-and-lock channels 656 to retain the particular adapter 608*a*, 608*b*, 608*c*, 608*d*. In some embodiments, however, the twist-and-lock channels 656 and corresponding posts 660 may be omitted and, instead, a threaded arrangement, a transition fit arrangement, an attachment arrangement including one or more fasteners (clips, pins, screws, bolts, detents, or the like), or some other removable connection may be used. The connection portion 620 includes an extension 664 having the one or more posts 660 projecting radially inward therefrom. The extension 664 is illustrated as being integrally formed with the rest of the connection portion 620, but some embodiments may include the extension 664 removably coupled to the rest of the connection portion 620, permanently affixed to the connection portion 620 in another manner, or the like.

Figure 7A:
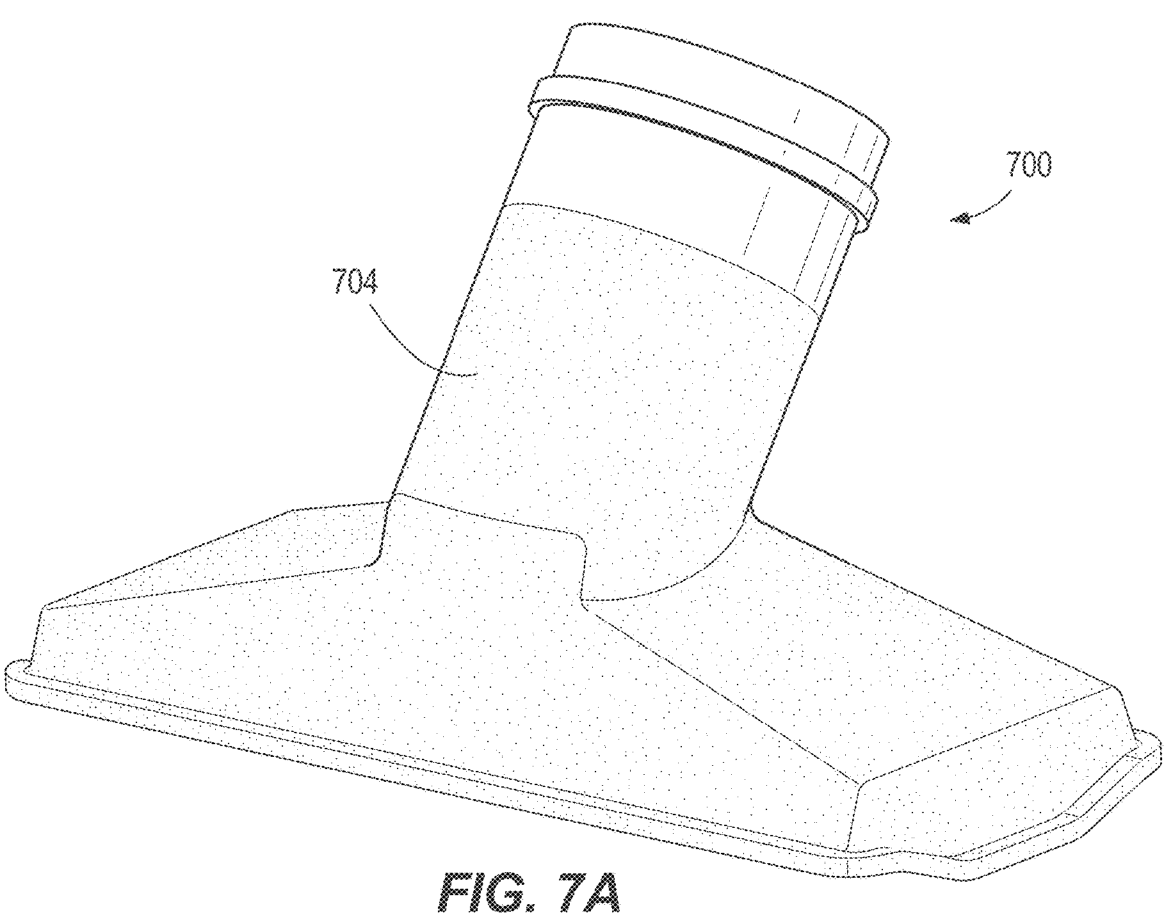
FIG. 7A is a perspective view of a vacuum tool according to another embodiment of the invention.
Figure 7B:
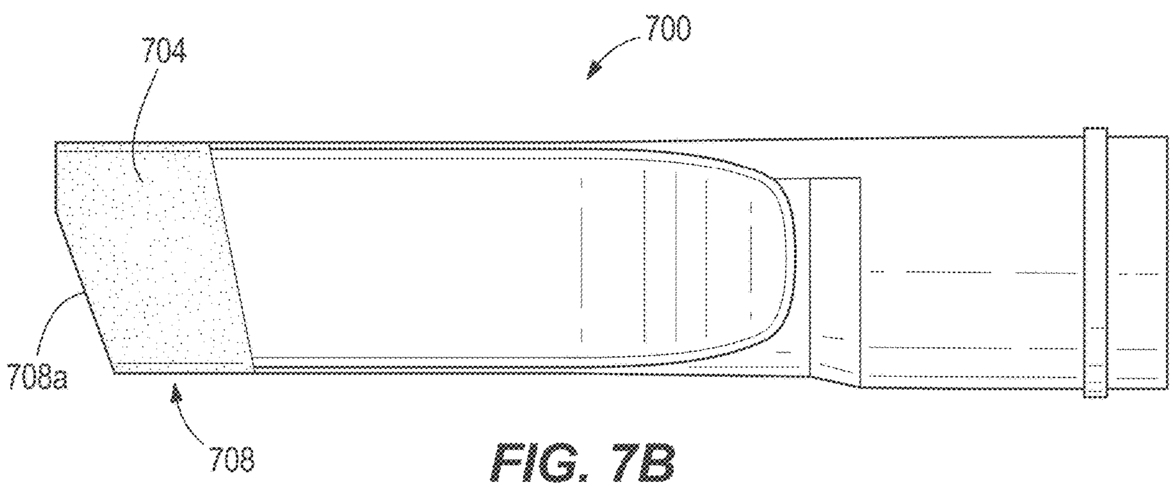
FIG. 7B is a perspective view of a vacuum tool according to another embodiment of the invention.

With reference to FIGS. 7A-7B, one or more of the tools 700 disclosed herein may include a coating 704 that prevents scratching or marring of finished surfaces. The coating 704 may be from rubber or any other material that prevents marring of finished surfaces. In the illustrated embodiment, the coating 704 is a rubber material overmolded to the outer surface of the tool 700. The coating 704 may also be applied to portions of the outer surface of the tool 700 by adhesive or any other suitable method. With reference to FIG. 7A, in some embodiments, the entire outer surface of the tool 700 may be covered by the coating 704. Alternatively, with reference to FIG. 7B, only a portion of the tool 700 (e.g., a corner, an edge, etc.) may be covered the coating 704. In the embodiment shown in FIG. 7B, the coating 704 is only applied to an edge 708*a* of a head portion 708 of the tool 700. In some embodiments, the coating 704 may be composed of alternative materials.

Although various aspects have been described in detail with reference to certain embodiments, variations and modifications exist within the scope and spirit of one or more independent aspects as described. Various features and advantages are set forth in the following claims.

What is claimed is:

1. A vacuum tool for removably coupling to a hose or wand of a vacuum, the vacuum tool comprising:

a body including a frustopyramidal base portion having at least four sidewalls forming an inlet and a cavity therebetween, the cavity in fluid communication with the inlet and tapering in a direction away from the inlet, a ledge coupled to a sidewall of the at least four sidewalls, the ledge extending along and protruding outward from the sidewall, the ledge including a surface extending in a direction transverse to the sidewall, an intermediate portion extending from the base portion, the intermediate portion being narrower than the base portion and having a conduit defined therein, the conduit in fluid communication with the cavity of the base portion, and a connection portion extending from the intermediate portion, the connection portion having an inner wall, a conduit formed by the inner wall, the conduit of the connection portion in fluid communication with the conduit of the intermediate portion, the conduit of the connection portion including an outlet configured to be placed in fluid communication with the hose or wand of the vacuum, an outer wall surrounding a majority of the inner wall, and an annular channel formed between the inner wall and the outer wall, the annular channel configured to receive an end of the hose or wand of the vacuum; and a magnet coupled to the ledge and disposed on the surface of the ledge, the surface of the ledge being disposed nearer to an inlet end of the sidewall in a direction parallel to the sidewall than at least a portion of the magnet is to the inlet end of the sidewall in the direction parallel to the sidewall, the portion of the magnet being disposed nearer to the outlet of the connection portion in the direction parallel to the sidewall than the surface of the ledge is to the outlet of the connection portion in the direction parallel to the sidewall.

2. The vacuum tool of claim 1, wherein the inlet lies along an inlet plane, the outlet lies along an outlet plane, and the inlet plane and the outlet plane form an oblique angle therebetween.

3. The vacuum tool of claim 2, wherein the sidewall is a farthest extending sidewall, of the at least four sidewalls, from the outlet.

4. The vacuum tool of claim 3, wherein the magnet spans across a majority of a length of the inlet.

5. The vacuum tool of claim 4, wherein the magnet spans across an entirety of a side of the inlet, the side of the inlet formed by the sidewall extending farthest from the outlet.

6. The vacuum tool of claim 1, wherein the outer wall of the connection portion is wider than the intermediate portion where the intermediate portion meets the connection portion.

7. The vacuum tool of claim 1, wherein the base portion has at least eight sidewalls including the at least four sidewalls.

8. The vacuum tool of claim 7, wherein the inlet is rectangular with chamfered corners.

9. The vacuum tool of claim 8, wherein the outlet is circular.

10. The vacuum tool of claim 1, wherein the sidewall of the at least four sidewalls is disposed between the magnet and the cavity of the base portion.

11. The vacuum tool of claim 1, wherein the conduit of the intermediate portion is narrower than the cavity of the base portion.

12. The vacuum tool of claim 1, wherein the body is formed as a single unitary part.

13. The vacuum tool of claim 1, wherein the inner wall is an inner cylindrical wall and the outer wall is an outer cylindrical wall.

14. A vacuum tool for removably coupling to a hose or wand of a vacuum, the vacuum tool comprising:

a body including a base portion having a plurality of walls forming an inlet, the plurality of walls angled toward one another such that the base portion tapers along a direction away from the inlet, a ledge coupled to a wall of the plurality of walls, the ledge extending along and protruding outward from the wall, the ledge having a first surface and an opposite second surface, the first surface being nearer to the inlet than the second surface is to the inlet, each of the first surface and the second surface extends in a direction transverse to the wall, an intermediate portion coupled to the base portion, the intermediate portion being narrower than the base portion, and a connection portion coupled to the intermediate portion, the connection portion having an annular end wall surrounding the intermediate portion where the connection portion couples to the intermediate portion, a flare wall extending radially outwardly relative the annular end wall at an oblique angle, an outer wall extending from the flare wall, an inner wall disposed radially inwardly from the outer wall, the inner wall forming an outlet, the outlet in fluid communication with the inlet and configured to be placed in fluid communication with the hose or wand of the vacuum, and an annular channel formed between the outer wall and the inner wall, the annular channel configured to receive an end of the hose or wand of the vacuum; and a magnet coupled to the ledge, at least a portion of the magnet disposed adjacent the second surface of the ledge, such that the second surface is disposed between the portion of the magnet and the first surface on an imaginary line that intersects the first surface, the second surface, and the portion of the magnet.

15. The vacuum tool of claim 14, wherein the magnet spans a majority of the wall of the plurality of walls in a direction parallel to a plane in which the inlet lies.

16. The vacuum tool of claim 14, wherein each of the inner wall and the outer wall is generally cylindrical.

17. The vacuum tool of claim 16, wherein each of the inner wall and the outer wall extends generally parallel to a direction that is perpendicular to the annular end wall of the connection portion.

18. The vacuum tool of claim 14, wherein the magnet is disposed on a side of the wall of the plurality of walls that is opposite the inlet.

19. The vacuum tool of claim 14, wherein the inlet is rectangular with chamfered corners.

* * * * *